(12) United States Patent
Burton

(10) Patent No.: US 11,351,010 B2
(45) Date of Patent: * Jun. 7, 2022

(54) DENTAL WEDGES AND MATRIX BANDS FOR USE IN DIRECT COMPOSITE RESTORATION TECHNIQUES

(71) Applicant: Burton Dental Innovations, LLC, Hinsdale, IL (US)

(72) Inventor: Matthew Burton, Hinsdale, IL (US)

(73) Assignee: Burton Dental Innovations, LLC, Clarendon Hills, IL (US)

( * ) Notice: Subject to any disclaimer, the term of this patent is extended or adjusted under 35 U.S.C. 154(b) by 454 days.

This patent is subject to a terminal disclaimer.

(21) Appl. No.: 16/381,918

(22) Filed: Apr. 11, 2019

(65) Prior Publication Data

US 2019/0298491 A1    Oct. 3, 2019

Related U.S. Application Data

(63) Continuation-in-part of application No. 15/727,550, filed on Oct. 6, 2017, now Pat. No. 10,299,889.

(Continued)

(51) Int. Cl.
*A61C 5/85* (2017.01)
*A61C 5/88* (2017.01)
(Continued)

(52) U.S. Cl.
CPC ............... *A61C 5/85* (2017.02); *A61C 5/60* (2017.02); *A61C 5/88* (2017.02); *A61C 3/06* (2013.01)

(58) Field of Classification Search
CPC .... A61C 5/85; A61C 5/60; A61C 5/88; A61C 3/06
See application file for complete search history.

(56) References Cited

U.S. PATENT DOCUMENTS 3,815,243 A    6/1974  Eames
4,997,367 A    3/1991  Kassel
(Continued)

FOREIGN PATENT DOCUMENTS

DE          3816501 A1    11/1989
EP          1541092 A2     6/2005
WO    WO-2014/060020 A1   4/2014

OTHER PUBLICATIONS

Australian Patent Application No. 2017339516, Examination Report No. 1, dated Jun. 18, 2019.
(Continued)

*Primary Examiner* — Nicholas D Lucchesi
(74) *Attorney, Agent, or Firm* — Marshall, Gerstein & Borun LLP

(57) ABSTRACT

A wedge system for use in a dental restoration procedure for a posterior tooth. The wedge system includes a first wedge including a body portion adapted to be disposed in an approximal space, a first arm extending from the body, a second arm extending from the body portion, a gap formed between the first arm and the second arm, a first rib arranged on an inner surface of the first arm, and a second rib arranged on an inner surface of the second arm, wherein each of the first and second ribs is adapted to engage tissue defining the approximal space. In some cases, the wedge system may also include a second wedge including a body portion, at least a portion of which can be disposed in the gap of the first wedge to removably secure the second wedge to the first wedge.

20 Claims, 35 Drawing Sheets

Related U.S. Application Data

(60) Provisional application No. 62/656,256, filed on Apr. 11, 2018, provisional application No. 62/462,712, filed on Feb. 23, 2017, provisional application No. 62/434,229, filed on Dec. 14, 2016, provisional application No. 62/427,669, filed on Nov. 29, 2016, provisional application No. 62/405,099, filed on Oct. 6, 2016.

(51) Int. Cl.
*A61C 5/60* (2017.01)
*A61C 3/06* (2006.01)

(56) References Cited

U.S. PATENT DOCUMENTS

| | | | |
|---|---|---|---|
| 5,114,341 | A | 5/1992 | Kassel |
| 5,730,592 | A | 3/1998 | Meyer |
| 6,375,463 | B1 | 4/2002 | McLean et al. |
| 6,712,608 | B2 | 3/2004 | Bills |
| 7,083,412 | B1 | 8/2006 | Karapetyan |
| 7,097,452 | B2 | 8/2006 | Friedman |
| 9,629,693 | B2 | 4/2017 | McDonald et al. |
| 9,883,922 | B2 | 2/2018 | McDonald |
| 10,080,626 | B1* | 9/2018 | Alsulaimani ............ A61C 5/82 |
| 10,238,470 | B2 | 3/2019 | Burton |
| 10,299,889 | B2 | 5/2019 | Burton |
| 2003/0113688 | A1 | 6/2003 | Weissenfluh |
| 2003/0165792 | A1* | 9/2003 | Jodaikin ............ A61K 8/0283 433/80 |
| 2003/0186186 | A1 | 10/2003 | Hahn |
| 2005/0147941 | A1 | 7/2005 | McDonald |
| 2006/0084029 | A1 | 4/2006 | Viscomi et al. |
| 2007/0087310 | A1 | 4/2007 | Giusti |
| 2008/0064000 | A1 | 3/2008 | Clark |
| 2008/0064009 | A1 | 3/2008 | Clark |
| 2009/0029324 | A1 | 1/2009 | Clark |
| 2011/0171596 | A1* | 7/2011 | Clark ............ A61C 5/88 433/149 |
| 2011/0250563 | A1 | 10/2011 | Horvath et al. |
| 2011/0262878 | A1 | 10/2011 | Galler |
| 2011/0306007 | A1 | 12/2011 | Ericson et al. |
| 2012/0164597 | A1 | 6/2012 | McDonald |
| 2014/0342311 | A1* | 11/2014 | McDonald ............ A61C 5/88 433/138 |
| 2015/0125810 | A1* | 5/2015 | Jodaikin ............ A61K 8/0208 433/80 |
| 2015/0125817 | A1 | 5/2015 | McDonald et al. |
| 2015/0150651 | A1 | 6/2015 | Mcdonald |
| 2015/0282896 | A1 | 10/2015 | Ulso et al. |
| 2019/0269481 | A1 | 9/2019 | Burton |

OTHER PUBLICATIONS

European Patent Application No. 17791509.7, Communication Pursuant to Article 94(3) EPC, dated Feb. 3, 2020.
Japanese Patent Application No. 2019-516944, Decision of Refusal, dated Dec. 17, 2019.
Japanese Patent Application No. 2019-516944, Notification of Reasons for Refusal, dated Sep. 3, 2019.
European Patent Application No. 17791509.7, Communication Pursuant to Article 94(3) EPC, dated Jul. 27, 2020.
dentsplysirona.com, "AutoMatrix® Retainerless Matrix System," (2003). Retrieved from the Internet on Jan. 8, 2018: https://www.dentsplysirona.com/content/dam/dentsply/pim/manufacturer/Restorative/Accessories/Matrix_Systems/Sectional_Systems/Palodent_Sectional_Matrix_System/AutoMatrix-Palodent-txtken0-en-1402.
dentsplysirona.com, "Palodent Plus, Sectional Matrix System, The Shape of Confidence." Retrieved from the Internet on Jan. 8, 2018: https://www.dentsplysirona.com/content/dam/dentsply/pim/manufacturer/Restorative/Accessories/Matrix_Systems/Sectional_Systems/Palodent_Plus_Sectional_Matrix_System/Palodent-Plus-887kmcf-en-1402.
dentsplysirona.com, "The Palodent® System, The original, most trusted, and highest rated contoured section matrix system," (2006). Retrieved from the Internet on Jan. 8, 2018: https://www.dentsplysirona.com/content/dam/dentsply/pim/manufacturer/Restorative/Accessories/Matrix_Systems/Sectional_Systems/Palodent_Sectional_Matrix_System/AutoMatrix-Palodent-3gp9usp-en-1402.
directadental.com, "Clinical Tips: FenderMate Prime protection and matrix for primary teeth." Retrieved from the Internet on Jan. 8, 2018: http://www.directadental.com/products/education/clinical-tips--fendermate-prime.
directadental.com, "FenderMate® Sectional matrix for Class II composite restorations." Retrieved from the Internet on Jan. 8, 2018: http://www.directadental.com/products/restorative/fendermate.
garrisondental.com, "Matrix Bands." Retrieved from the Internet on Jan. 8, 2018: https://garrisondental.com/en/matrix-bands.
International Search Report and Written Opinion of the International Searching Authority for Application No. PCT/US2017/055668, dated Jan. 30, 2018.
net32.com, "Net32, FenderMate Right Regular, Dark Blue 18/PK. Combines a pre-curved," (2018) Net32 Inc. Retrieved from the Internet on Jan. 11, 2018: https://www.net32.com/ec/fendermate-right-regular-dark-blue-18-combines-d-105770?utm_source=Windfall&utm_medium=productfeed&utm_content=dental&utm_campaign=googleshopping&utm_source=google&utm_medium=cpc&adpos=1o2&scid=scplp105770&sc_intid=105770&gclid=Cj0KCQjwpMLOBRC9ARIsAPiGeZD-tkgMGqGENeYrlgSUo47wqMbFgSowyy344K1qT8MBta6TYjMOTaQaAryyEALw_wcB.
pattersondental.com, "Contact Matrix™ System, Thin-Flex Matrices—Danville Materials." Retrieved from the Internet on Jan. 8, 2018: https://www.pattersondental.com/Supplies/ProductFamilyDetails/PIF_62351?mc=0.
pattersondental.com, "Patterson Dental, Patient Experience, Practice Lifestyle," (2018) Patterson Dental Supply, Inc. Retrieved from the Internet on Jan. 9, 2018: https://www.pattersondental.com/Supplies/ProductItemFamily/86095/Retainer-Bands-Wedges?ss=86141.
pinkband.org, "PinkBand® Silicone Coated Dental Matrix Bands," (2014). Retrieved from the Internet on Jan. 8, 2018: http://www.pinkband.org/.
ultradent.com, "The Triodent® Story, Triodent's award-winning range of products," (2017). Retrieved from the Internet on Jan. 8, 2018: https://www.ultradent.com/en-us/Dental-Products-Supplies/Prepare/triodent-matrix-systems/Pages/triodent-story.aspx?s_cid=2024.
ultradent.com, "V3 Blue Quick Guide." Retrieved from the Internet on Jan. 8, 2018: https://www.ultradent.com/en-us/Product%20Instruction%20Documents/V3-Blue.pdf.

* cited by examiner

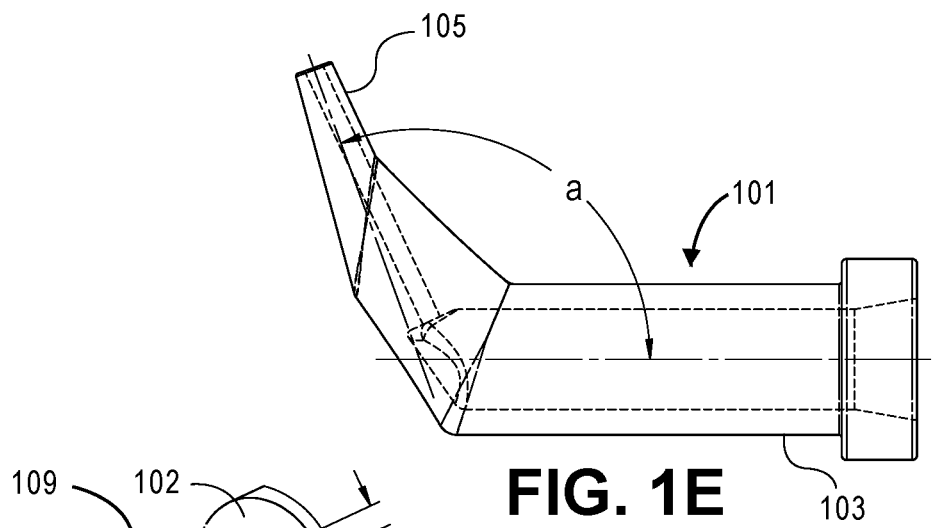
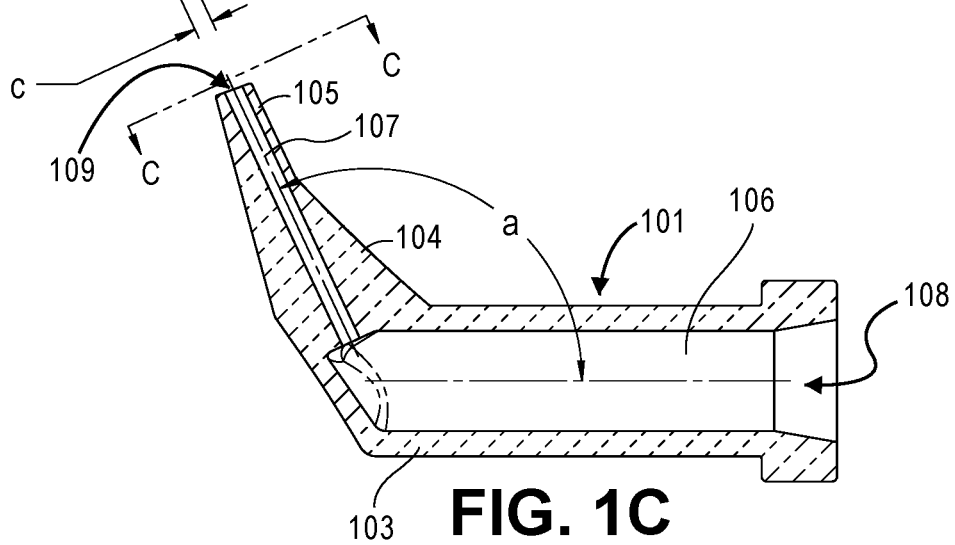

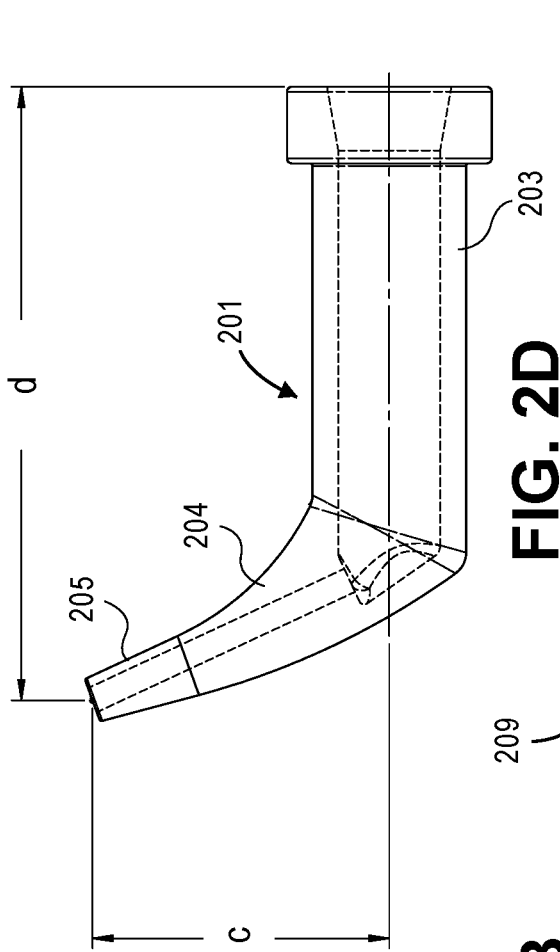
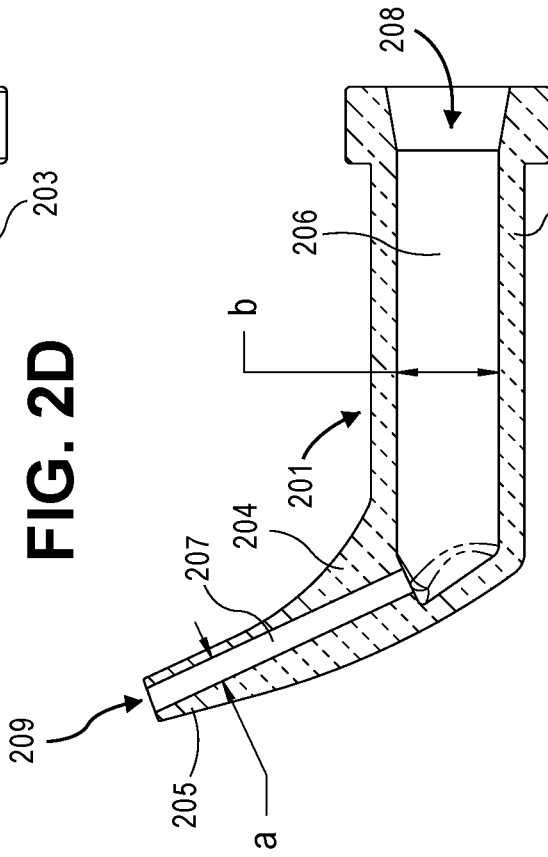
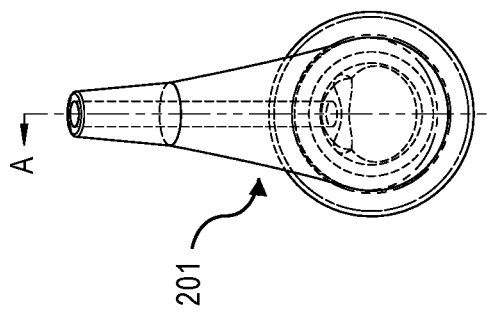
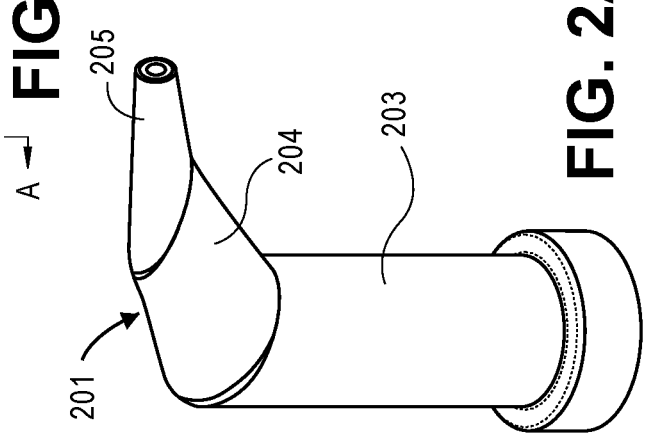
FIG. 2D
FIG. 2C
FIG. 2B
FIG. 2A

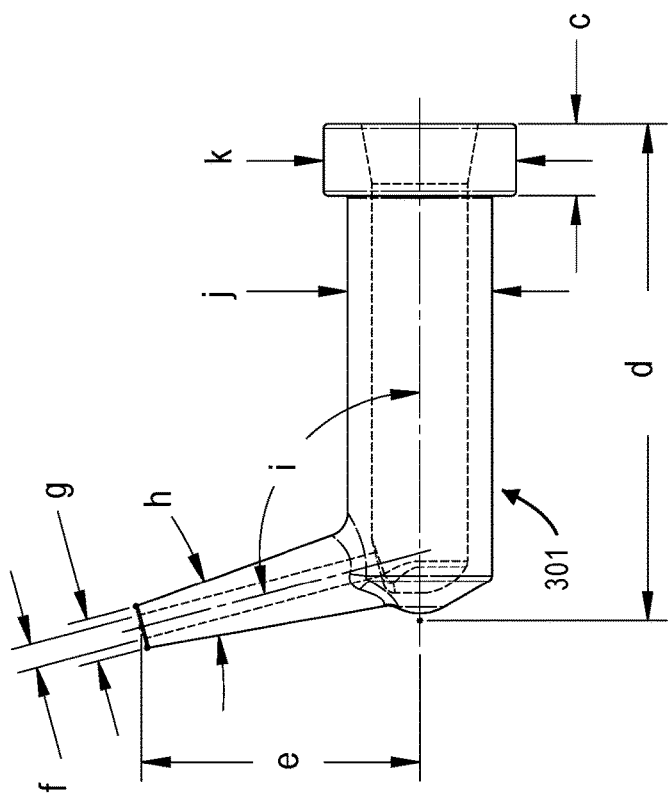
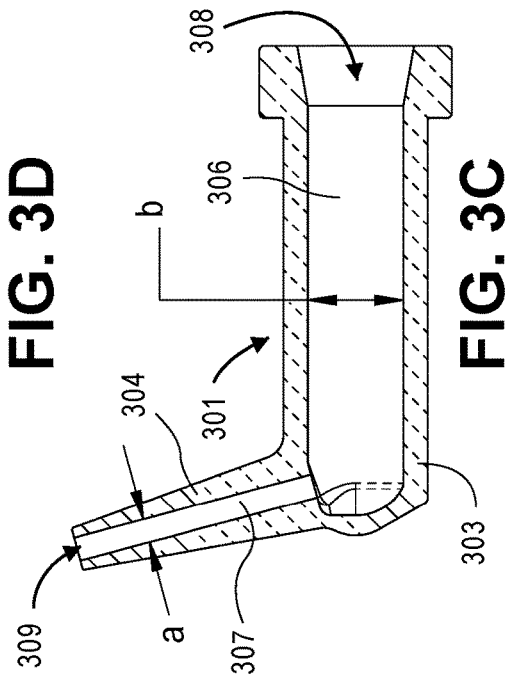
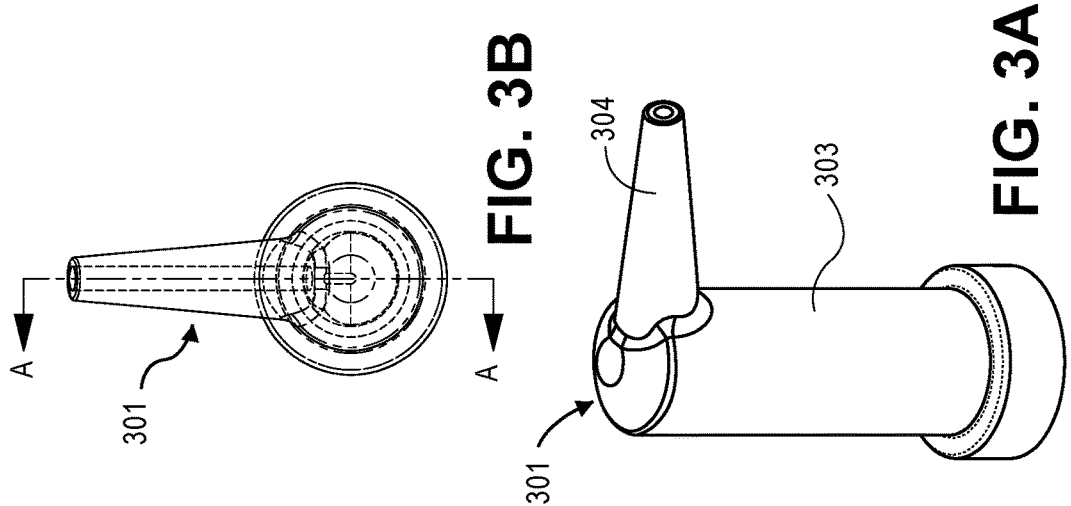

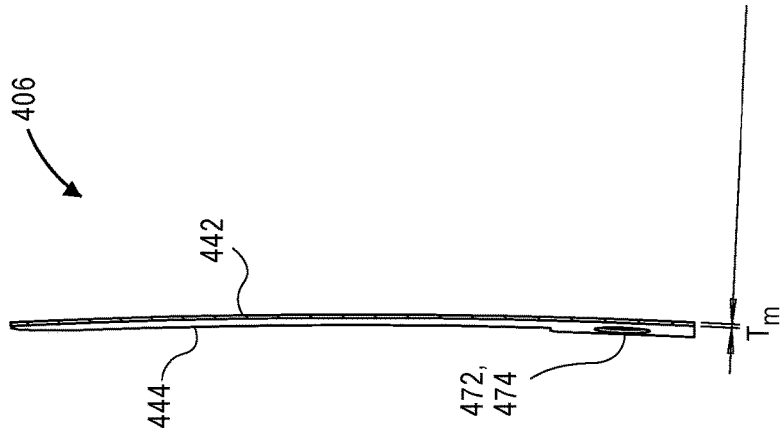
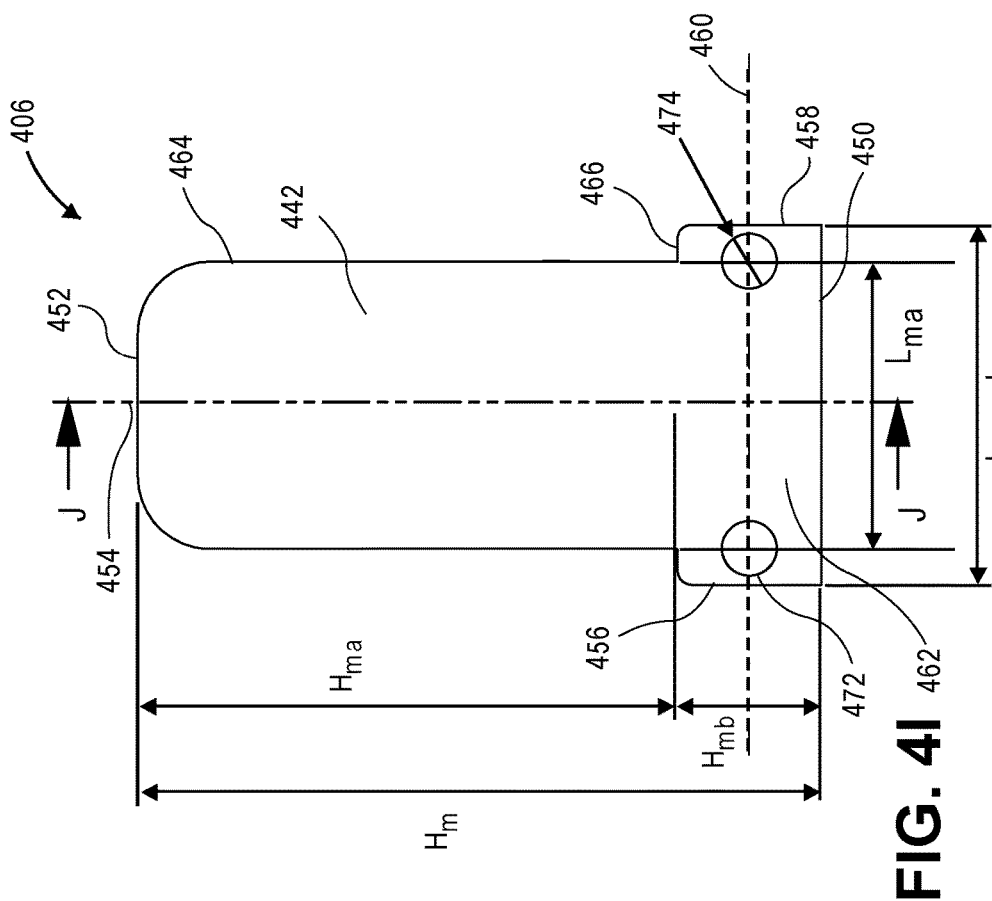
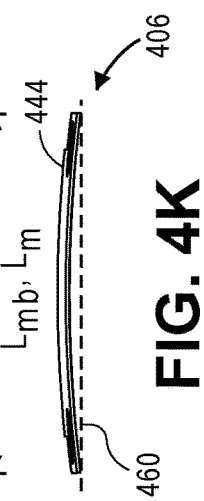

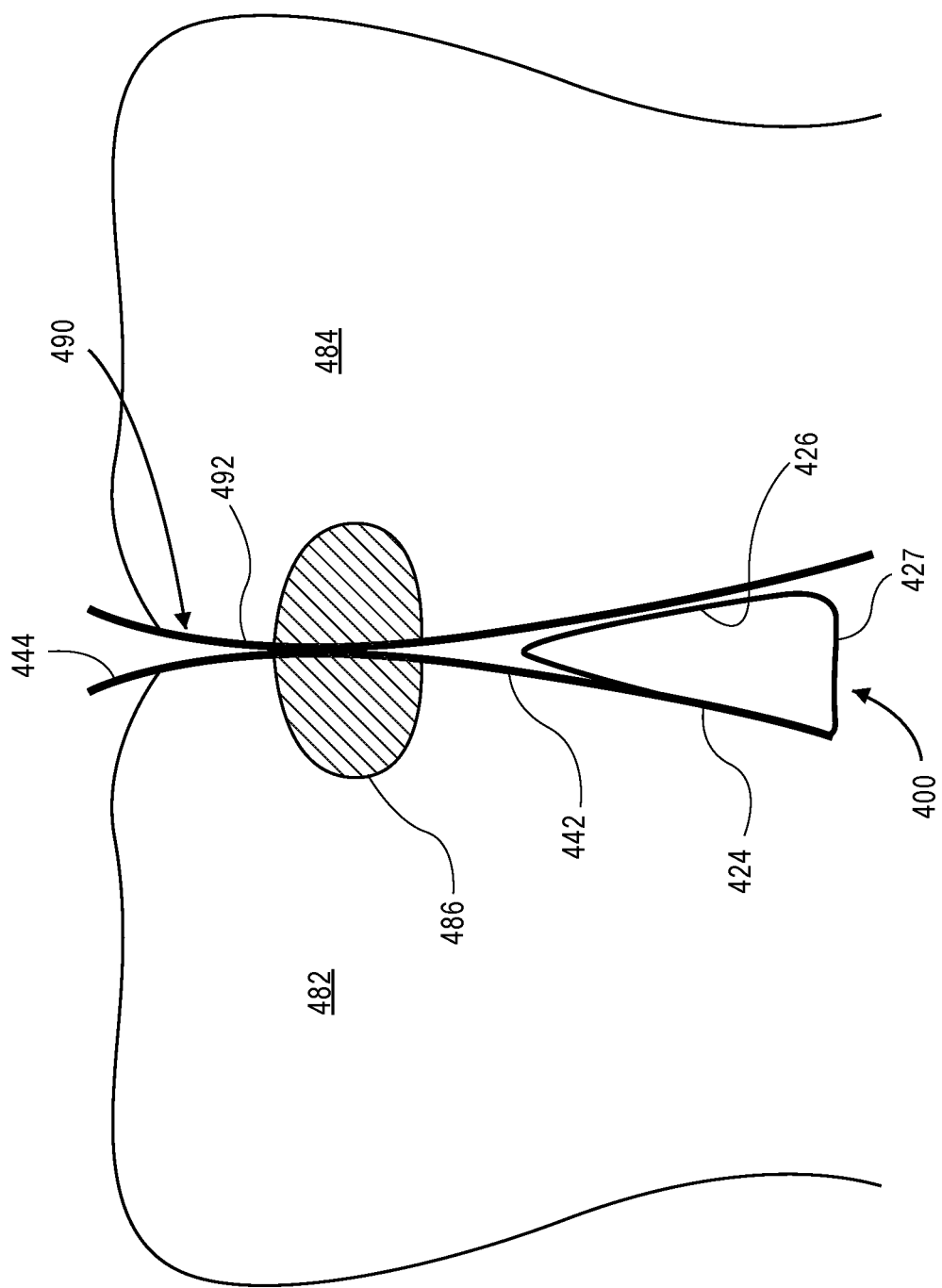

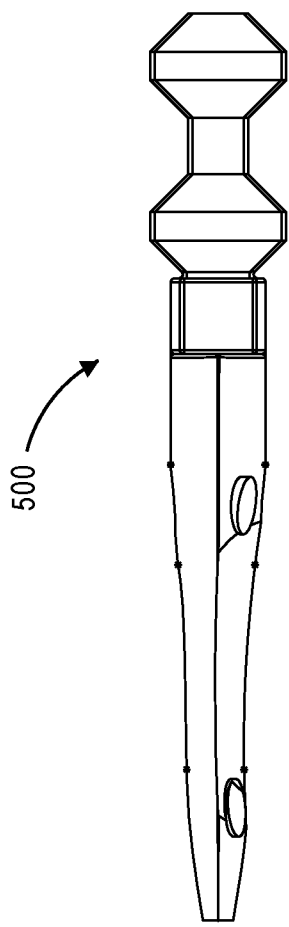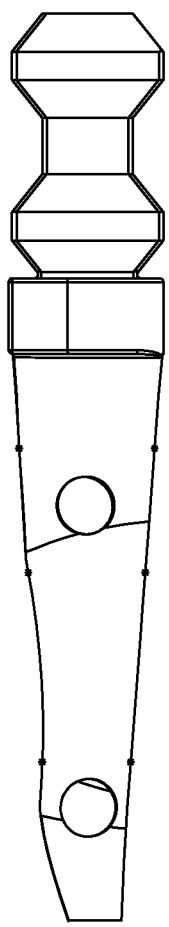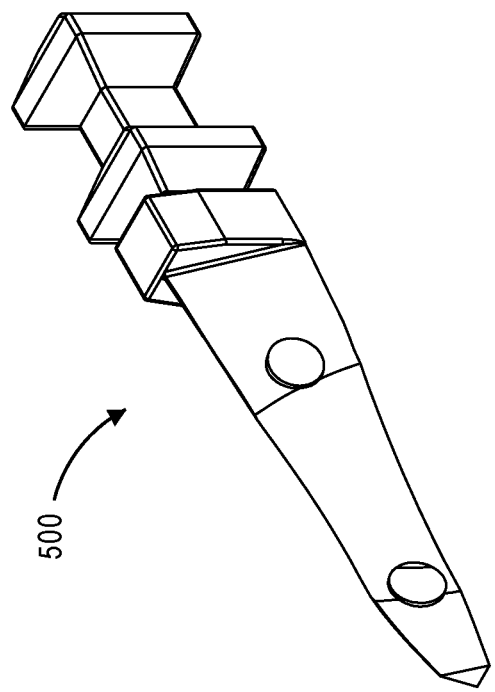

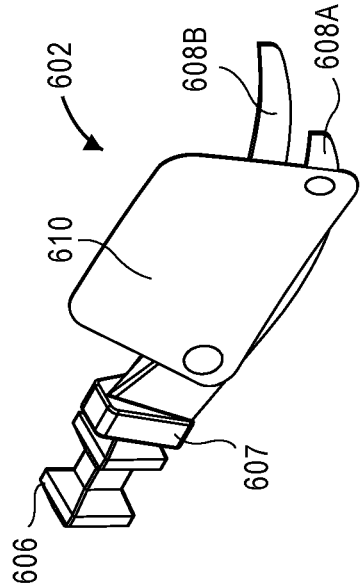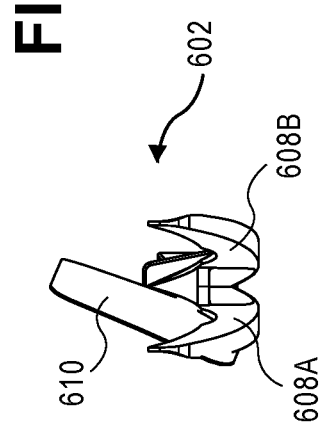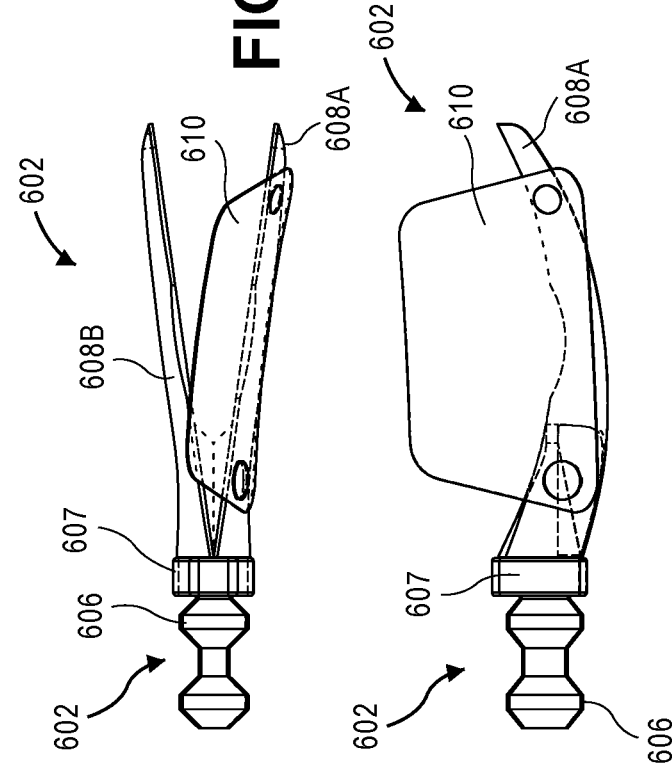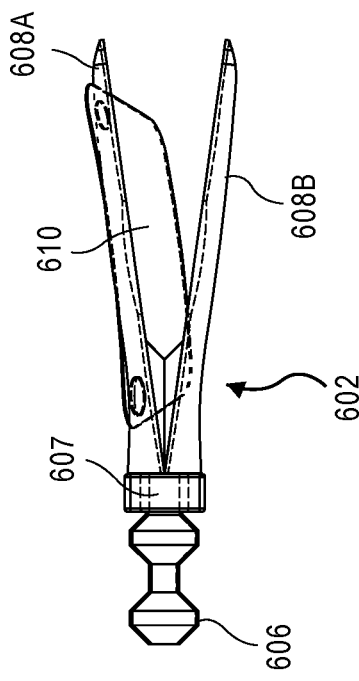

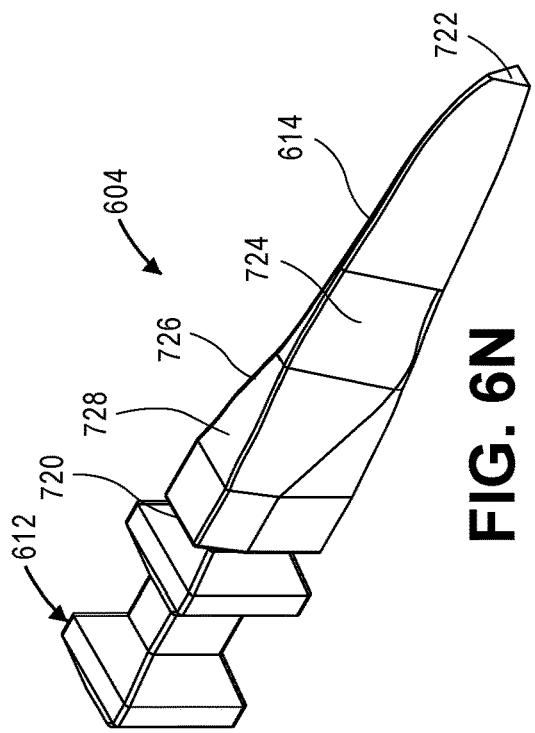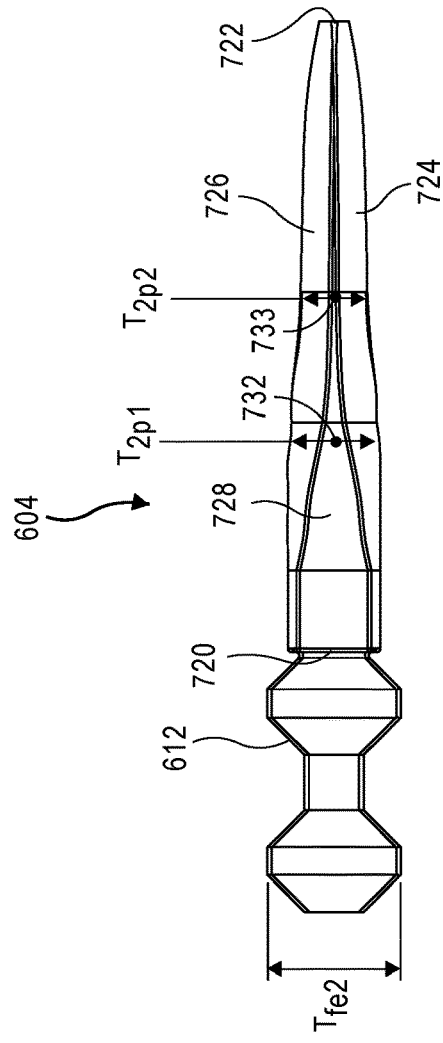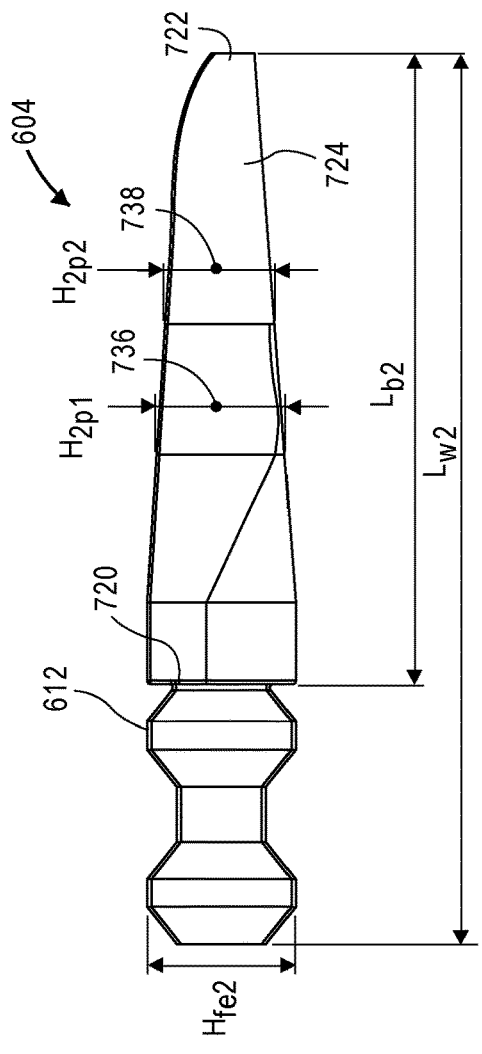

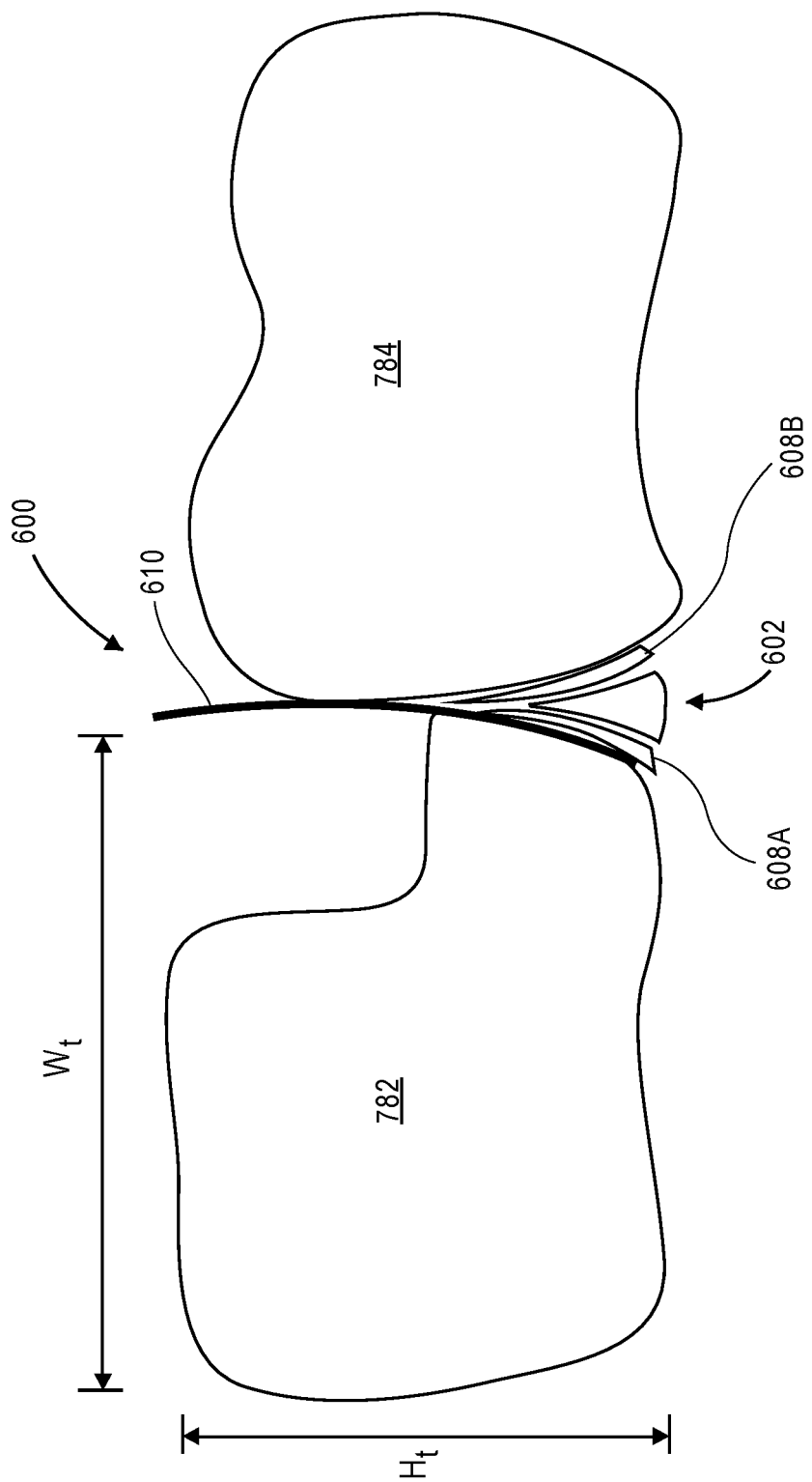

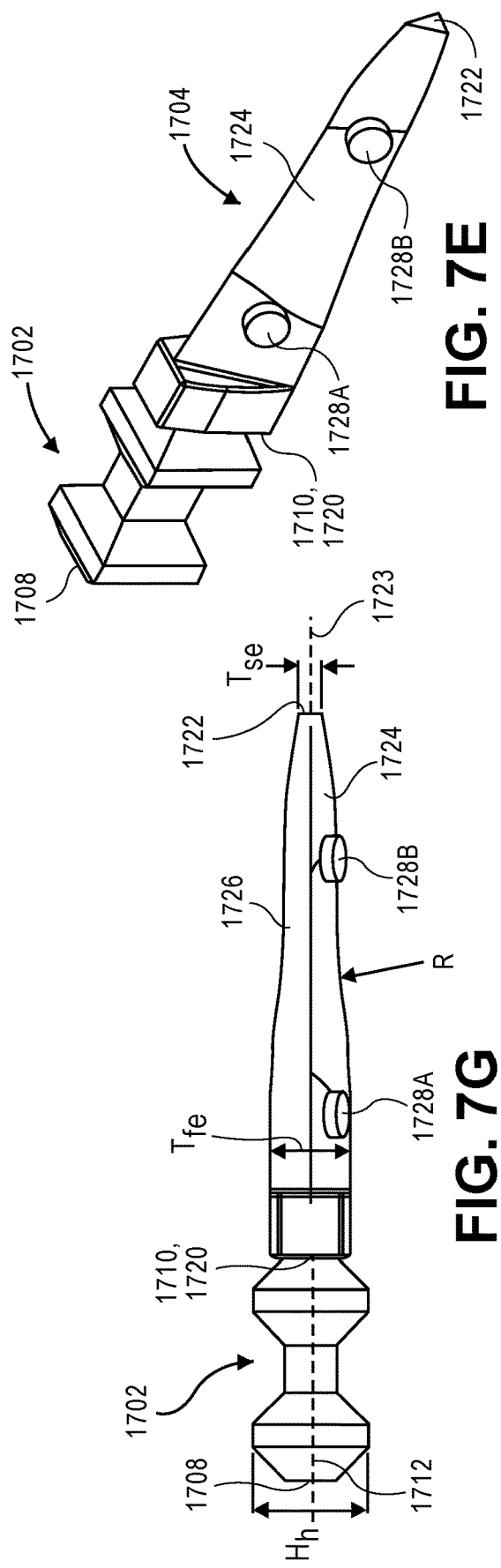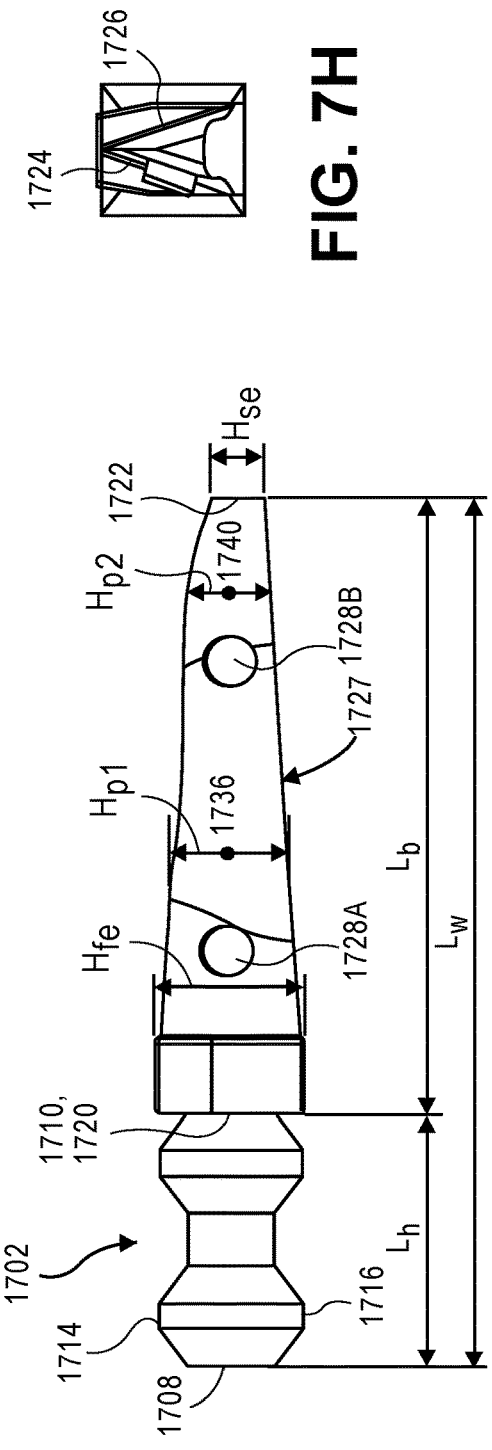
FIG. 7E
FIG. 7H
FIG. 7G
FIG. 7F

| Units: Metric | | | Width | | | Height | | |
|---|---|---|---|---|---|---|---|---|
| | | | | Radius | | | Radius | |
| | Top | Middle | Above The Wedge | Below The Wedge | Left/Right | | Middle Center | Middle Top |
| Anterior | 5.57 | 8.54 | 14.93 | 19.96 | 13.75 | | 12.85 | |

FIG. 7N

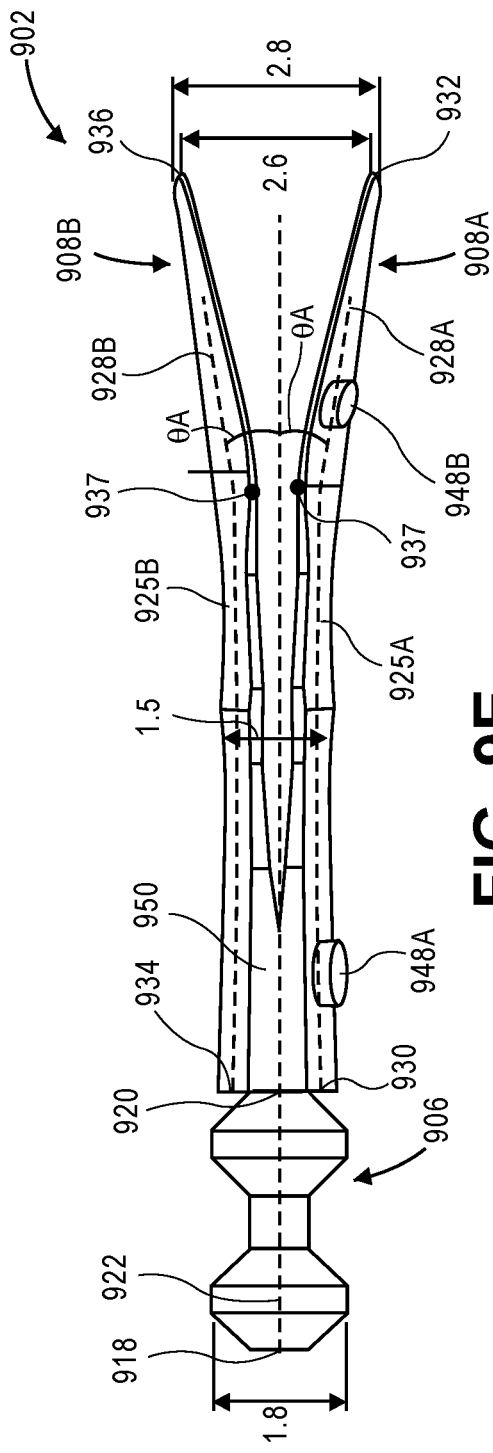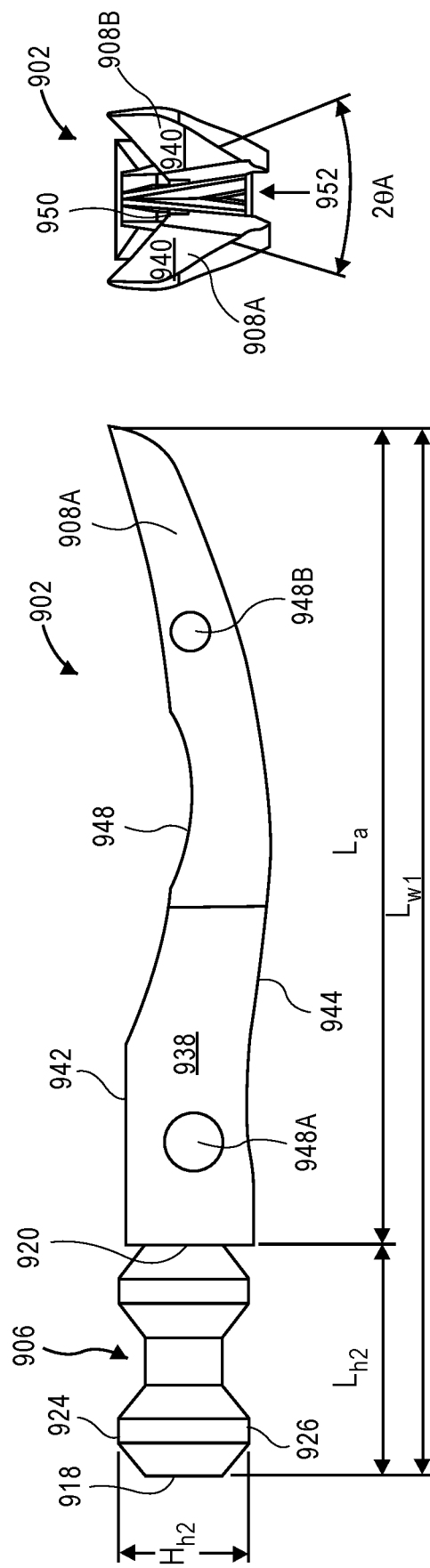

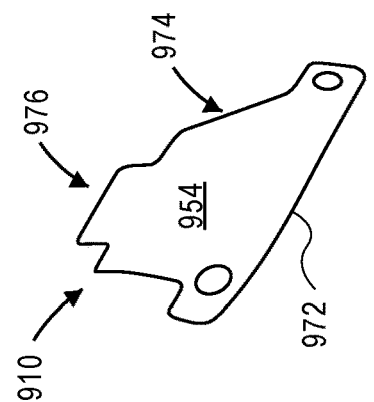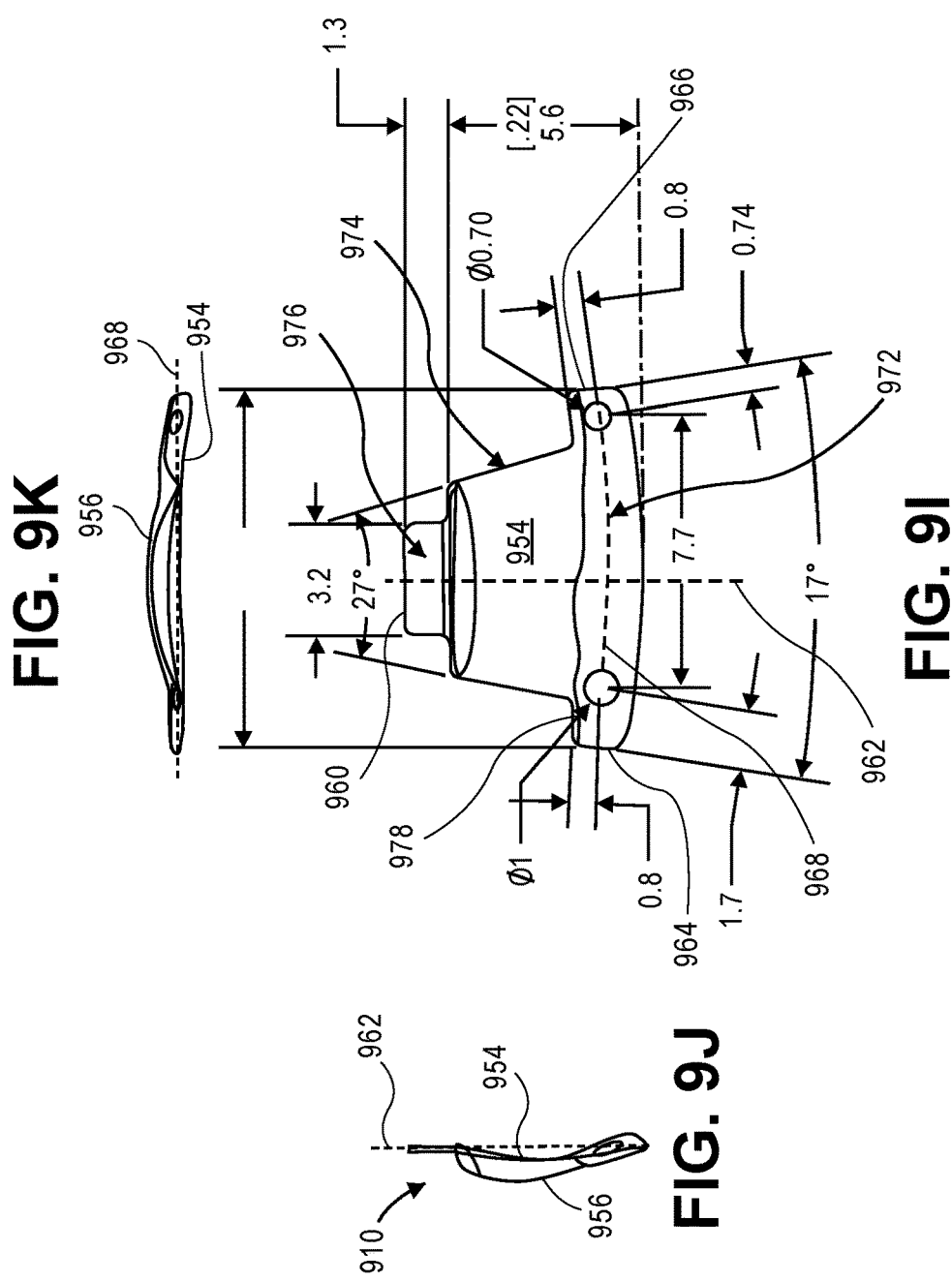

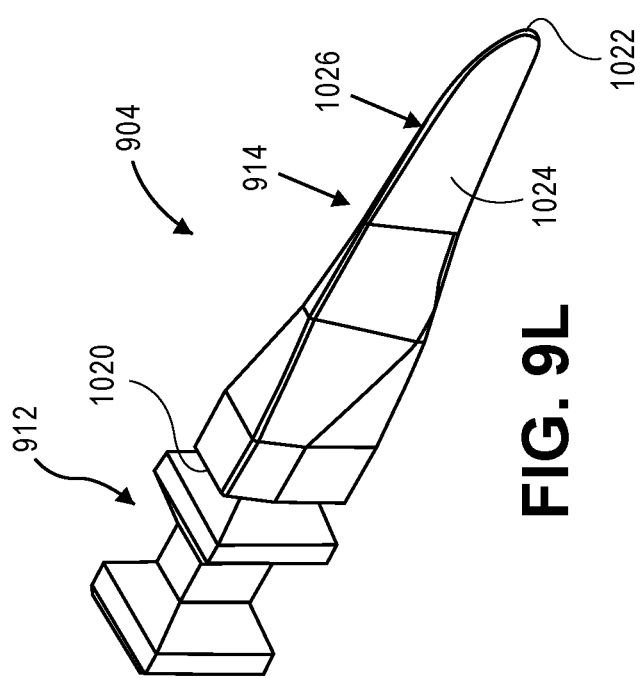
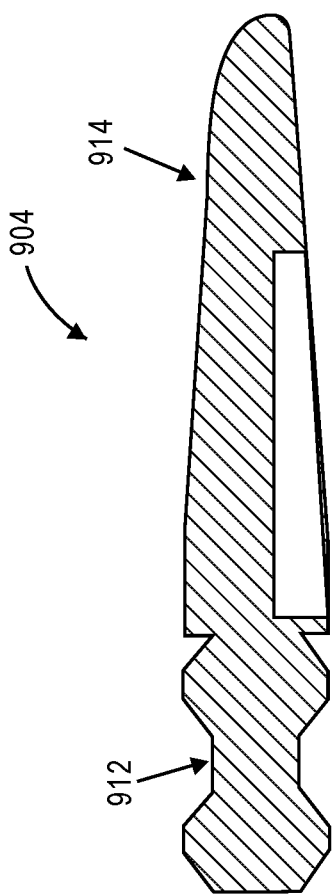
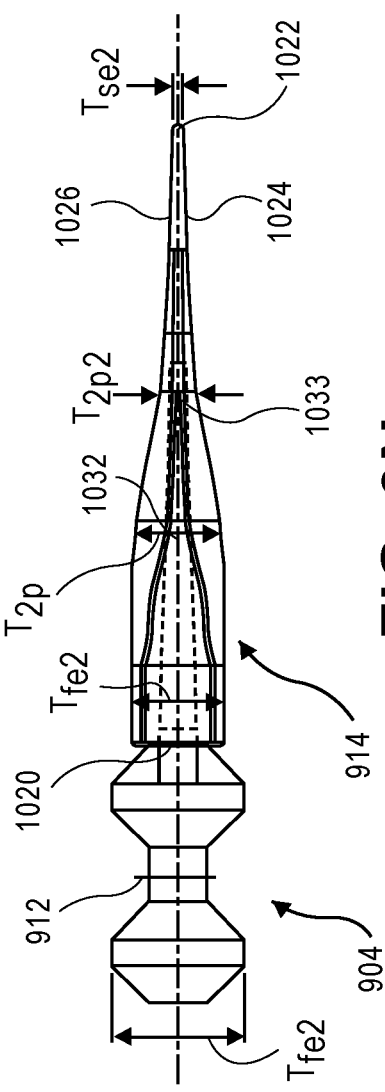
FIG. 9L
FIG. 9M
FIG. 9N

| Units: Metric | | Width | | | Height | | |
|---|---|---|---|---|---|---|---|
| | | | Radius | | | Radius | |
| | Top | Middle | Above The Wedge | Below The Wedge | Left/Right | Middle Center | |
| Posterior | 63.01 | 7.04 | 41.24 | 22.31 | 7.86 | 4.64 | |

FIG. 9R

DENTAL WEDGES AND MATRIX BANDS FOR USE IN DIRECT COMPOSITE RESTORATION TECHNIQUES

CROSS-REFERENCE TO OTHER APPLICATIONS

This application claims the benefit of the filing date of U.S. Provisional Patent Application No. 62/656,256, filed Apr. 11, 2018 and titled "DENTAL WEDGES AND MATRIX BANDS FOR USE IN DIRECT COMPOSITE RESTORATION TECHNIQUES," and is a continuation-in-part of U.S. Non-provisional patent application Ser. No. 15/727,550, filed Oct. 6, 2017, which claims the benefit of the filing dates of U.S. Provisional Patent Application No. 62/405,099, filed Oct. 6, 2016 and titled "PRODUCTS FOR USE IN DENTAL RESTORATION PROCEDURES," U.S. Provisional Patent Application No. 62/427,669, filed Nov. 29, 2016 and titled "PRODUCTS FOR USE IN DENTAL RESTORATION PROCEDURES," U.S. Provisional Patent Application No. 62/434,229, filed Dec. 14, 2016 and titled "PRODUCTS FOR USE IN DENTAL RESTORATION PROCEDURES," and U.S. Provisional Patent Application No. 62/462,712, filed Feb. 23, 2017 and titled "DENTAL WEDGES AND MATRIX BANDS FOR USE IN COMPOSITING TECHNIQUES," the disclosures of which are hereby incorporated by reference in their entireties.

FIELD

The present disclosure is directed to devices and systems for use in dental restoration procedures. More particularly, the present disclosure is directed to an improved dental wedges and matrix bands, or a unique merging of these two components for use in restoring portions of anterior and posterior teeth.

BACKGROUND

Dentists frequently administer dental restorations to their human patients, such as when human patients have cavities or other conditions that require tooth restoration. Any tooth of a human patient, regardless of mouth position, is susceptible to decay or other conditions that may necessitate a restoration. Human patients have two types of teeth: anterior teeth which include incisors and canine teeth, and posterior teeth which include premolars and molars, and a given patient may need a restoration procedure for any of his/her anterior and/or posterior teeth.

Typically, restoration procedures involve the use of dental composite resins which include various types of synthetic resins that may be composed of Bis-GMA and/or other dimetracrylate monomers (e.g., TEGMA, UDMA, HDDMA), a filler material, and a photoinitiator. To administer a restoration procedure, a dentist typically uses various products or instruments including matrix systems, which consist of metal or plastic matrices, wedges, and 0.2-0.3 g unit dose compules filled with a composite resin that may be dispensed using a dispensing gun.

It is well known that anterior teeth have shapes, sizes (e.g., heights, radii), and contours that are different from those of posterior teeth. It is also well known that the location, size, and shapes of the decayed surfaces that require restoration differ between anterior and posterior teeth. These differences among the tooth types necessitate the presence of two separate systems and methods to restore them.

Thus, existing products and instruments that are used to facilitate restoration of posterior teeth cannot also be used to facilitate restoration of anterior teeth (and vice-versa). U.S. Pat. No. 9,149,343 ("the '343 Patent") discloses an example of such an instrument that is specific in its design to restore posterior teeth. The instrument disclosed therein has a curved wedge body and a matrix that is fixed to the wedge body. The wedge body has a bow shape that completely bends the x-axis (or length axis), and the matrix has a first bow shape along the x-axis and a second bow shape along the y-axis (perpendicular to the x-axis). The wedge body and the matrix band are thus shaped to wrap around the radius of a posterior tooth to be restored in a manner that properly seals the cavitation during the restoration process, which in turn reduces excess resin material, thereby reducing finishing time and preventing the negative consequences (e.g., stains, accumulation of excess plaque) associated with excess resin material, which not only causes early restoration failure but may also lead to gingival inflammation. However, while this said posterior instrument is well-suited for facilitating the restoration of posterior teeth, the instrument cannot be used to facilitate satisfactory restoration of anterior teeth. Because of the instrument's entirely bow shaped x-axis, the wedge body and the matrix will not be properly positioned relative to an anterior tooth (to be restored), which is narrower, has a less convex contour, and has a smaller radius than posterior teeth. Additionally, the shape, size, and contour of the metal matrix band fixed to the wedge are not suitable to produce a valid restoration in the anterior region. This is due to the differently shaped contact points between anterior and posterior teeth. Posterior teeth contact one another in a shape that resembles an oval, with the long portion in the x-axis and the shorter portion in the y-axis. Anterior teeth, with their different shapes and orientation in the oral cavity, have contacts that resemble an oval, but perpendicular to those of posterior teeth, where the long portion lies in the y-axis and the shorter portion lies in the x-axis. As such, the wedge body and the matrix from this posterior—focused system will not create the necessary contact points between the anterior tooth to be restored and a tooth adjacent thereto, and would instead only produce excess resin material associated with the negative consequences described above, and create an unconscionable amount of finishing and refinement necessary to create a restoration falling within the standards of care.

Moreover, existing products and instruments that are used in restoration procedures are generally designed and equipped to facilitate restoration of posterior teeth, as patients are generally more prone to needing restoration to their posterior teeth. Additionally, some existing products that are used in restoration procedures to both posterior and anterior teeth have shortcomings. Further, designs of existing posterior matrix systems have shortcomings.

Accordingly, there is an opportunity for advanced products and instruments, including dental wedges and matrix bands, that are better designed and more suited for restoration procedures to both posterior and anterior teeth.

SUMMARY

In accordance with a first exemplary aspect of the present invention, a wedge system is provided for use in a dental restoration procedure for a posterior tooth. The wedge system includes a first wedge including a handle portion, a body portion coupled to and extending outward from the handle portion, a first arm extending from the body portion, a second arm extending from the body portion, and a gap formed between the first arm and the second arm. The body portion is adapted to be disposed in an approximal space between the posterior tooth and a tooth adjacent the posterior tooth.

In accordance with a second exemplary aspect of the present invention, a wedge system is provided for use in a dental restoration procedure for a posterior tooth. The wedge system includes a first wedge adapted to be disposed in an approximal space between the posterior tooth and a tooth adjacent the posterior tooth. The first wedge includes a body portion, a first arm extending from the body portion, a second arm extending from the body portion, and a gap formed between the first arm and the second arm. The first wedge also includes a first rib arranged on an inner surface of the first arm, and a second rib arranged on an inner surface of the second arm, wherein each of the first and second ribs is adapted to engage tissue defining the approximal space.

BRIEF DESCRIPTION OF THE FIGURES

FIG. 1C is a section view of the compule of FIG. 1A.
FIG. 1D is a detailed view of a section of the compule of FIG. 1A.
FIG. 1E is a side view of the compule of FIG. 1A.
FIG. 2A depicts a perspective view of an example compule that can be used in a dental restoration procedure.
FIG. 2B is a top view of the compule of FIG. 2A.
FIG. 2C is a section view of the compule of FIG. 2A.
FIG. 2D is a side view of the compule of FIG. 2A.
FIG. 3A depicts a perspective view of an example compule that can be used in a dental restoration procedure.
FIG. 3B is a top view of the compule of FIG. 3A.
FIG. 3C is a section view of the compule of FIG. 3A.
FIG. 3D is a side view of the compule of FIG. 3A.
FIG. 4I is a front view of a matrix band of the wedge of FIG. 4A.
FIG. 4J is a cross-sectional view taken along line J-J in FIG. 4I.
FIG. 4K is a top view of FIG. 4I.
FIG. 4M illustrates an additional matrix band that can be positioned in the approximal space contact with the adjacent anterior tooth while the wedge of FIG. 4A is positioned between the anterior tooth to be restored and the adjacent anterior tooth, thereby allowing for a dental restoration procedure to be simultaneously performed for both the anterior tooth and the adjacent anterior tooth.

FIG. 5A depicts a perspective view of another example of a wedge that can be used in a dental restoration procedure for an anterior tooth.
FIG. 5B is a top view of the wedge of FIG. 5A.
FIG. 5C is a front view of the wedge of FIG. 5A.
FIG. 6A depicts a perspective view of one example of a wedge that can be used in a dental restoration procedure for a posterior tooth.
FIG. 6B is a top view of the wedge of FIG. 6A.
FIG. 6C is a front view of the wedge of FIG. 6A.
FIG. 6D is a bottom view of the wedge of FIG. 6A.
FIG. 6E is an end view of the wedge of FIG. 6A.
FIG. 6N depicts a perspective view of one example of a wedge that can be used in combination with the wedge of FIG. 6A in a dental restoration procedure for a posterior tooth.
FIG. 6O is a front view of the wedge of FIG. 6N.
FIG. 6P is a top view of the wedge of FIG. 6N.
FIG. 6Q is an end view of the wedge of FIG. 6N.
FIG. 6S is a side view of FIG. 6R.
FIG. 7E is a perspective view of a body portion and a handle portion of the wedge of FIG. 7A;
FIG. 7F is a front view of FIG. 7E.
FIG. 7G is a top view of FIG. 7E.
FIG. 7H is an end view of FIG. 7E.
FIG. 7N is a chart detailing the different radii of curvature measured at the different horizontal and vertical planes depicted in FIG. 7M.

FIG. 9E is a top view of a body portion and a handle portion of the first wedge of FIG. 9A.

FIG. 9F is a front view of FIG. 9E.

FIG. 9G is an end view of FIG. 9E.

FIG. 9H is a perspective view of a matrix band of the first wedge of FIG. 9A.

FIG. 9I is a front view of the matrix band of FIG. 9H.

FIG. 9J is a side view of the matrix band of FIG. 9H.

FIG. 9K is a top view of the matrix band of FIG. 9H.

FIG. 9L depicts a perspective view of one example of a second wedge of the wedge system that can be used in combination with the first wedge of FIG. 9A in a dental restoration procedure for a posterior tooth.

FIG. 9M is a cross-sectional view of the second wedge of FIG. 9L.

FIG. 9N is a top view of the wedge of FIG. 9M.

FIG. 9R is a chart detailing the different radii of curvature measured at the different horizontal and vertical planes depicted in FIGS. 9O-9Q.

DETAILED DESCRIPTION

The present disclosure provides improved compules, wedges, matrix bands, and wedge systems that may be used in dental restoration procedures.

FIGS. 1A-1G, 2A-2D, and 3A-3E depict various views of various designs of example compules having different shapes and sizes, where the compules may be used in restoration procedures to anterior and posterior teeth. Generally, the compules may be one solid unit or multiple connected portions. The compules may be composed of various metallic or plastic materials, or combinations thereof. Additionally, the compules may be configured to receive and retain a composite material to be used in dental restoration procedures, such as any hybrid or nano composite material. It should be appreciated that the values and parameters for the dimensions of the compules as described herein are merely examples, and that alternative dimensions and parameters, or ranges of dimensions and parameters, are envisioned.

Figure 1A:
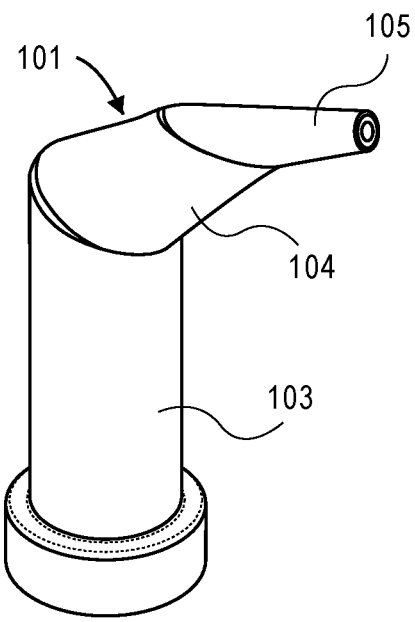
FIG. 1A depicts a perspective view of an example compule that can be used in a dental restoration procedure.

FIGS. 1A-1G depict various views of a compule 101 having a segmented nozzle. FIG. 1A depicts a perspective view of the compule 101, where the compule 101 may include an angled end or arm that includes two (2) distinct segments that extend at different angles from a main body portion 103. Generally, a secondary body portion 104 may extend from the main body portion 103 at a first angle, and a tertiary body portion 105 may extend from the secondary body portion 104 at a second angle relative to the main body portion 103.

Figure 1B:
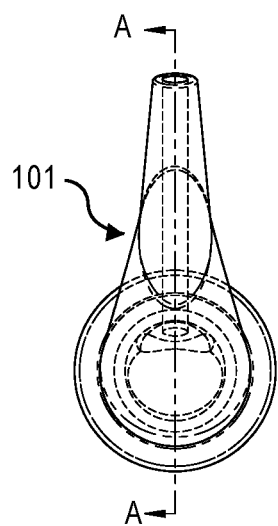
FIG. 1B is a top view of the compule of FIG. 1A.

FIG. 1B depicts a top view of the compule 101, where FIG. 1B depicts a section line "A" that corresponds to a section view of the compule 101 illustrated in FIG. 1C. As illustrated in FIG. 1C, the main body portion 103 of the compule 101 may include a main cavity 106 that extends therethrough, from an opening 108 to about where the secondary body portion 104 connects to the main body portion 103. The main cavity 106 may connect to a secondary cavity 107 that extends through the secondary body portion 104 and the tertiary body portion 105, where the secondary cavity 107 may extend from the main cavity 106 through an opening 109 or tip of the tertiary body portion 105. In use, a composite material may be loaded into the opening 108, where the cavities 106, 107 may direct the composite material through the compule 101 so that the composite material may exit the compule 101 through the opening 109.

FIG. 1C depicts a section line "C" that corresponds to a view of a tip 102 and the opening 109 of the compule 101 illustrated in FIG. 1D. The opening 109 may be circle-shaped or oval-shaped and may have two dimensions having various values: a "c" diameter and a "d" diameter. According to some embodiments, the "c" diameter may have a value ranging from 0.60-1.40 mm; and the "d" diameter may have a value ranging from 0.85-1.65 mm.

FIG. 1E illustrates a side view of the compule 101, where the main body portion 103 and the tertiary body portion 105 may have an angle "a" therebetween. In an embodiment, the angle "a" may be approximately 110 degrees, however alternative angles are envisioned (e.g., any angle between 90 and 130 degrees).

Figure 1G:
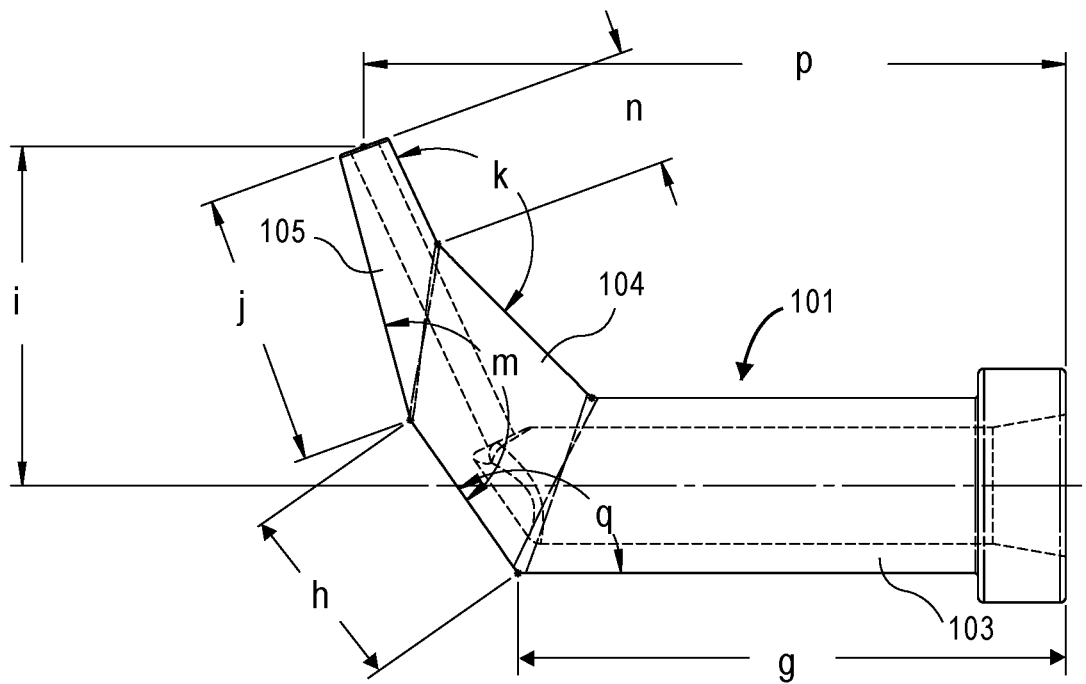
FIG. 1G is a side view of the compule of FIG. 1A.
Figure 1F:
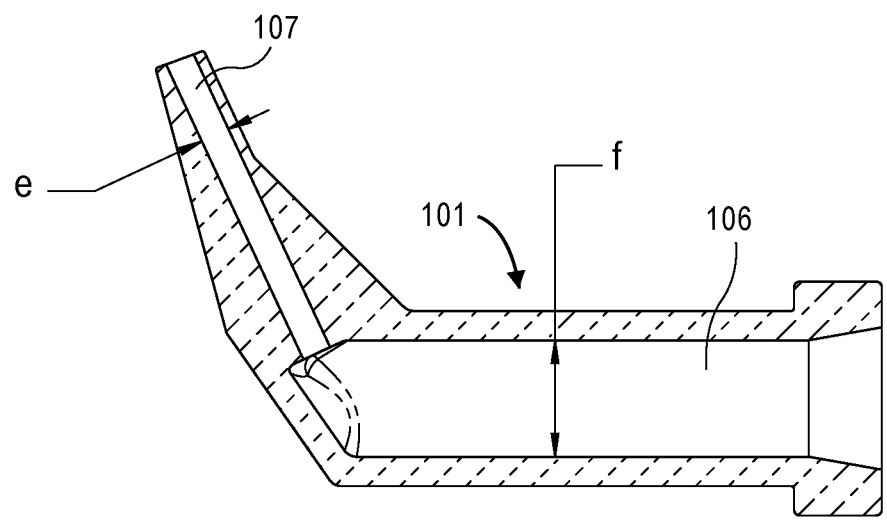
FIG. 1F is a section view of the compule of FIG. 1A.

FIG. 1F illustrates a cross-section view of the compule 101 and the cavities 106, 107, where the cavity 106 may have a width dimension "f" and the cavity 107 may have a width dimension "e". In an embodiment, the width dimension "f" may be approximately 4.0 mm, however alternative dimensions are envisioned (e.g., any dimension between 3.0 and 5.0 mm); and the width dimension "e" may be approximately 1.0 mm, however alternative dimensions are envisioned (e.g., any dimension between 0.5 and 2.0 mm).

FIG. 1G depicts a side view of the compule 101. As illustrated in FIG. 1G, the compule 101 and its body portions 103, 104, 105 may have dimensions "g", "h", "i", "j", "k", "m", "n", "p", and "q" having various values. In particular, the dimension "g" may range from 17.0-21.0 mm; the dimension "h" may range from 5.5-7.5 mm; the dimension "i" may range from 10.5-12.5 mm; the dimension "j" may range from 8.5-10.5 mm; the dimension "k" may range from 145-175 degrees; the dimension "m" may range from 145-175 degrees; the dimension "n" may range from 3.0-5.0 mm; the dimension "p" may range from 22.0-26.0 mm; and the dimension "q" may range from 110-140 degrees.

FIGS. 2A-2D depict various views of another compule 201 having a segmented nozzle. FIG. 2A depicts a perspective view of the compule 201, where the compule 201 may include an angled end or arm that includes two (2) distinct segments that extend at different angles from a main body portion 203. Generally, a secondary body portion 204 may extend from the main body portion 203 at a first angle, and a tertiary body portion 205 may extend from the secondary body portion 204 at a second angle relative to the main body portion 203.

FIG. 2B depicts a top view of the compule 201, where FIG. 2B depicts a section line "A" that corresponds to a section view of the compule 201 illustrated in FIG. 2C. As illustrated in FIG. 2C, the main body portion 203 of the compule 201 may include a main cavity 206 that extends therethrough, from an opening 208 to about where the secondary body portion 204 connects to the main body portion 203. The main cavity 206 may connect to a secondary cavity 207 that extends through the secondary body portion 204 and the tertiary body portion 205, where the secondary cavity 207 may extend from the main cavity 206 through an opening 209 or tip of the tertiary body portion 205. In use, a composite material may be loaded into the opening 208, where the cavities 206, 207 may direct the composite material through the compule 201 so that the composite material may exit the compule 201 through the opening 209.

The opening 209 may be circle-shaped and may have a diameter "a" that corresponds to the width of the secondary cavity 207. According to embodiments, the diameter "a" may range from 0.75-1.75 mm. Similarly, the main cavity 206 may have a width "b" that may range from 3.0-5.0 mm. In embodiments, the opening 209 may be oval-shaped, in which case the opening 209 may have two different diameter dimensions. For example, a first diameter dimension may range from 0.75-1.75 mm and a second diameter dimension may range from 0.50-1.50 mm.

FIG. 2D depicts a side view of the compule 201. As illustrated in FIG. 2D, the compule 201 and its body portions 203, 204, 205 may have dimensions "c" and "d" having various values. In particular, the dimension "c" may range from 10.0-13.0 mm, and the dimension "d" may range from 22.0-26.0 mm.

Figure 3E:
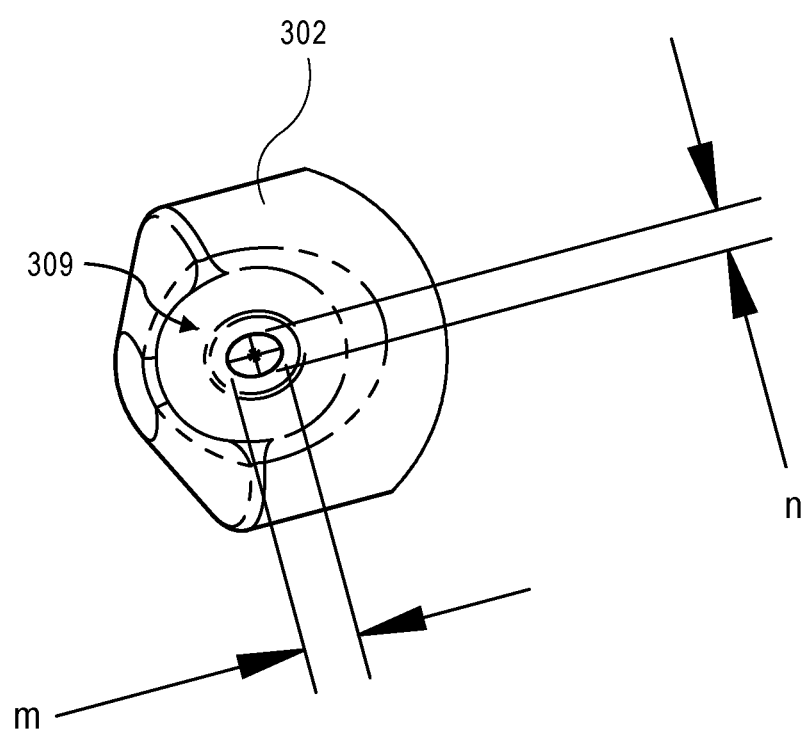
FIG. 3E is a detailed view of a section of the compule of FIG. 3A.

FIGS. 3A-3E depict various views of a compule 301 having a segmented nozzle. FIG. 3A depicts a perspective view of the compule 301, where the compule 301 may include a secondary body portion 304 that extends at an angle from a main body portion 303.

FIG. 3B depicts a top view of the compule 301, where FIG. 3B depicts a section line "A" that corresponds to a section view of the compule 301 illustrated in FIG. 3C. As illustrated in FIG. 3C, the main body portion 303 of the compule 301 may include a main cavity 306 that extends therethrough, from an opening 308 to about where the secondary body portion 304 connects to the main body portion 303. The main cavity 306 may connect to a secondary cavity 307 that extends through the secondary body portion 304, where the secondary cavity 307 may extend from the main cavity 306 through an opening 309 or tip of the secondary body portion 304. In use, a composite material may be loaded into the opening 308, where the cavities 306, 307 may direct the composite material through the compule 301 so that the composite material may exit the compule 301 through the opening 309.

FIG. 3C further indicates a width dimension "a" of the cavity 307 and a width dimension "b" of the cavity 306. In an embodiment, the width dimension "b" may be approximately 4.0 mm, however alternative dimensions are envisioned (e.g., any dimension between 3.0 and 5.0 mm); and the width dimension "a" may be approximately 1.0 mm, however alternative dimensions are envisioned (e.g., any dimension between 0.5 and 2.0 mm).

FIG. 3D depicts a side view of the compule 301. As illustrated in FIG. 3D, the compule 301 and its body portions 303, 304 may have dimensions "c", "d", "e", "f", "g", "h", "i", "j", and "k" having various values. In particular, the dimension "c" may range from 2.0-4.0 mm; the dimension "d" may range from 19.0-23.0 mm; the dimension "e" may range from 9.5-13.5 mm; the dimension "f" may range from 0.75-2.0 mm; the dimension "g" may range from 1.5-2.5 mm; the dimension "h" may be an angle associated with the secondary body portion 304, and may range from 5-20 degrees; the dimension "i" may be an angle between the main body portion 303 and the secondary body portion 304, and may range from 95-120 degrees; the dimension "j" may range from 4.5-7.5 mm; and the dimension "k" may range from 6.0-10.0 mm.

FIG. 3E depicts a view of a tip 302 and the opening 309 of the compule 301. The opening 309 may be circle-shaped or oval-shaped and may have two dimensions having various values: an "m" diameter and an "n" diameter. According to some embodiments, the "m" diameter may have a value ranging from 1.0-2.0 mm; and the "n" diameter may have a value ranging from 0.75-1.5 mm.

FIGS. 4A-4K depict one example of a wedge 400 that is specifically designed for use in a dental restoration procedure for an anterior tooth. More particularly, the wedge 400 is adapted to be disposed in an approximal space between the anterior tooth to be restored and a tooth adjacent the anterior tooth (the adjacent tooth may also be an anterior tooth). The wedge 400 generally includes a handle portion 402, a body portion 404 that is coupled to (e.g., integrally formed with) and extends outward from the handle portion 402, and a matrix band 406 coupled to the body portion 404. As will be described in greater detail below, when the wedge 400 is disposed in the approximal space, the body portion 404 and the matrix band 406 intimately contact the anterior tooth to be repaired in a manner that seals a cavity of the anterior tooth while substantially approximating the adjacent tooth. Thus, the body portion 404 and the matrix band 406 not only reduce, if not prevent, excess material, thereby reducing finishing time and reducing the failure rate of the dental restoration procedure, but also facilitate the creation of contact points between the anterior tooth and the adjacent tooth, which are desired.

The handle portion 402 generally allows a dentist to grasp the wedge 400 for the purpose of positioning the wedge 400 in or removing the wedge 400 from the approximal space. The handle portion 402 may have the shape illustrated in FIGS. 4A-4F, or may have any other suitable shape. The handle portion 402 extends from a first end 408 to a second end 410 along a handle axis 412. In other words, the handle portion 402 has a length $L_h$ defined between the first end 408 and the second end 410. In this example, the length $L_h$ is equal to approximately 3.5 mm. In other examples, however, the length $L_h$ can be greater than or less than 3.5 mm. The handle portion 402 also has a height $H_h$ defined between a top side 414 and a bottom side 416 (i.e., perpendicular to the handle axis 412). In this example, the height $H_h$ is equal to approximately 2 mm, though in other examples, the height $H_h$ can be greater than or less than 2 mm.

Figure 4A:
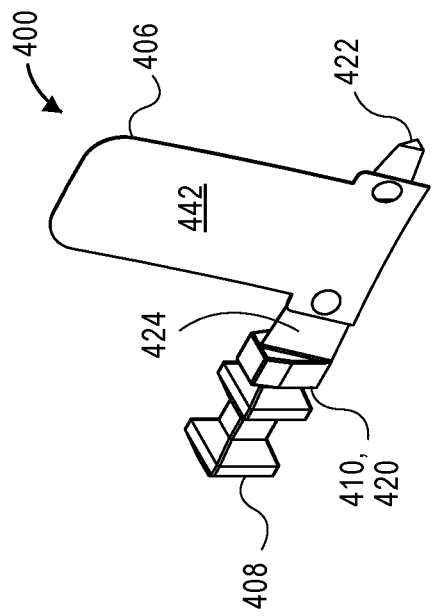
FIG. 4A depicts a perspective view of one example of a wedge that can be used in a dental restoration procedure for an anterior tooth.
Figure 4D:
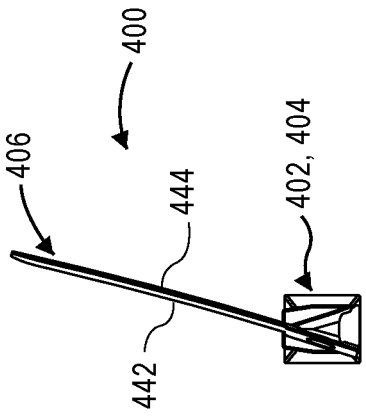
FIG. 4D is an end view of the wedge of FIG. 4A.
Figure 4C:
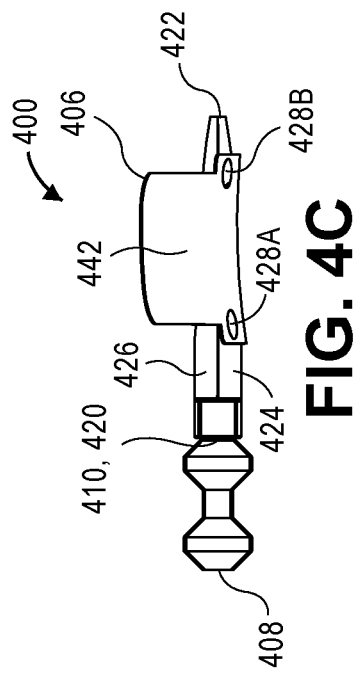
FIG. 4C is a top view of the wedge of FIG. 4A.
Figure 4B:
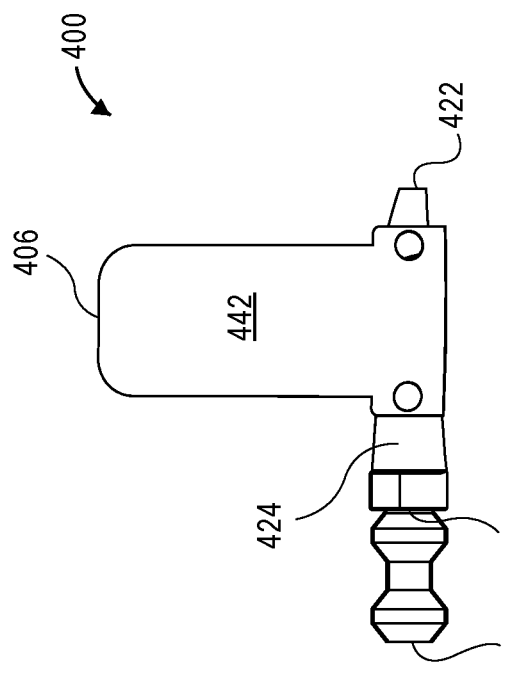
FIG. 4B is a front view of the wedge of FIG. 4A.
Figure 4E:
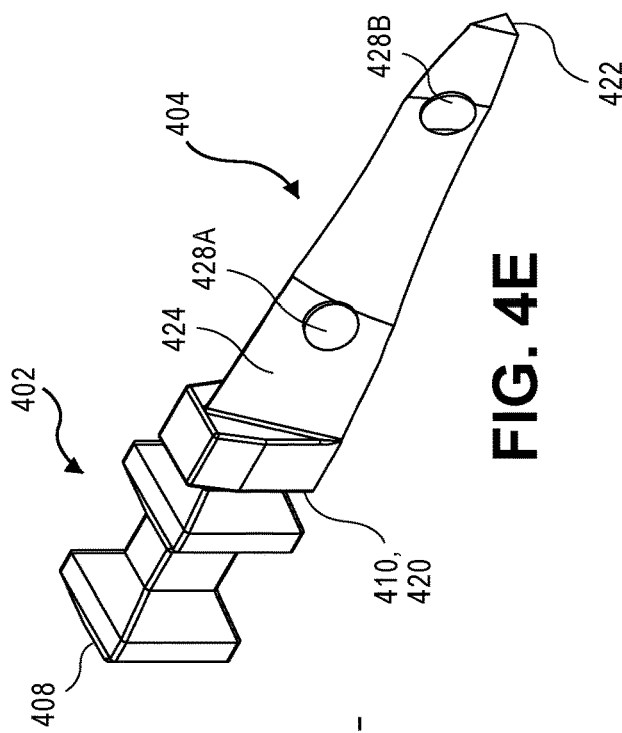
FIG. 4E is a perspective view of a body portion and a handle portion of the wedge of FIG. 4A.
Figure 4H:
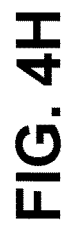
FIG. 4H is an end view of FIG. 4E.
Figure 4G:
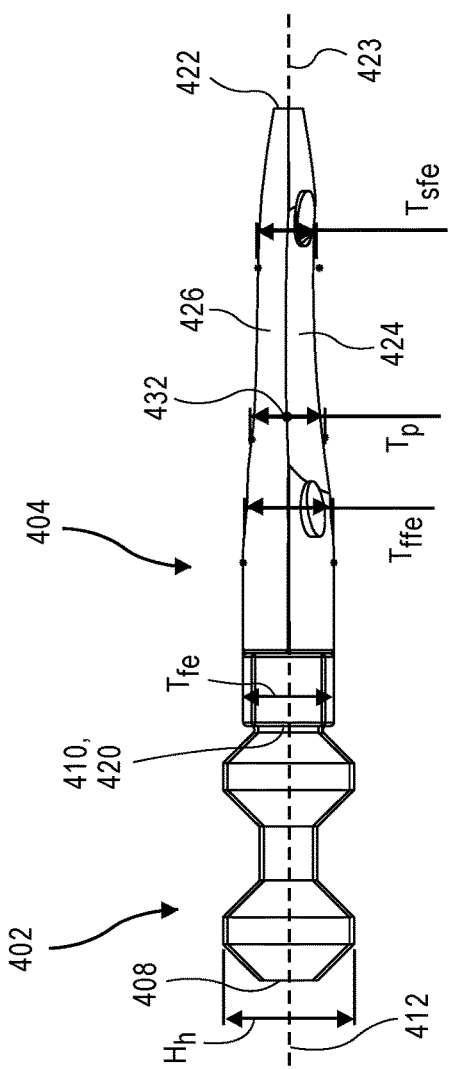
FIG. 4G is a top view of FIG. 4E.
Figure 4F:
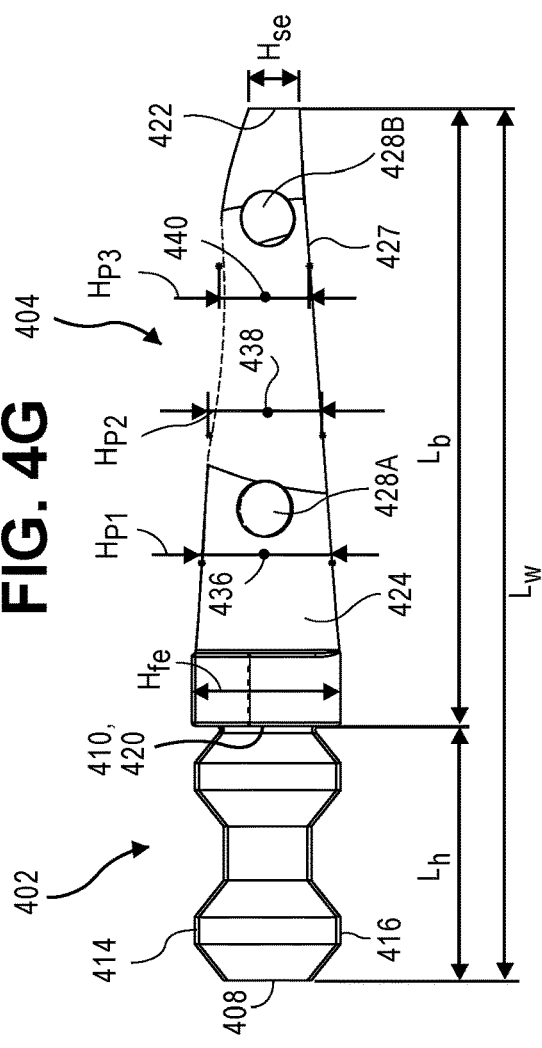
FIG. 4F is a front view of FIG. 4E.

The body portion 404 is generally configured to substantially fill the approximal space between the anterior tooth and the adjacent tooth and position the matrix band 406 in the desired position. As best illustrated in FIG. 4G, the body portion 404 in this example extends from a first end 420, positioned immediately adjacent the handle portion 402, to a second end 422, remote from the handle portion 402, along a body axis 423 that is parallel to and co-axial with the handle axis 412. In other words, the body portion 404 is linear (or substantially linear). As best illustrated in FIGS. 4E-4F, the body portion 404 in this example has a substantially triangular shape defined by a substantially triangular front surface 424, a substantially triangular rear surface 426 opposite the front surface 424, and a substantially triangular bottom surface 427 that connects the front and rear surfaces 424, 426. It will be appreciated that the front surface 424, which is partially curved and partially flat, will face the anterior tooth to be restored, and the rear surface 426, which is substantially flat, will face the adjacent tooth when the body portion 404 is disposed in the approximal space.

The body portion 404 also includes first and second fastening elements 428A, 428B that securely retain the matrix band 406 thereon. In this example, the fastening elements 428A, 428B each take the form of a circular projection that extends outward from the front surface 424. In other examples, however, the body portion 404 may only include one fastening element, may include more than two fastening elements, or may include none at all (e.g., the body portion 404 may instead include one or more apertures sized to receive one or more fasteners to secure the matrix band 406 to the body portion 404).

As best illustrated in FIG. 4F, the body portion 404 has a length $L_b$ defined between the first end 420 and the second end 422 and along the body axis 423. In this example, the length $L_b$ is equal to approximately 8.5 mm, such that the total length $L_w$ of the wedge 400 is equal to approximately 12 mm. In other examples, however, the length $L_b$ can be greater than or less than 8.5 mm, with the total length $L_w$ of the wedge 400 being greater than or less than approximately 12 mm (e.g., the total length $L_w$ can be in a range of between 8 mm and 14 mm). In any case, the body portion 404 has a thickness, defined herein as the distance between the front and rear surfaces 424, 426, that decreases, slightly increases, and then further decreases as the body portion 404 extends from the first end 420 to the second end 422. In this example, the thickness $T_{fe}$ at the first end 420 is equal to approximately 1.25 mm, the thickness $T_{ffe}$ at the first fastening element 428A is equal to approximately 1.25 mm, the thickness $T_p$ at a point 432 located between the first and second fastening elements 428A, 428B is equal to approximately 1.01 mm, and the thickness $T_{sfe}$ at the second fastening element 428B is equal to approximately 0.84 mm. In other examples, however, these thickness values may vary. As an example, the thickness $T_{fe}$ may be greater than approximately 1.25 mm but less than approximately 2.5 mm. The body portion 404 also has a height that decreases or tapers as the body portion 404 extends from the first end 420 to the second end 422, such that the bottom of the body portion 404 is angled relative to the horizontal (see FIG. 4F), which may help to position the wedge 400 within the approximal space. In this example, the height $H_{fe}$ at the first end 420 is equal to approximately 2 mm, the height $H_{p1}$ at a first point 436 between the first end 420 and the first fastening element 428A is equal to approximately 1.79 mm, the height $H_{p2}$ at a second point 438 between the first and second elements 428A, 428B is equal to approximately 1.55 mm, the height $H_{p3}$ at a third point 440 between the first and second elements 428A, 428B is equal to approximately 1.17 mm, and the height $H_{se}$ at the second end 422 is equal to approximately 0.70 mm. In other examples, however, these height values may vary. As an example, the height $H_{p1}$ may be any value greater than approximately 1.25 mm and less than 3.0 mm, and the height $H_{p3}$ may be any value greater than approximately 0.75 mm and less than approximately 2.0 mm.

As a result of the foregoing, the body portion 404 has or defines a localized curve. Stated differently, only part of the body portion 404 is curved, with the remainder of the body portion 404 being flat. In this example, the localized curve is defined between the first and second fastening elements 428A, 428B, with the result that the only part of the body portion 404 that is curved is located between the first and second fastening elements 428A, 428B. In other examples, however, the localized curve can be defined between different points along the body portion 404.

As illustrated in FIGS. 4I-4J, the matrix band 406 has a thin profile that is defined by a front surface 442, a rear surface 444 opposite the front surface 442, and a thickness $T_m$ between the front and rear surfaces 442, 444. The front surface 442 is arranged to face (and engage) the anterior tooth to be restored, while the rear surface 444 is arranged to face the tooth adjacent the anterior tooth to be restored, when the wedge 400 is in use. As also illustrated in FIGS. 4I-4J, the matrix band 406 generally extends from a first end 450 to a second end 452 along a height axis 454 and generally extends from a first side 456 to a second side 458 along a length axis 460. As best illustrated in FIG. 4J, the matrix band 406 has a slight, gradual, and smooth concave curvature along and away from the height axis 454. As best illustrated in FIG. 4K, the matrix band 406 has a slight, gradual, and smooth concave curvature along the length axis 460. In this example, the matrix band 406 may have a radius of curvature of 21 mm, though in other examples, the radius of curvature can be any value in a range of between 17 mm and 25 mm. Thus, it will be appreciated that portions of the matrix band 406 between the first and second sides 456, 458 are slightly offset from the length axis 460.

The matrix band 406 has a base 462 and an arm 464 that is coupled to (e.g., integrally formed with) and extends outward (upward, in FIG. 4I) from the base 462. The base 462 has a substantially rectangular shape defined by the first end 450, a shoulder 466 that connects the base 462 to the arm 464, and the first and second sides 456, 458, which connect the first end 450 and the shoulder 458. The base 462 thus has a height $H_{mb}$ that is defined between the first end 450 and the shoulder 466, and a length $L_{mb}$ that is defined between the first and second sides 456, 458. The arm 464 also has a substantially rectangular shape defined by the second end 452, the shoulder 466, and the first and second sides 456, 458. The arm 464 thus has a height $H_{ma}$ that is defined between the second end 452 and the shoulder 466, and a length $L_{ma}$ that is defined between the first and second sides 456, 458. As best illustrated in FIG. 4I, the length $L_{mb}$ of the base 462 is greater than the length $L_{ma}$ of the arm 464, such that the length $L_{mb}$ of the base 462 defines the length $L_m$ of the matrix band 406 itself. Meanwhile, the height $H_m$ of the matrix band 406 is defined by the sum of the height $H_{mb}$ of the base 462 and the height $H_{ma}$ of the arm 464.

It will be appreciated from FIG. 4I that the height $H_m$ of the matrix band 406 is greater than the length $L_m$ of the matrix band 406. In other words, the matrix band 406 has a incisal-gingival dimension and a buccal-lingual dimension that is smaller than the incisal-gingival dimension. The height $H_m$ of the matrix band 406 is preferably in a range between approximately 7 mm and approximately 12 mm, while the length $L_m$ of the matrix band 406 is preferably in a range between approximately 3.5 mm and approximately 5.5 mm. Thus, in some examples, the height $H_m$ of the matrix band 406 may be at least twice as large as the length $L_m$ of the matrix band. In this example, the height $H_m$ of the matrix band 406 is 9.5 mm, and the length $L_m$ of the matrix band 406 is 5 mm (with the length $L_{ma}$ of the arm 464 being 4 mm). It will also be appreciated from FIGS. 4I and 4J that the thickness $T_m$ of the matrix band 406 is considerably smaller than the height $H_m$ and the length $L_m$ of the matrix band 406. In this example, the thickness $T_m$ is equal to 0.05 mm, though the thickness $T_m$ can vary between approximately 0.025 mm and approximately 0.05 mm.

With the body portion 404 and the matrix band 406 so dimensioned, the body portion 404 is configured to engage, retain, and support the matrix band 406. More particularly, the localized curvature of the body portion 404 allows the matrix band 406 to maintain a matching curvature. This localized curvature of both the body portion 404 and the matrix band 406 further allows the wedge 400 to engage with the convex surface of the anterior tooth to be restored when inserted into the approximal space. The matrix band 406 is coupled to the body portion 404 so that the rear surface 444 of the matrix band 406 faces, and at least partially contacts, the front surface 424 of the body portion 404. In this example, the matrix band 406 is coupled to the body portion 404 via the first and second fastening elements 428A, 428B, which are received in first and second similarly shaped apertures 472, 474, respectively, formed in the rear surface 444 of the matrix band 406. In this example, the distance between the apertures 472, 474 is approximately equal to the length of the arm 464 of the matrix band 406, though this need not be the case. The fastening elements 428A, 428B may be secured therein in any known manner. In other examples, the matrix band 406 may be coupled to the body portion 404 via one fastening element, more than two fastening elements, or in some other manner. In any case, when the matrix band 406 is coupled to the body portion 404, as shown in FIGS. 4A-4D, the height axis 454 is angled relative to the body axis 423. As an example, the height axis 454 be may oriented at an angle of between 75 degrees and 90 degrees relative to the body axis 423.

Figure 4L:
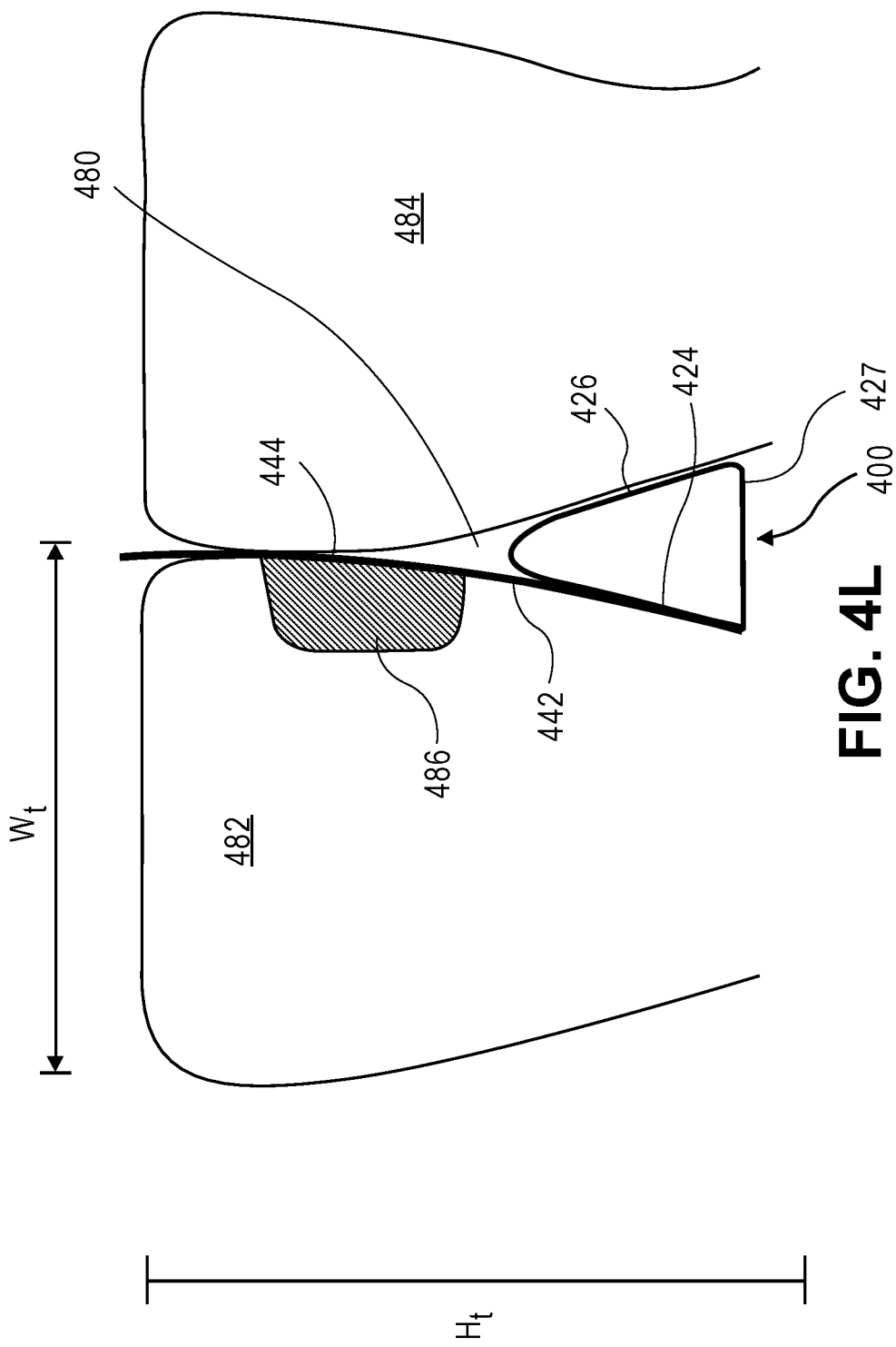
FIG. 4L illustrates the wedge of FIG. 4A positioned in an approximal space between the anterior tooth to be restored and an adjacent anterior tooth.

So constructed, the wedge 400 is specifically designed for use in a dental restoration procedure (e.g., a filling) for an anterior tooth. When it is desired to perform such a dental restoration procedure, the wedge 400 is disposed within an approximal space 480 between an anterior tooth to be restored 482 and an anterior tooth 484 adjacent the anterior tooth to be restored 482, as illustrated in FIG. 4L. The teeth 482, 484 are anterior teeth because each tooth has a buccal-lingual width $W_t$ and a clinical crown height $H_t$ that is greater than the width $W_t$. The wedge 400 is disposed within the approximal space 480 so that the front surface 424 of the body portion 404 and the front surface 442 of the matrix band 406 are facing the anterior tooth to be restored 482, which has a cavity 486 that is adapted to receive a filling during the restoration process. On the other hand, the rear surface 426 of the body portion 404 and the rear surface 444 of the matrix band 406 face the adjacent anterior tooth 484.

When the wedge 400 is so disposed in the approximal space 480, the body portion 404 substantially fills the approximal space 480, and the matrix band 406 contacts the anterior tooth 482, as illustrated in FIG. 4L. More particularly, the front surface 442 of the matrix band 406 contacts the anterior tooth 482, with substantially all of the front surface 442 of the matrix band 406 contacting the anterior tooth 482. Beneficially, because the matrix band 406 has a concave curvature, and the cavity 486 to be filled is convex, the front surface 442 of the matrix band 406 flushly and tightly interlocks with the anterior tooth 482 to be restored. The curvature of the matrix band 406 also properly shapes the contour of the restoration by closely matching or approximating the contours to the natural contours of the anterior tooth to be restored. Furthermore, the curvature of the matrix band 406 allows the matrix band 406 to seal the cavity 486 of the anterior tooth 482, allowing the dentist to fill the cavity 486 while reducing, if not preventing, excess material, but also helps to secure the wedge 400 within the approximal space 480, thereby preventing the wedge 400 from moving from this position while the anterior tooth 482 is being restored. At the same time, the wedge 400, by virtue of its substantially linear shape, will extend linearly through the approximal space 480, such that the wedge will not wrap around the anterior tooth to be restored 482 in a manner that limits the dentist from accessing the cavity 486, as is the case with known products and instruments. Instead, the dentist will have substantially 360 degree access to the cavity 486 during the restoration process.

These technical benefits provided by the wedge 400 are not reachable using any of the existing products and instruments, e.g., the instrument disclosed in the '343 Patent. First, the instrument disclosed in the '343 Patent will not allow for this intimate tooth-matrix band relationship on an anterior tooth. This is due to the fact that the bow shape of the instrument disclosed therein has a much larger radius than the localized curvature of the body portion 404 and matrix band 406. The larger radius of the instrument of the '343 Patent is well-suited for posterior teeth, which have larger radii, while the smaller radii of the body portion 404 and the matrix band 406 makes the wedge 400 well-suited for the smaller radii of anterior teeth. Additionally, in the '343 Patent, the matrix band has a diameter that is greater than its height, is attached to the long bow x-axis, and is bowl shaped, so that the matrix band is not well-suited for restoration of anterior teeth. Furthermore, the instrument disclosed in the '343 Patent, if placed in an approximal space in an anterior region, would not allow 360 degree access as the bow shape of the x-axis of the wedge body and metal band would significantly affect the dentist's vision of working field as well as his/her ability to access the cavitation 486.

An unexpected benefit of the wedge 400 is that the wedge 400 can be utilized in connection with a matrix band 490, substantially similar or identical to the matrix band 406, to allow the dentist to perform a dental restoration procedure on two adjacent anterior teeth that both need to be restored at substantially the same time (i.e., without having to reposition the wedge 400), as illustrated in, for example, FIG. 4M. When the dentist desires to perform a dental restoration procedure on each of two adjacent anterior teeth, e.g., the teeth 480, 482 illustrated in FIG. 4L, the matrix band 490 is first disposed in the approximal space (e.g., approximal space 480) so that a front facing surface 492 of the matrix band 490 contacts one of the teeth to be restored (in this example, the tooth 482). In turn, the wedge 400 can be disposed in the approximal space so that the matrix band 406 of the wedge 400 contacts the other of the teeth to be restored (in this example, the tooth 482). Doing so not only positions the matrix band 406 in the proper position, but also guides the matrix band 490 to its proper position (if not there already) and then securely retains the matrix band 490 in the proper position. With the matrix band 406 in the proper position relative to one of the teeth to be restored and the matrix band 490 in the proper position relative to the other of the teeth to be restored, the dentist can carry out dental restoration procedures on both of the adjacent teeth at substantially the same time.

It will be appreciated that the wedge 400 can be made of one or more suitable materials. In many examples, the handle portion 402 and the body portion 404 will be made of a first material (e.g., wood, a thermoplastic polymer such as polypropylene) and the matrix band 406 will be made of a second material (e.g., metal such as stainless steel, plastic) different from the first material. In other examples, however, the handle portion 402, the body portion 404, and the matrix band 406 may be made of the same material (e.g., a plastic).

Moreover, it will also be appreciated that each anterior tooth has a right side and a left side, which requires that the wedge-band relationship also have a right configuration and a left configuration, respectively. The wedge 400 illustrated in FIGS. 4A-4K is specifically designed as a right-handed wedge for restoring a respective right side of anterior teeth in a human patient's mouth. FIGS. 5A-5C illustrate another example of a wedge 500 that is a mirror image of the wedge 400, such that the wedge 500 is specifically designed for use as a left-handed wedge for restoring a respective left side of anterior teeth in the human patient's mouth.

FIGS. 6A-6Q depict one example of a wedge system 600 that is specifically designed for use in a dental restoration procedure for a posterior tooth. The wedge system 600 in this example includes a pair of wedges—a first wedge 602 and a second wedge 604 that cooperates with the first wedge 602. However, it will be appreciated that the wedge system 600 may, in other examples, only include the first wedge 602. In other words, the wedge system 600 need not include the second wedge 604.

The first wedge 602 is adapted to be disposed in an approximal space between the posterior tooth to be restored and a tooth adjacent the posterior tooth to be restored (the adjacent tooth may also be a posterior tooth), while the second wedge 604 is adapted to be disposed between portions of the first wedge 602 to facilitate proper positioning of the first wedge 602. The first wedge 602 generally includes a handle portion 606, a base element 607 coupled to the handle portion 606, a pair of arms 608A, 608B that are coupled to (e.g., integrally formed with) and extend outward from the base element 606, and a matrix band 610 coupled to the arm 608A. The second wedge 604, meanwhile, includes a handle portion 612 and a body portion 614 that is coupled to (e.g., integrally formed with) and extends outward from the handle portion 612. As will be described in greater detail below, when the first wedge 600 is disposed in the approximal space, the arm 608A and the matrix band 610 are positioned proximate the posterior tooth to be restored and the arm 604B is positioned proximate the adjacent tooth. When the body portion 614 of the second wedge 604 is disposed between portions of the first wedge 602 (in this case, the arms 608A, 608B), the arms 608A, 608B are driven outward, away from one another. The arm 608A, and the matrix band 610 coupled thereto, are forced into intimate contact with the posterior tooth to be repaired, such that a cavity of the posterior tooth to be repaired is sealed while substantially approximating the adjacent tooth. The arm 608B is forced into intimate contact with the adjacent tooth, thereby securely retaining the first wedge 602 in the approximal space. Furthermore, this bi-directional force created by inserting of the second wedge 604 into the first wedge 602 allows the tooth to be restored to be slightly separated from the adjacent tooth. This controlled, slight separation is imperative in creating a proper proximal contact between the restored tooth and the adjacent tooth once the entire system 600 has been removed following the restoration procedure. Thus, the wedge system 600 not only reduces, if not prevents, excess material, thereby reducing finishing time and reducing the failure rate of the dental restoration procedure, but also facilitates the creation of contact points between the posterior tooth and the adjacent tooth, which are desired.

The handle portion 606 of the first wedge 602 generally allows a dentist to grasp the first wedge 602 for the purpose of positioning the wedge 602 in or removing the wedge 602 from the approximal space. The handle portion 606 may have the shape illustrated in FIGS. 6A-6H, or may have any other suitable shape. The handle portion 606 extends from a first end 618 to a second end 620 along a handle axis 622. In other words, the handle portion 606 has a length $L_{h2}$ defined between the first end 618 and the second end 620. In this example, the length $L_{h2}$ is equal to approximately 3.5 mm. In other examples, however, the length $L_{h2}$ can be greater than or less than 3.5 mm. The handle portion 606 also has a height $H_{h2}$ defined between a top side 624 and a bottom side 626 (i.e., perpendicular to the handle axis 622). In this example, the height $H_{h2}$ is equal to approximately 2 mm, though in other examples, the height $H_{h2}$ can be greater than or less than 2 mm.

Figure 6F:
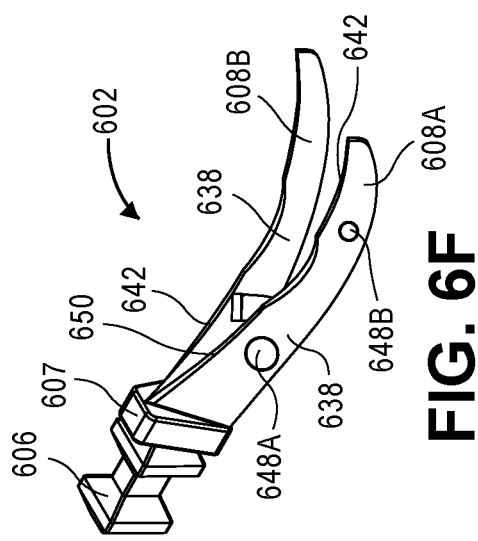
FIG. 6F is a perspective view of a body portion and a handle portion of the wedge of FIG. 6A.
Figure 6I:
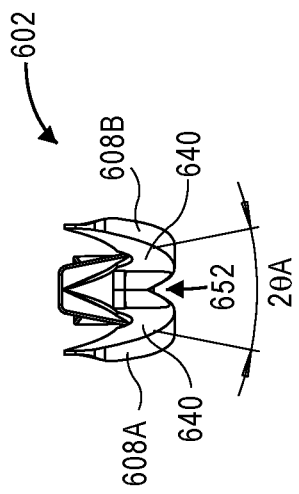
FIG. 6I is an end view of FIG. 6F.
Figure 6G:
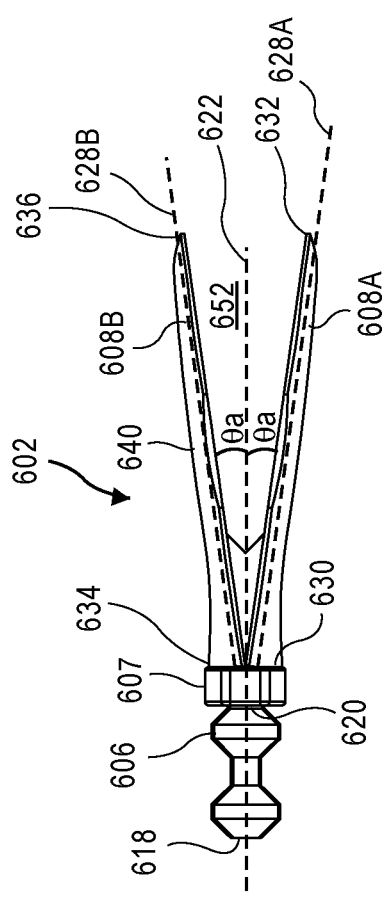
FIG. 6G is a top view of FIG. 6F.
Figure 6H:
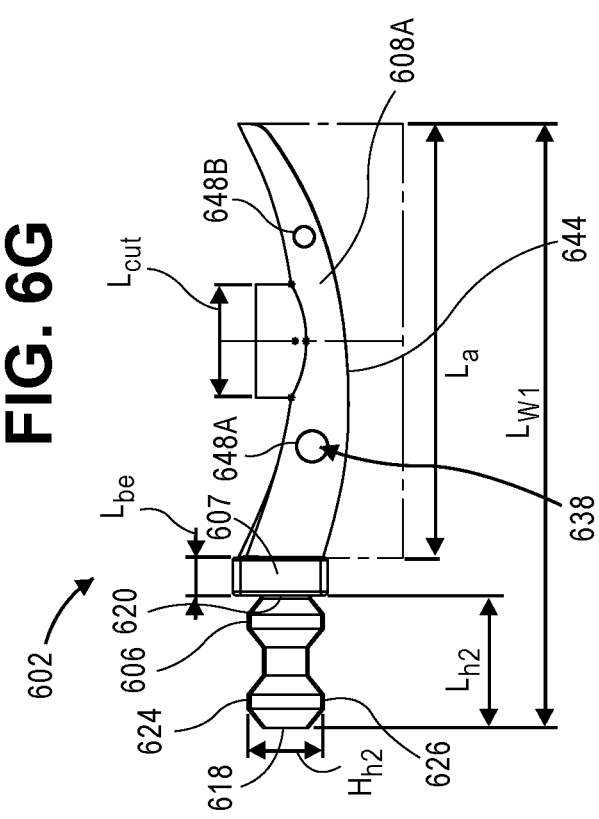
FIG. 6H is a front view of FIG. 6F.

As best illustrated in FIGS. 6F-6H, the base element 607 has a substantially rectangular shape, and the arms 608A, 608B extend outward from the base element 607 along arm axes 628A, 628B, respectively, each oriented at an angle $\theta_a$ relative to the handle axis 622. In this example, the angle $\theta_a$ is equal to approximately 13 degrees, such that the arms 608A, 608B, which extend outward in different directions, are approximately 26 degrees apart from one another. In other examples, however, this angle $\theta_a$ can be a different value between approximately 10 degrees and approximately 15 degrees. More particularly, the arm 608A extends from a first end 630, positioned immediately adjacent the base element 607, to a second end 632, remote from the base element 607, along the arm axis 628A, while the arm 608B extends from a first end 634, positioned immediately adjacent the base element 607 and the first end 630 of the arm 608A, to a second end 636, remote from the base element 607, along the arm axis 628B. It will be appreciated that the distance between the arms 608A, 608B increases as the arms 608A, 608B extend from their respective first ends 630, 634 to their respective second ends 632, 636. It will therefore also be appreciated that the distance between the arms 608A, 608B at their respective ends 632, 636 is greater than a width of both the handle portion 606 and the base element 607.

As best illustrated in FIGS. 6F-6I, the arms 608A, 608B are identical in shape and size. Each of the arms 608A, 608B has a substantially triangular, two-shape defined by a substantially triangular front surface 638, a substantially triangular rear surface 640 opposite the front surface 638, and top and bottom surfaces 642, 644 connecting the front and rear surfaces 638, 640. It will be appreciated that the front surfaces 638 of arms 608A, 608B will face the posterior tooth to be restored, and the rear surfaces 640 of arms 608A, 608B will face the posterior tooth when the first wedge 602 is disposed in the approximal space.

The first wedge 602 also includes first and second fastening elements 648A, 648B arranged on one of the arms 608A, 608B (arm 608A, in this case) to securely retain the matrix band 610 thereon. In this example, the fastening elements 648A, 648B each take the form of a circular projection that extends outward from the front surface 638 of the arm 608A. In other examples, however, the first wedge 602 may only include one fastening element, may include more than two fastening elements, may instead include one or more fastening elements on the arm 608B, or may include none at all (e.g., one of the arms 608A, 608B may instead include one or more apertures sized to receive one or more fasteners to secure the matrix band 610 to one of the arms 608A, 608B).

As best illustrated in FIG. 6H, the arm 608A has a length $L_a$ defined between the first end 630 and the second end 632 and along the arm axis 628A. The length $L_a$ is preferably in a range of between approximately 7.5 mm and approximately 13 mm, with the total length $L_{w1}$ of the first wedge 602 in a range of between approximately 12 mm and approximately 18 mm. In this example, the length $L_a$ is equal to approximately 11.5 mm, and the base element 607 has a length $L_{be}$ equal to approximately 1 mm, such that the total length $L_{w1}$ of the first wedge 602 is equal to approximately 16 mm. In other examples, however, the length $L_a$ can be greater than or less than 11.5 mm, with the total length $L_{w1}$ of the wedge 602 being greater than or less than approximately 16 mm. In any case, the arm 608A in this example has a thickness, defined herein as the distance between the front and rear surfaces 638, 640, that slightly decreases as the arm 608A extends from the first end 630 to the second end 632, as illustrated in FIG. 6G. In other examples, however, the arm 608A may have a constant thickness or may taper to a greater degree than what is shown in FIG. 6H.

As also best illustrated in FIG. 6H, the arm 608A has a height, defined herein as the distance between the top and bottom surfaces 642, 644, that decreases or tapers as the arm 608A extends from the first end 630 to the second end 632. FIG. 6H also illustrates that the arm 608A curves downward before curving upward again as the arm 608A extends from the first end 630 to the second end 632. In this example, the arm 608A curves upward to a greater degree than it curves downward, such that a central point of the second end 632 is positioned further upward than a central point of the first end 630. Additionally, a cutout 648 is formed in the arm 608A along the top surface 642. In this example, the cutout 648 is a circular cutout and has a length $L_{cut}$ that is equal to 3 mm. In other examples, however, the cutout can have a different shape and/or size. As an example, the length $L_{cut}$ can be greater than or less than 3 mm.

In the interest of brevity, the preceding two paragraphs only discuss features of the arm 608A. However, because the arm 608B is identical in shape and size to the arm 608B, it will be appreciated that the arm 608B has the same features. In other words, the arm 608B has a length, height, and curvature that is identical to the arm 608B.

As illustrated in FIGS. 6G-6I, the first wedge 602 also includes a wing 650 that is arranged between the base element 607 and the arms 608A, 608B to help keep the arms 608A, 608B a desired distance from one another. The wing 650 has a curvature that generally matches the curvature of the arms 608A, 608B. More particularly, the wing 650 extends downward from the base element 650 and along a portion of the top surface 644 of each of the arms 608A, 608B, as best illustrated in FIGS. 6F and 6I. Thus, like the arms 608A, 608B, the wing 650 in this example also has a substantially triangular shape. In other examples, however, the wing 650 can have a different shape and/or size.

Additionally, the first wedge 650 includes a gap 652 that is formed or defined between the arms 608A, 608B, and, at least in this example, the wing 650. The gap 652 is generally sized to receive the second wedge 604, particularly the body portion 614 of the second wedge 604, as will be discussed in greater detail below. And because the distance between the arms 608A, 608B increases as the arms 608A, 608B extend from their respective first ends 630, 634 to their respective second ends 632, 636, the size of the gap 652 also increases as the arms 608A, 608B extend from their respective first ends 630, 634 to their respective second ends 632, 636.

Figure 6J:
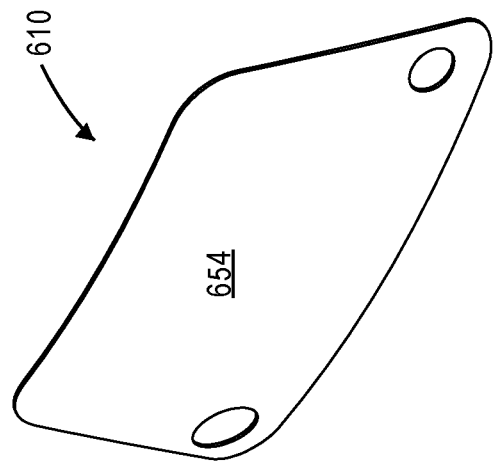
FIG. 6J is a perspective view of a matrix band of the wedge of FIG. 6A.
Figure 6L:
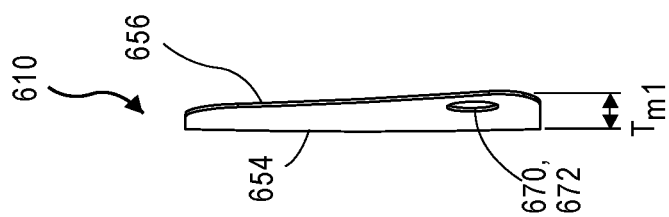
FIG. 6L is a side view of the matrix band of FIG. 6J.
Figure 6K:
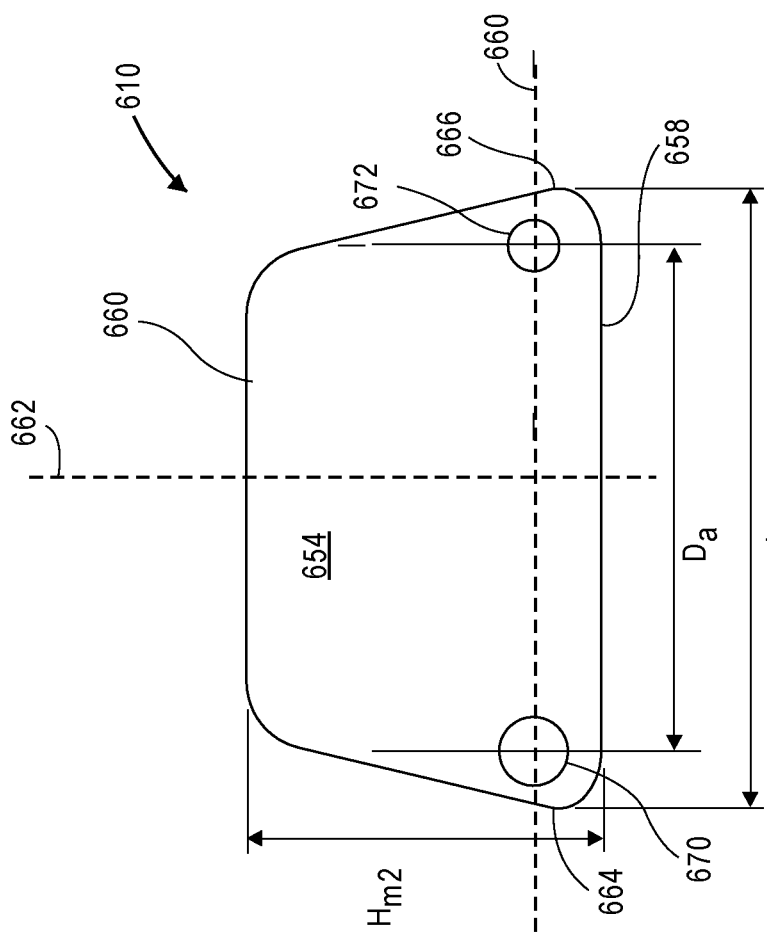
FIG. 6K is a front view of the matrix band of FIG. 6J.
Figure 6M:
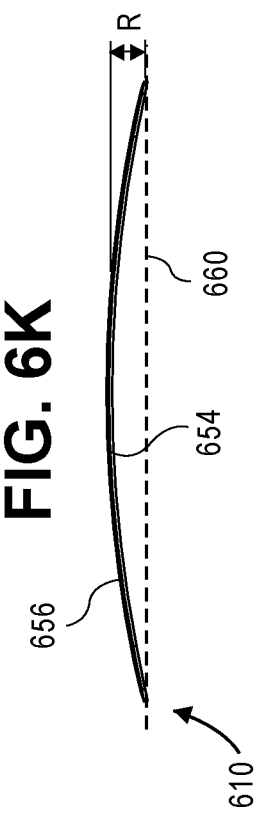
FIG. 6M is a top view of the matrix band of FIG. 6J.

As illustrated in FIGS. 6J-6M, the matrix band 610 of the first wedge 602 has a thin, substantially trapezoidal profile that is defined by a front surface 654, a rear surface 656 opposite the front surface 654, and a thickness $T_{m1}$ between the front and rear surfaces 654, 656. The front surface 654 is arranged to face (and engage) the posterior tooth to be restored, while the rear surface 656 is arranged to face the tooth adjacent the posterior tooth to be restored, when the first wedge 602 is in use. As also illustrated in FIGS. 6J-6M, the matrix band 610 generally extends from a first end 658 to a second end 660 along a height axis 662 and generally extends from a first side 664 to a second side 666 along a length axis 668. As best illustrated in FIG. 6L, the matrix band 610 has a slight, gradual, and smooth concave curvature along and away from the height axis 662. As best illustrated in FIG. 6M, the matrix band 610 has a slight, gradual, and smooth concave curvature along the length axis 668. In this example, the matrix band 610 has a radius of curvature R of 40 mm, though in other examples, the radius of curvature R can be any value in a range of between 32 mm and 48 mm. In any case, it will be appreciated that portions of the matrix band 610 between the first and second sides 664.666 are slightly offset from the length axis 668.

It will be appreciated from FIGS. 6J and 6K that the matrix band 610 has a height $H_{m2}$ and a length $L_{m2}$ that is greater than the height $H_{m2}$. In other words, the matrix band 610 has a incisal-gingival dimension and a buccal-lingual dimension that is larger than the incisal-gingival dimension. The height $H_{m2}$ of the matrix band 610 is preferably in a range between approximately 3 mm and approximately 6.5 mm, while the length $L_{m2}$ of the matrix band 610 is preferably in a range between approximately 4.5 mm and approximately 11 mm. Thus, in some examples, the length $L_{m2}$ of the matrix band 610 may be at least twice as large as the height $H_{m2}$ of the matrix band 610. In this example, the height $H_m$ of the matrix band 610 is 5 mm, and the length $L_m$ of the matrix band 610 is 9 mm. It will also be appreciated from FIGS. 6K and 6L that the thickness $T_{m2}$ of the matrix band 610 is considerably smaller than the height $H_{m2}$ and the length $L_{m2}$ of the matrix band 610. In this example, the thickness $T_{m2}$ is equal to 0.05 mm, though the thickness $T_{m2}$ can vary between approximately 0.025 mm and approximately 0.05 mm.

With the arms 608A, 608B and the matrix band 610 so dimensioned, the arm 608A is configured to engage, retain, and support the matrix band 610. More particularly, the curvature of the arm 608A allows the matrix band 610 to maintain a matching curvature. This curvature of both the arm 608A and the matrix band 610 further allows the first wedge 602 to engage with the convex surface of the posterior tooth to be restored when inserted into the approximal space and utilized with the second wedge 604. The matrix band 610 is coupled to the arm 608A so that the rear surface 658 of the matrix band 610 faces, and at least partially contacts, the front surface 638 of the arm 608A. In this example, the matrix band 610 is coupled to the arm 608A via the first and second fastening elements 648A, 648B, which are received in first and second similarly shaped apertures 670, 672, respectively, formed in the rear surface 658 of the matrix band 610. In this example, the distance $D_a$ between the apertures 670, 672 is approximately 7.5 mm, though this distance can vary. The fastening elements 648A, 648B may be secured therein in any known manner. In other examples, the matrix band 610 may be coupled to the arm 608A via one fastening element, more than two fastening elements, or in some other manner. In any case, when the matrix band 610 is coupled to the arm 608A, as shown in FIGS. 6A-6E, the height axis 454 is angled relative to both the handle axis 622 and the arm axis 628A.

Turning now to FIGS. 6N-6Q, further details regarding the second wedge 604 will now be described. At the outset, it will be appreciated that the second wedge 604 is substantially similar to the wedge 400, in that the wedge 604 includes the handle portion 612 and the body portion 614, but the wedge 604 does not include a matrix band. The handle portion 612 is identical to the handle portion 402 described above. Thus, in the interest of brevity, the handle portion 612 will not be discussed in further detail. The body portion 614 is similar to the body portion 404 described above, with the exception of the differences discussed below.

First, unlike the body portion 404, which has a substantially triangular shape defined by the surfaces 424, 426, and 427, the body portion 614 has a substantially triangular shape defined by a substantially triangular front surface 724, a substantially triangular rear surface 726 opposite the front surface 724, and a substantially triangular top surface 728 that connects the front and rear surfaces 724, 726. The body portion 614 also has a hollow, V-shaped area 730 defined or formed between the surfaces 724, 726, and 728, as best illustrated in FIG. 6Q. It will be appreciated that the V-shaped area 730 allows the second wedge 604 to effectively act as a biasing element (e.g., a spring) when the second wedge 604 is disposed in the first wedge 602, by driving the arms 608A, 608B outward, toward the desired position.

Second, the dimensions of the body portion 614 vary from the dimensions of the body portion 404. As best illustrated in FIG. 6O, the body portion 404 has a length $L_{b2}$ defined between a first end 720 and a second end 722 and along a body axis 723. In this example, the length $L_{b2}$ is equal to approximately 8.5 mm, such that the total length $L_{w2}$ of the second wedge 604 is equal to approximately 12 mm. In other examples, however, the length $L_{b2}$ can be greater than or less than 8.5 mm, with the total length $L_{w2}$ of the wedge 604 being greater than or less than approximately 12 mm (e.g., the total length $L_{w2}$ can be in a range of between 10 mm and 15 mm). In any case, the body portion 614 has a thickness, defined herein as the distance between the front and rear surfaces 724, 726, that decreases as the body portion 614 extends from the first end 720 to the second end 722. In this example, the thickness $T_{fe2}$ at the first end 720 is equal to approximately 1.25 mm, the thickness $T_{2p}$ at a point 732 located between the first and second ends 720, 722 is equal to approximately 1.15 mm, the thickness $T_{2p2}$ at another point 733 located between the first and second ends 720, 722 is equal to approximately 0.90 mm, and the thickness $T_{se2}$ at the second end 720 is equal to approximately 0.40 mm. In other examples, however, these thickness values may vary. As an example, the thickness $T_{fe2}$ may be greater than approximately 1.25 mm but less than 2.0 mm, the thickness $T_{2p}$ may be greater than approximately 1.15 mm but less than 1.9 mm, and the thickness $T_{2p2}$ may be greater than approximately 0.90 mm but less than 1.65 mm. The body portion 614 also has a height that decreases or tapers as the body portion 614 extends from the first end 720 to the second end 722, such that the bottom of the body portion 614 is angled relative to the horizontal (see FIG. 6O), which may help to position the wedge 604 within the approximal space. In this example, the height $H_{fe2}$ at the first end 720 is equal to approximately 2 mm, the height $H_{2p1}$ at a first point 736 between the first end 720 and the second end 722 is equal to approximately 1.72 mm, and the height $H_{2p2}$ at a second point 738 also between the first and second ends 720, 722 is equal to approximately 1.48 mm. In other examples, however, these height values may vary.

Figure 6R:
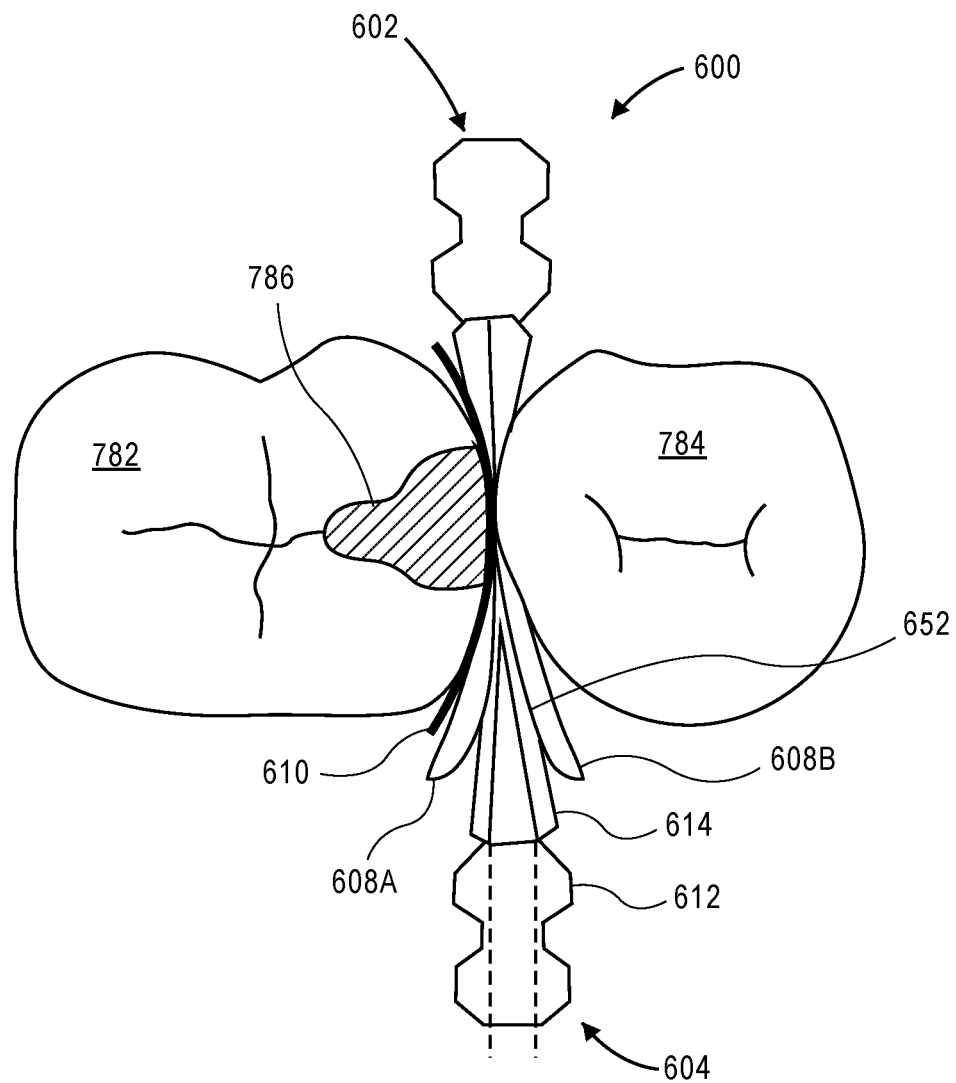
FIG. 6R is a top view showing the wedge of FIG. 6A and the wedge of FIG. 6N positioned in an approximal space between the posterior tooth to be restored and an adjacent posterior tooth.

So constructed, the wedge system 600 is specifically designed for use in a dental restoration procedure (e.g., a filling) for a posterior tooth. When it is desired to perform such a dental restoration procedure, the first wedge 602 is disposed within an approximal space between a posterior tooth to be restored 782 and an posterior tooth 784 adjacent the posterior tooth to be restored 782, as illustrated in FIGS. 6R and 6S. The teeth 782, 784 are posterior teeth because each tooth has a buccal-lingual width $W_t$ and a clinical crown height $H_t$ that is less than or equal to the width $W_t$. The first wedge 602 is disposed within the approximal space so that the front surface 638 of the arm 608A and the front surface 654 of the matrix band 610 are facing the posterior tooth to be restored 782, which has a cavity 786 that is adapted to receive a filling during the restoration process. On the other hand, the rear surface 640 of the arm 608A and the rear surface 656 of the matrix band 610 face the adjacent posterior tooth 784.

Before, after, or at the same time as the first wedge 602 is positioned within the approximal space, the second wedge 604 is positioned within the approximal space. The first and second wedges 602, 604 are positioned so that the second wedge 604 is disposed in the gap 652. More particularly, the body portion 614 of the second wedge 604 is disposed in the gap 652, between the arms 608A, 608B, and below the wing 650, as best illustrated in FIG. 6R. When the second wedge 604 is so positioned, the arms 608A, 608B are driven outward, away from one another, by the body portion 614 (particularly the surfaces 724, 726). The arm 608A and the matrix band 610 are driven into intimate contact with the posterior tooth to be restored 782, while the arm 608B is driven into intimate contact with the adjacent tooth 784. More particularly, the front surface 654 of the matrix band 610 contacts the posterior tooth to be restored 782, with substantially all of the front surface 654 of the matrix band 610 contacting the posterior tooth 782.

Beneficially, because the matrix band 610 has a concave curvature, and the cavity 786 to be filled is convex, the front surface 654 of the matrix band 610 flushly and tightly interlocks with the posterior tooth to be restored 782, as illustrated in FIGS. 6R and 6S. The curvature of the matrix band 610 also properly shapes the contour of the restoration by closely matching or approximating the contours to the natural contours of the posterior tooth to be restored. Furthermore, the curvature of the matrix band 610 allows the matrix band 610 to seal the cavity 786 of the posterior tooth 782, allowing the dentist to fill the cavity 786 while reducing, if not preventing, excess material, but also helps to secure the wedge 602 within the approximal space, thereby preventing the wedge 602 from moving from this position while the posterior tooth 782 is being restored. This is also helped by the fact that the second wedge 604 is disposed in the gap 652 of the first wedge 602.

Moreover, it will also be appreciated that each anterior tooth has a right side and a left side, which requires that the wedge-band relationship also have a right configuration and a left configuration, respectively. The wedge system 600 illustrated in FIGS. 6A-6P is specifically designed as a right-handed wedge for restoring a respective right side of posterior teeth in a human patient's mouth. While not illustrated, it will be appreciated that the wedge system 600 can be inverted so as to be specifically designed for use as a left-handed wedge for restoring a respective left side of posterior teeth in the human patient's mouth.

FIGS. 7A-7L depict another example of a wedge 1700 that is similar to the wedge 400 described above and is specifically designed for use in a dental restoration procedure for an anterior tooth. More particularly, the wedge 1700 is adapted to be disposed in an approximal space between the anterior tooth to be restored and a tooth adjacent the anterior tooth (the adjacent tooth may also be an anterior tooth). The wedge 1700 generally includes a handle portion 1702, a body portion 1704 that is coupled to (e.g., integrally formed with) and extends outward from the handle portion 1702, and a matrix band 1706 coupled to the body portion 1704. As will be described in greater detail below, when the wedge 1700 is disposed in the approximal space, the body portion 1704 and the matrix band 1706 intimately contact the anterior tooth to be repaired in a manner that seals a cavity of the anterior tooth while substantially approximating the adjacent tooth. Thus, the body portion 1704 and the matrix band 1706 not only reduce, if not prevent, excess material, thereby reducing finishing time and reducing the failure rate of the dental restoration procedure, but also facilitate the creation of contact points between the anterior tooth and the adjacent tooth, which are desired.

The handle portion 1702 generally allows a dentist to grasp the wedge 1700 for the purpose of positioning the wedge 1700 in or removing the wedge 1700 from the approximal space. The handle portion 1702 may have the shape illustrated in FIGS. 7A-7G, or may have any other suitable shape. The handle portion 1702 extends from a first end 1708 to a second end 1710 along a handle axis 1712. In other words, the handle portion 1702 has a length $L_h$ defined between the first end 1708 and the second end 1710. In this example, the length $L_h$ is equal to approximately 3.5 mm. In other examples, however, the length $L_h$ can be greater than or less than 3.5 mm. The handle portion 1702 also has a height $H_h$ defined between a top side 1714 and a bottom side 1716 (i.e., perpendicular to the handle axis 1712). In this example, the height $H_h$ is equal to approximately 1.8 mm, though in other examples, the height $H_h$ can be greater than or less than 1.8 mm.

The body portion 1704 is generally configured to substantially fill the approximal space between the anterior tooth and the adjacent tooth and position the matrix band 1706 in the desired position. As best illustrated in FIG. 7G, the body portion 1704 in this example extends from a first end 1720, positioned immediately adjacent the handle portion 1702, to a second end 1722, remote from the handle portion 1702, along a body axis 1723 that is co-axial with the handle axis 1712. In other words, the body portion 1704 is linear (or substantially linear). As best illustrated in FIGS. 7E-7F, the body portion 1704 in this example has a substantially triangular shape defined by a substantially triangular front surface 1724, a substantially triangular rear surface 1726 opposite the front surface 1724, and a substantially triangular bottom surface 1727 that connects the front and rear surfaces 1724, 1726. It will be appreciated that the front surface 1724, which is partially curved and partially flat, will face the anterior tooth to be restored, and the rear surface 1726, which is substantially flat, will face the adjacent tooth when the body portion 1704 is disposed in the approximal space.

The body portion 1704 also includes first and second fastening elements 1728A, 1728B that securely retain the matrix band 1706 thereon. In this example, the fastening elements 1728A, 1728B each take the form of a circular projection that extends outward from the front surface 1724. In other examples, however, the body portion 1704 may only include one fastening element, may include more than two fastening elements, or may include none at all (e.g., the body portion 1704 may instead include one or more apertures sized to receive one or more fasteners to secure the matrix band 1706 to the body portion 1704).

As best illustrated in FIG. 7F, the body portion 1704 has a length $L_b$ defined between the first end 1720 and the second end 1722 and along the body axis 1723. In this example, the length $L_b$ is equal to approximately 8.5 mm, such that the total length $L_w$ of the wedge 1700 is equal to approximately 12 mm. In other examples, however, the length $L_b$ can be greater than or less than 8.5 mm, with the total length $L_w$ of the wedge 1700 being greater than or less than approximately 12 mm (e.g., the total length $L_w$ can be in a range of between 8 mm and 14 mm). In any case, the body portion 1704 has a thickness, defined herein as the distance between the front and rear surfaces 1724, 1726, that decreases, slightly increases, and then further decreases as the body portion 1704 extends from the first end 1720 to the second end 1722. In this example, the thickness $T_{fe}$ proximate the first end 1720 is equal to approximately 1.25 mm, and the thickness $T_{se}$ at the second end 1722 is equal to approximately 0.40 mm. In other examples, however, these thickness values may vary. As an example, the thickness $T_{fe}$ may be greater than approximately 1.25 mm but less than approximately 2.5 mm. The body portion 1704 also has a height that decreases or tapers as the body portion 1704 extends from the first end 1720 to the second end 1722, such that the bottom surface 1727 of the body portion 1704 is angled relative to the horizontal (see FIG. 7F), which may help to position the wedge 1700 within the approximal space. In this example, the height $H_{fe}$ at the first end 1720 is equal to approximately 2 mm, the height $H_{p1}$ at a first point 1736 between the first and second elements 1728A, 1728B is equal to approximately 1.70 mm, the height $H_{p3}$ at a second point 1740 between the second element 1728B and the second end 1722 is equal to approximately 1.2 mm, and the height $H_{se}$ at the second end 1722 is equal to approximately 0.70 mm. In other examples, however, these height values may vary.

As a result of the foregoing, the body portion 1704 has or defines a localized curve. Stated differently, only part of the body portion 1704 is curved, with the remainder of the body portion 1704 being flat. In this example, the localized curve is defined between the first and second fastening elements 1728A, 1728B. In this example, the localized curve has a radius of curvature R of 18 mm. In other examples, however, the localized curve can be defined between different points along the body portion 1704 and/or the radius of curvature R can be any value in a range of between 14 mm and 22 mm.

Figure 7A:
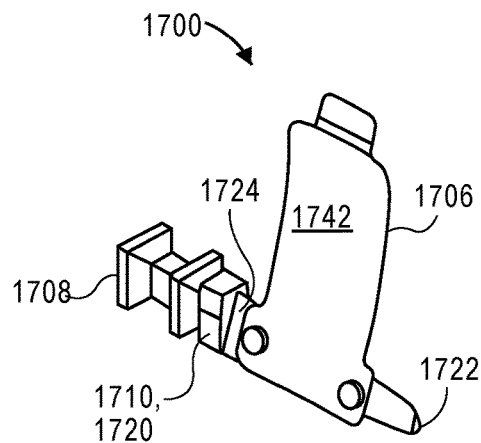
FIG. 7A depicts a perspective view of another example of a wedge that can be used in a dental restoration procedure for an anterior tooth.
Figure 7B:
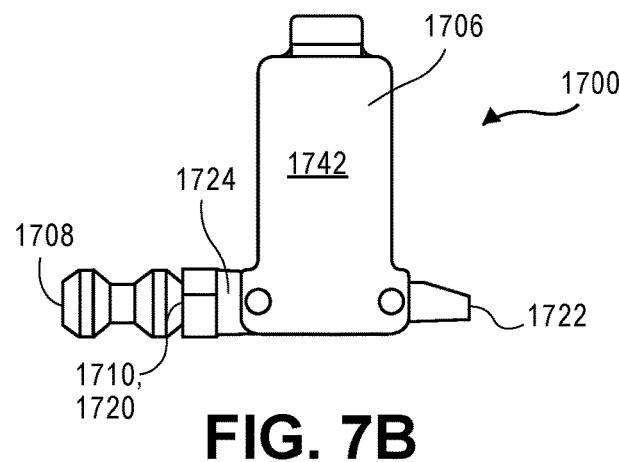
FIG. 7B is a front view of the wedge of FIG. 7A.
Figure 7C:
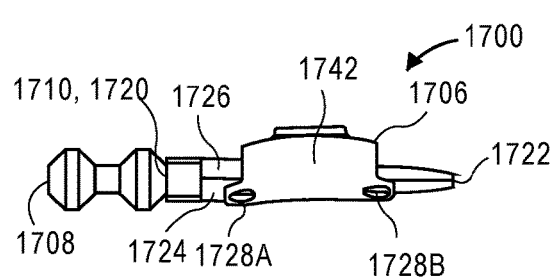
FIG. 7C is a top view of the wedge of FIG. 7A.
Figure 7D:
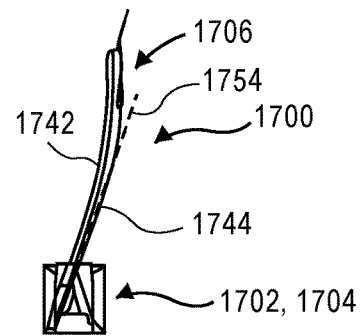
FIG. 7D is an end view of the wedge of FIG. 7A.
Figure 7L:
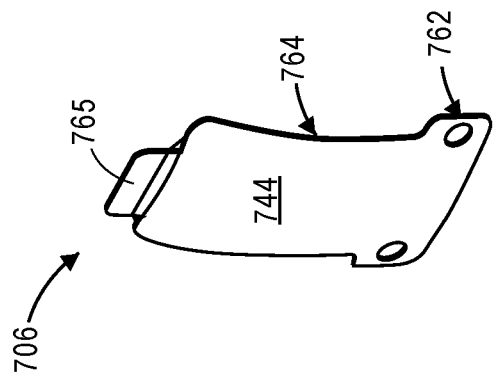
FIG. 7L is a perspective view of FIG. 7I.
Figure 7K:
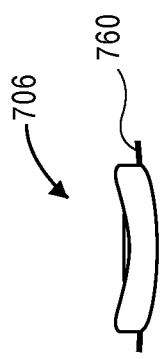
FIG. 7K is a top view of FIG. 7I.
Figure 7I:
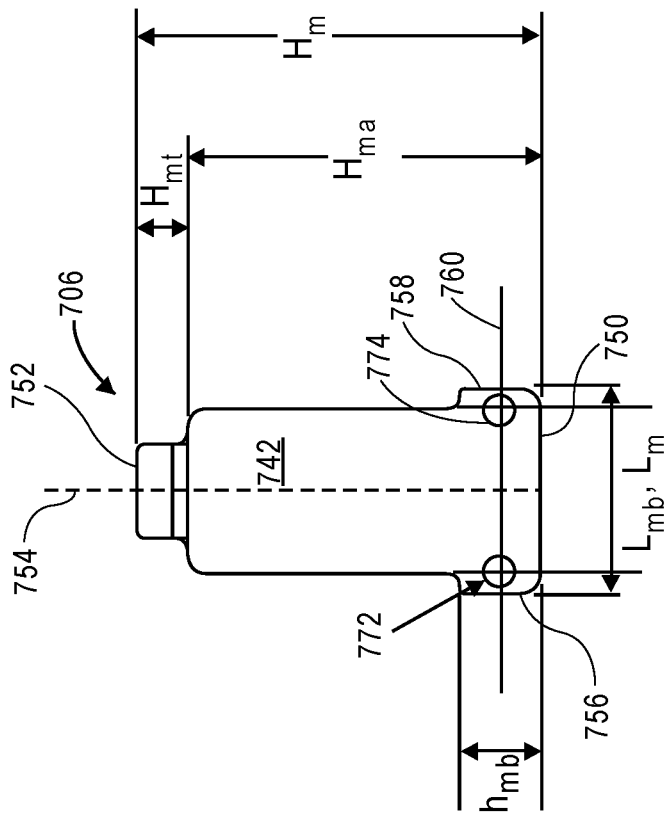
FIG. 7I is a front view of a matrix band of the wedge of FIG. 7A.
Figure 7J:
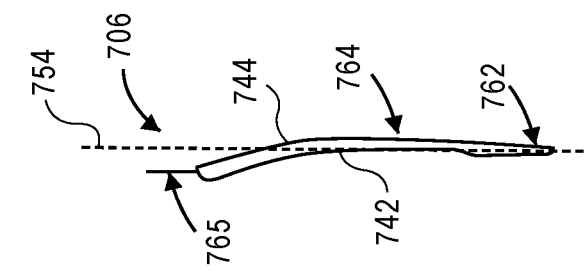
FIG. 7J is a side view of FIG. 7I.
Figure 7M:
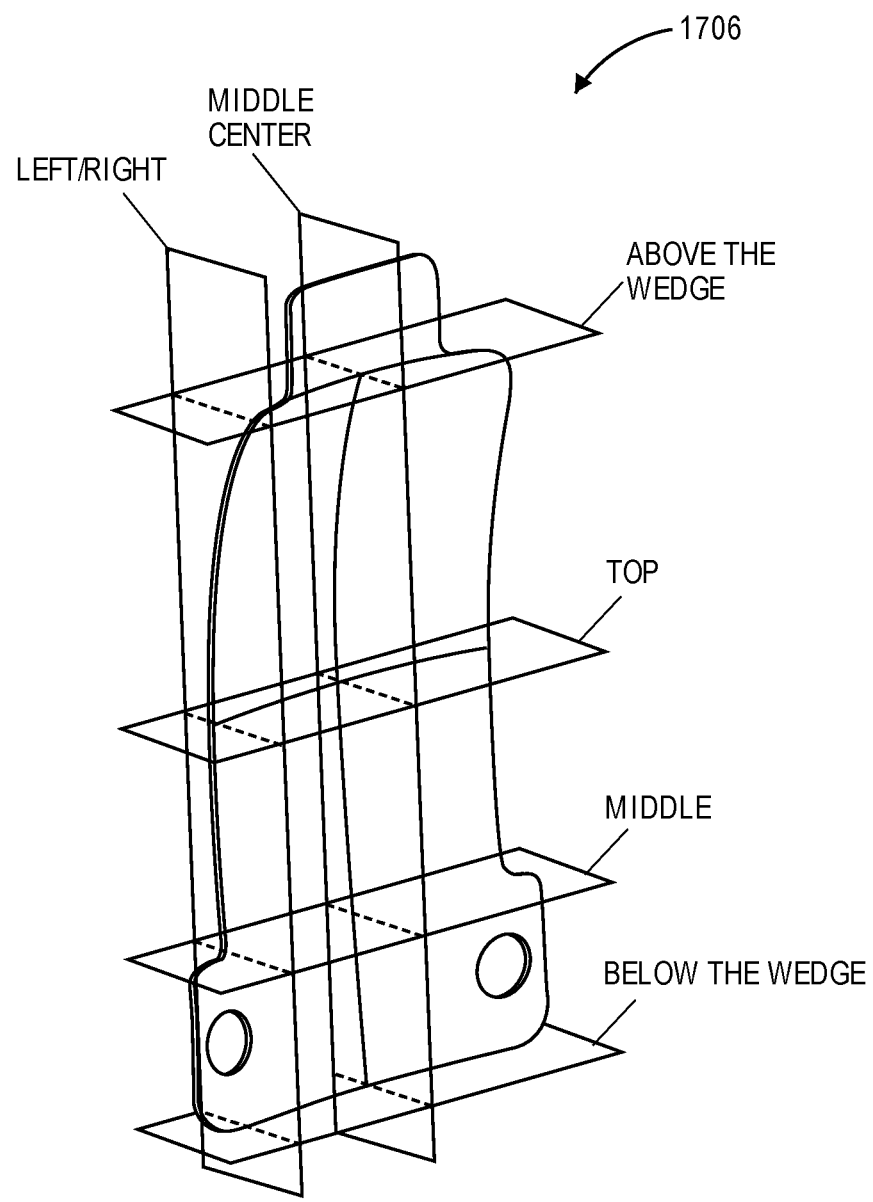
FIG. 7M depicts a plurality of different horizontal and vertical planes through or proximate the matrix band of FIGS. 7I-7L.
Figure 8A:
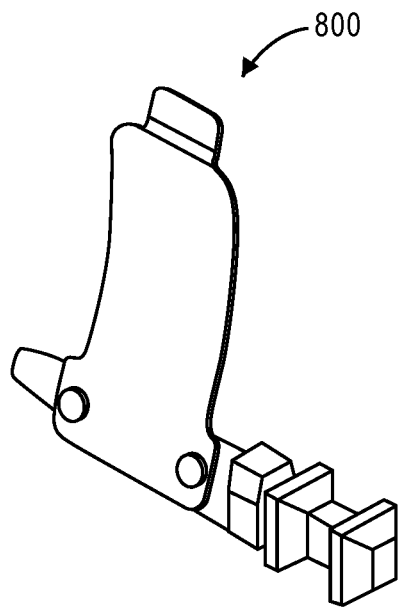
FIG. 8A depicts a perspective view of another example of a wedge that can be used in a dental restoration procedure for an anterior tooth.
Figure 8B:
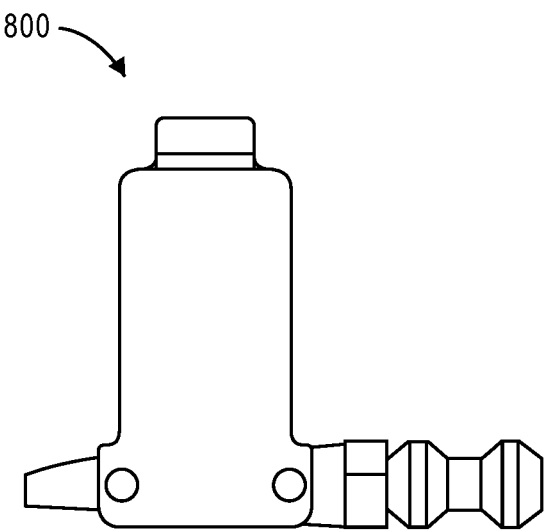
FIG. 8B is a front view of the wedge of FIG. 8A.
Figure 8C:
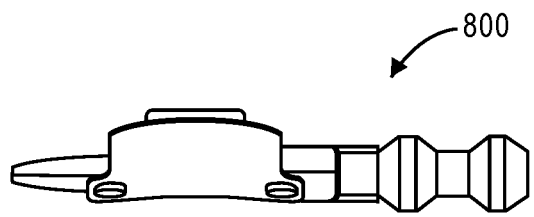
FIG. 8C is a top view of the wedge of FIG. 8A.
Figure 8D:
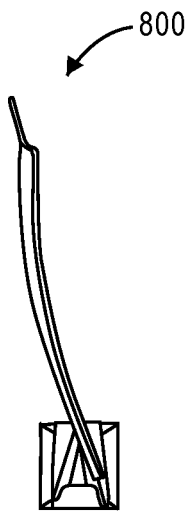
FIG. 8D is an end view of the wedge of FIG. 8A.

As illustrated in FIGS. 7I-7L, the matrix band 1706 has a thin profile that is defined by a front surface 1742, a rear surface 1744 opposite the front surface 1742, and a thickness between the front and rear surfaces 1742, 1744. The front surface 1742 is arranged to face (and engage) the anterior tooth to be restored, while the rear surface 1744 is arranged to face the tooth adjacent the anterior tooth to be restored, when the wedge 1700 is in use. As also illustrated in FIGS. 7I-7L, the matrix band 1706 generally extends from a first end 1750 to a second end 1752 along a height axis 1754 and generally extends from a first side 1756 to a second side 1758 along a length axis 1760. The matrix band 1706 is specifically designed to have a curvature that (i) closely approximates the tooth to be restored, thereby sealing the edges to prevent excess filling material from escaping, (ii) properly and firmly contacts the adjacent tooth (adjacent to the tooth to be restored), thereby ensuring an adequate proximal contact between the tooth to be restored and the adjacent tooth when restoration is completed, and (iii) provides a level of stability by pressing the matrix band 1706 back against the tooth being restored. Thus, the matrix band 1706 has a slight, gradual, and smooth concave curvature along and away from the height axis 1754 (see FIG. 7J), and a slight, gradual, and smooth concave curvature along the length axis 1760 (see FIG. 7K), and a thickness that increases as the matrix band 1706 extends from the first end 1750 to the second end 1752 (see FIG. 7J), such that portions of the matrix band 1706 between the first and second sides 1756, 1758 are slightly offset from the length axis 1760. In this example, the matrix band 1706 has a plurality of different radii of curvature measured at a number of different horizontal and vertical planes through or proximate the matrix band 1706, with FIG. 7M illustrating the different horizontal and vertical planes, and FIG. 7N providing a chart detailing the different radii of curvature (measured in mm) at those different planes. Of course, in other examples, the curvature of the matrix band 1706 can vary such that one or more of these different radii of curvature vary from the values listed in the chart of FIG. 7N.

The matrix band 1706 has a base 1762, an arm 1764 that is coupled to (e.g., integrally formed with) and extends outward (upward, in FIG. 7I) from the base 1762, and a tab 1765 that is coupled to (e.g., integrally formed with) and extends outward (upward, in FIG. 7I) from the arm 1764. The base 1762 has a substantially rectangular shape defined by the first end 1750, a shoulder 1766 that connects the base 1762 to the arm 1764, and the first and second sides 1756, 1758, which connect the first end 1750 and the shoulder 1758. The base 1762 thus has a height $H_{mb}$ that is defined between the first end 1750 and the shoulder 1766, and a length $L_{mb}$ that is defined between the first and second sides 1756, 1758. The arm 1764 also has a substantially rectangular shape (at least when viewed in FIG. 7I) defined by the second end 1752, the shoulder 1766, and the first and second sides 1756, 1758. The arm 1764 thus has a height $H_{ma}$ that is defined between the second end 1752 and the shoulder 1766, and a length $L_{ma}$ that is defined between the first and second sides 1756, 1758. As best illustrated in FIG. 7I, the length $L_{mb}$ of the base 1762 is greater than the length $L_{ma}$ of the arm 1764, such that the length $L_{mb}$ of the base 1762 defines the length $L_m$ of the matrix band 1706 itself. Meanwhile, the height $H_m$ of the matrix band 1706 is defined by the sum of the height $H_{mb}$ of the base 1762, the height $H_{ma}$ of the arm 1764, and the height $H_{mt}$ of the tab 1765.

It will be appreciated from FIG. 7I that the height $H_m$ of the matrix band 1706 is greater than the length $L_m$ of the matrix band 1706. In other words, the matrix band 1706 has a incisal-gingival dimension and a buccal-lingual dimension that is smaller than the incisal-gingival dimension. In this example, the height $H_m$ of the matrix band 1706 is equal to approximately 9.8 mm, while the length $L_m$ of the matrix band 1706 is equal to approximately 5 mm. Thus, in this example, the height $H_m$ of the matrix band 1706 is almost twice as large as the length $L_m$ of the matrix band 1706. It will also be appreciated from FIGS. 7I and 7J that the thickness of the matrix band 1706 is considerably smaller than the height $H_m$ and the length $L_m$ of the matrix band 1706.

With the body portion 1704 and the matrix band 1706 so dimensioned, the body portion 1704 is configured to engage, retain, and support the matrix band 1706. More particularly, the localized curvature of the body portion 1704 allows the matrix band 1706 to maintain a matching curvature. This localized curvature of both the body portion 1704 and the matrix band 1706 further allows the wedge 1700 to engage with the convex surface of the anterior tooth to be restored when inserted into the approximal space. The matrix band 1706 is coupled to the body portion 1704 so that the rear surface 1744 of the matrix band 1706 faces, and at least partially contacts, the front surface 1724 of the body portion 1704. In this example, the matrix band 1706 is coupled to the body portion 1704 via the first and second fastening elements 1728A, 1728B, which are received in first and second similarly shaped apertures 1772, 1774, respectively, formed in the base 1762 of the matrix band 1706. The fastening elements 1728A, 1728B may be secured therein in any known manner. In other examples, the matrix band 1706 may be coupled to the body portion 1704 via one fastening element, more than two fastening elements, or in some other manner. In any case, when the matrix band 1706 is coupled to the body portion 1704, as shown in FIGS. 7A-7D, the height axis 1754 is angled relative to the body axis 1723. As an example, the height axis 1754 be may oriented at an angle of between 75 degrees and 90 degrees relative to the body axis 1723.

So constructed, the wedge 1700 is specifically designed for use in a dental restoration procedure (e.g., a filling) for an anterior tooth. While not specifically illustrated herein, it will be appreciated that when it is desired to perform such a dental restoration procedure, the wedge 1700 may be disposed within an approximal space (e.g., approximal space 480) between an anterior tooth to be restored (e.g., anterior tooth 482) and an anterior tooth (e.g., anterior tooth 484) adjacent the anterior tooth to be restored 482, just as described in connection with the wedge 400 above. Like the wedge 400, the wedge 1700 will be disposed within the approximal space so that the front surface 1724 of the body portion 1704 and the front surface 1742 of the matrix band 1706 are facing the anterior tooth to be restored, which has a cavity (e.g., cavity 486) that is adapted to receive a filling during the restoration process. On the other hand, the rear surface 1726 of the body portion 1704 and the rear surface 1744 of the matrix band 1706 will face the adjacent anterior tooth. When the wedge 1700 is positioned in this manner, the wedge 1700 achieves the same technical benefits described above in connection with the wedge 400, which are not repeated herein in the interest of brevity.

It will be appreciated that the wedge 1700 can be made of one or more suitable materials. In many examples, the handle portion 1702 and the body portion 1704 will be made of a first material (e.g., wood, a thermoplastic polymer such as polypropylene) and the matrix band 1706 will be made of a second material (e.g., metal such as stainless steel, plastic) different from the first material. In other examples, however, the handle portion 1702, the body portion 1704, and the matrix band 1706 may be made of the same material (e.g., a plastic).

Moreover, it will also be appreciated that each anterior tooth has a right side and a left side, which requires that the wedge-band relationship also have a right configuration and a left configuration, respectively. The wedge 1700 illustrated in FIGS. 7A-7L is specifically designed as a right-handed wedge for restoring a respective right side of anterior teeth in a human patient's mouth. FIGS. 8A-8D illustrate another example of a wedge 800 that is a mirror image of the wedge 1700, such that the wedge 800 is specifically designed for use as a left-handed wedge for restoring a respective left side of anterior teeth in the human patient's mouth.

Figure 9B:
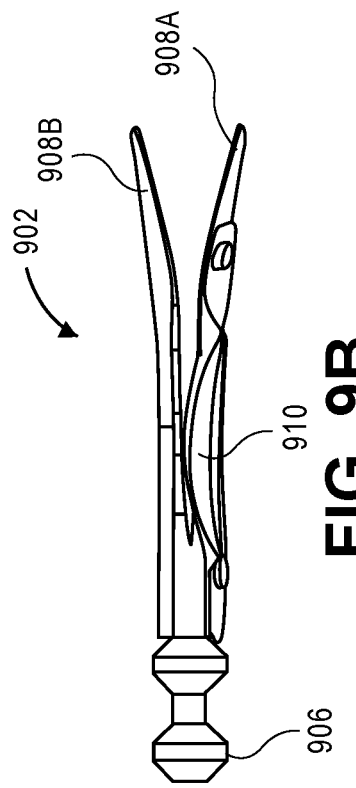
FIG. 9B is a top view of the first wedge of FIG. 9A.
Figure 9D:
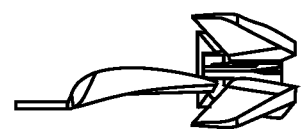
FIG. 9D is an end view of the first wedge of FIG. 9A.
Figure 9A:
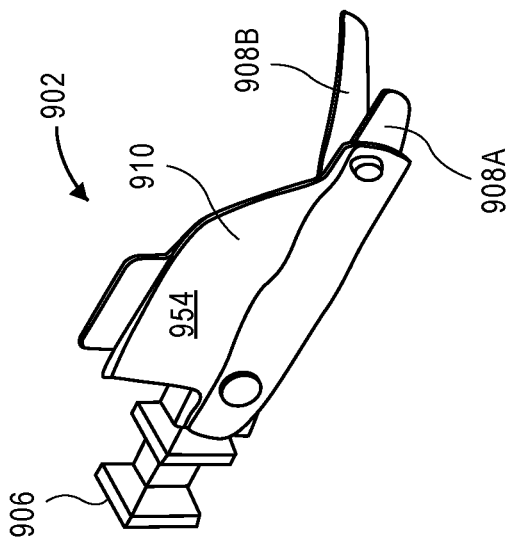
FIG. 9A depicts a perspective view of another example of a first wedge of a wedge system that can be used in a dental restoration procedure for a posterior tooth.
Figure 9C:
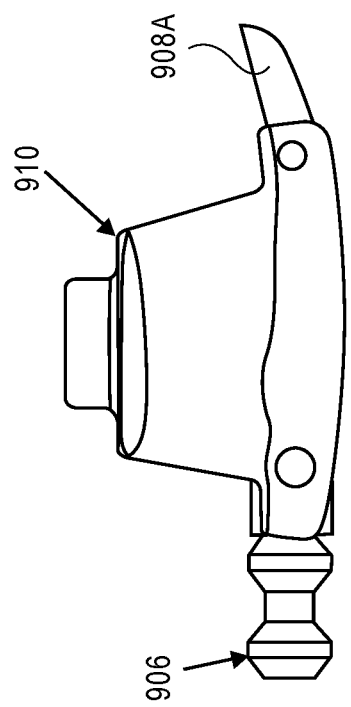
FIG. 9C is a front view of the first wedge of FIG. 9A.
Figure 9O:
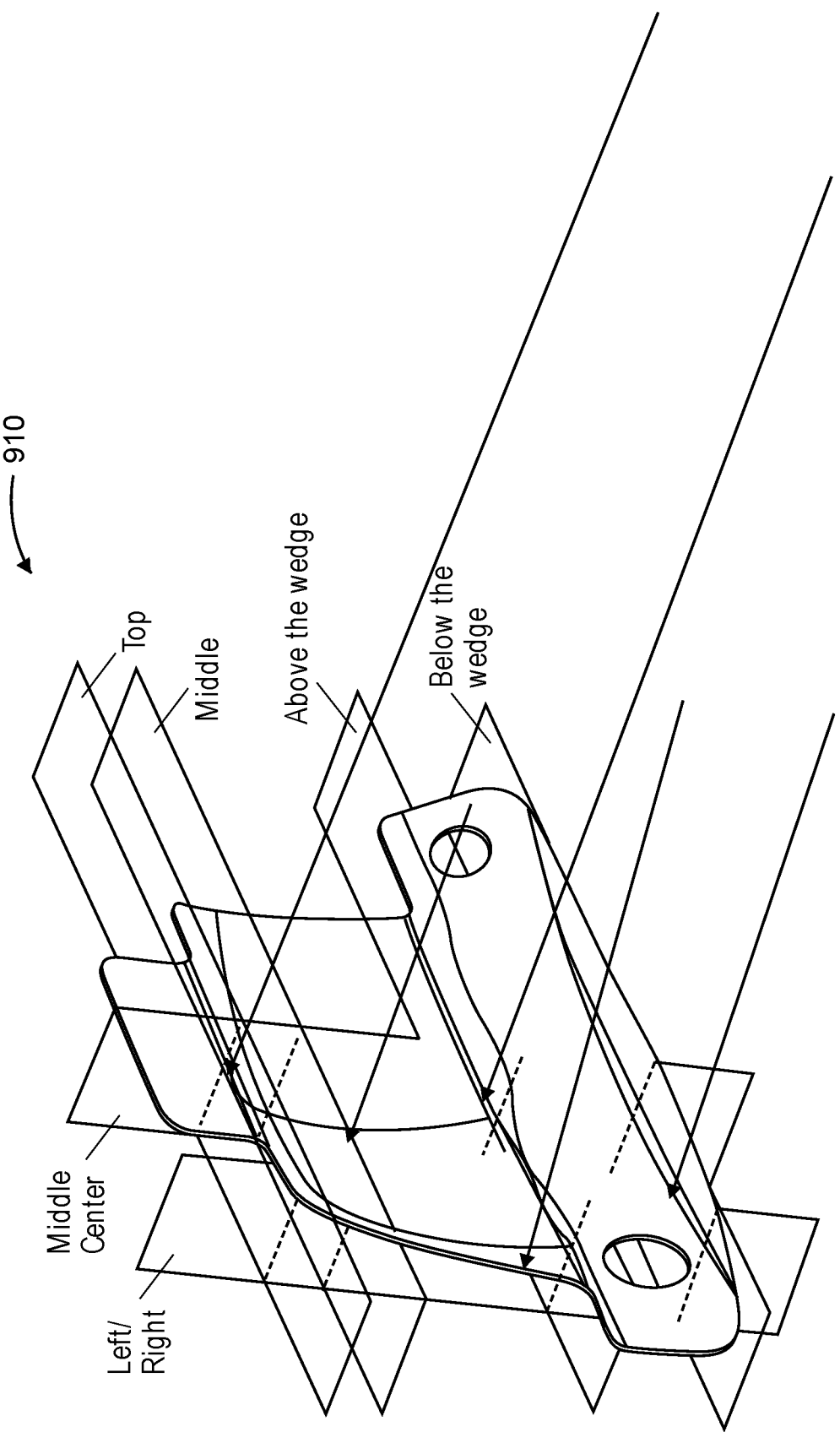
FIG. 9O is a first perspective view depicting a plurality of different horizontal and vertical planes through or proximate the matrix band of FIGS. 9H-9K.
Figure 9P:
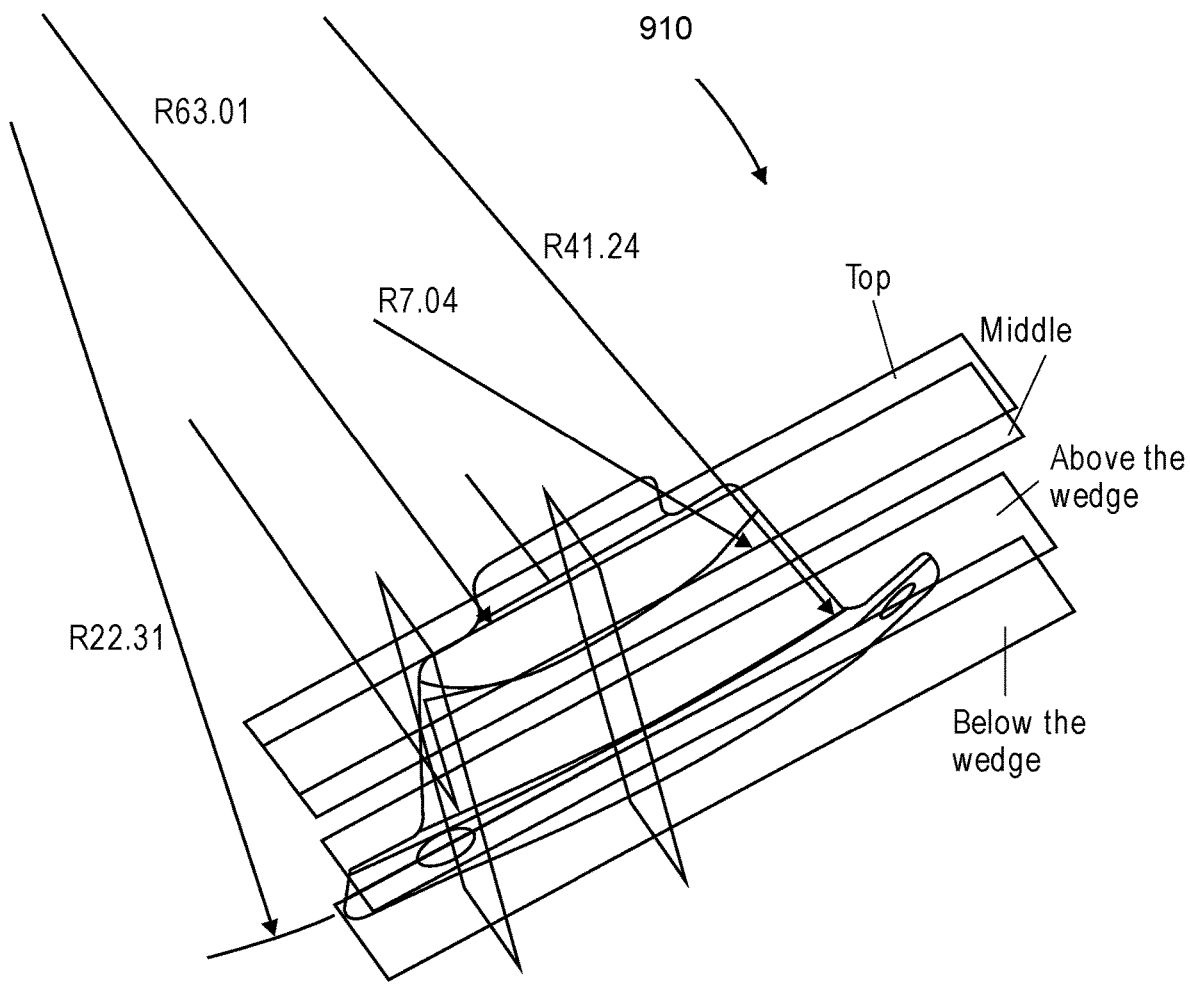
FIG. 9P is a second perspective view depicting the plurality of different horizontal and vertical planes of FIG. 9O.
Figure 9Q:
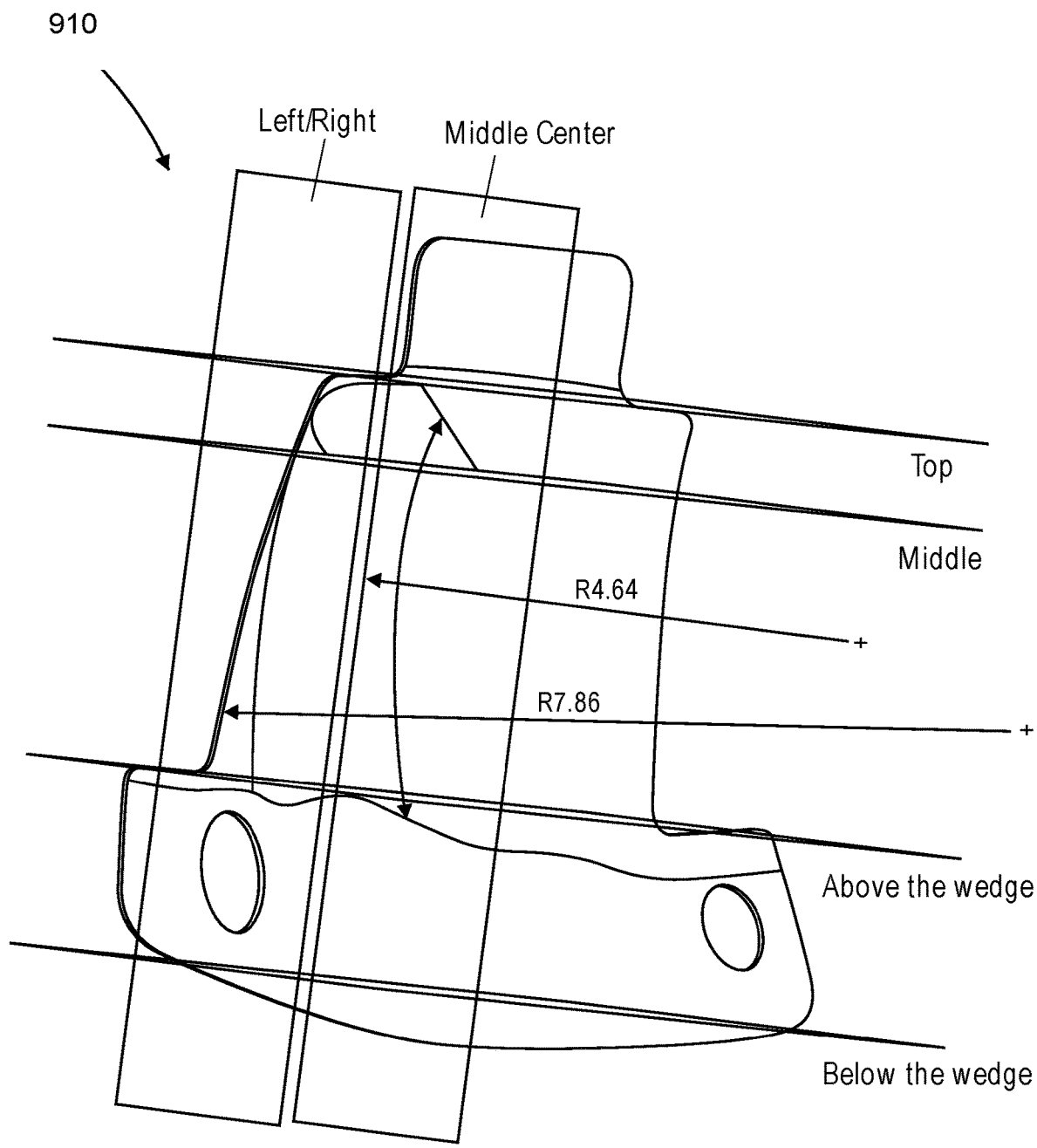
FIG. 9Q is a third perspective view depicting the plurality of different horizontal and vertical planes of FIG. 9O.

FIGS. 9A-9Q depict one example of a wedge system 900 that is similar to the wedge system 600 and is specifically designed for use in a dental restoration procedure for a posterior tooth. The wedge system 900 in this example includes a pair of wedges—a first wedge 902 and a second wedge 904 that cooperates with the first wedge 902. However, it will be appreciated that the wedge system 900 may, in other examples, only include the first wedge 902. In other words, the wedge system 900 need not include the second wedge 904.

The first wedge 902 is adapted to be disposed in an approximal space between the posterior tooth to be restored and a tooth adjacent the posterior tooth to be restored (the adjacent tooth may also be a posterior tooth), while the second wedge 904 is adapted to be disposed between portions of the first wedge 902 to facilitate proper positioning of the first wedge 902. The first wedge 902 generally includes a handle portion 906, a pair of arms 908A, 908B that are coupled to (e.g., integrally formed with) and extend outward from the handle portion 906, and a matrix band 910 coupled to the arm 908A. The second wedge 904, meanwhile, includes a handle portion 912 and a body portion 914 that is coupled to (e.g., integrally formed with) and extends outward from the handle portion 912. As will be described in greater detail below, when the first wedge 900 is disposed in the approximal space, the arm 908A and the matrix band 910 are positioned proximate the posterior tooth to be restored and the arm 904B is positioned proximate the adjacent tooth. When the body portion 912 of the second wedge 904 is disposed between portions of the first wedge 902 (in this case, the arms 908A, 908B), the arms 908A, 908B are driven outward, away from one another. The arm 908A, and the matrix band 910 coupled thereto, are forced into intimate contact with the posterior tooth to be repaired, such that a cavity of the posterior tooth to be repaired is sealed while substantially approximating the adjacent tooth. The arm 908B is forced into intimate contact with the adjacent tooth, thereby securely retaining the first wedge 902 in the approximal space. Furthermore, this bi-directional force created by inserting of the second wedge 904 into the first wedge 902 allows the tooth to be restored to be slightly separated from the adjacent tooth. This controlled, slight separation is imperative in creating a proper proximal contact between the restored tooth and the adjacent tooth once the entire system 900 has been removed following the restoration procedure. Thus, the wedge system 900 not only reduces, if not prevents, excess material, thereby reducing finishing time and reducing the failure rate of the dental restoration procedure, but also facilitates the creation of contact points between the posterior tooth and the adjacent tooth, which are desired.

The handle portion 906 of the first wedge 902 generally allows a dentist to grasp the first wedge 902 for the purpose of positioning the wedge 902 in or removing the wedge 902 from the approximal space. The handle portion 906 may have the shape illustrated in FIGS. 9A-9G, or may have any other suitable shape. The handle portion 906 extends from a first end 918 to a second end 920 along a handle axis 922. In other words, the handle portion 906 has a length $L_{h2}$ defined between the first end 918 and the second end 920. In this example, the length $L_{h2}$ is equal to approximately 3.5 mm. In other examples, however, the length $L_{h2}$ can be greater than or less than 3.5 mm. The handle portion 906 also has a height $H_{h2}$ defined between a top side 924 and a bottom side 926 (i.e., perpendicular to the handle axis 922). In this example, the height $H_{h2}$ is equal to approximately 2 mm, though in other examples, the height $H_{h2}$ can be greater than or less than 2 mm.

As best illustrated in FIGS. 9E and 9F, the arms 908A, 908B extend outward from the handle portion 906 first along axes 925A, 925B, respectively, parallel to the handle axis 922 and then along arm axes 928A, 928B, respectively, each oriented at an angle $\theta_a$ relative to the handle axis 922 (and the axes 925A, 925B), before curving away from the axes 928A, 928B and the handle axis 922. More particularly, the arm 908A extends from a first end 930, positioned immediately adjacent the handle portion 906, to a second end 932, remote from the handle portion 906, along the axis 925A and the arm axis 928A and then curves away from the axis 925A and the arm axis 928A proximate the second end 932, while the arm 908B extends from a first end 934, positioned immediately adjacent the handle portion 906 and the first end 930 of the arm 908A, to a second end 936, remote from the handle portion 906, along the axis 925B and the arm axis 628B, and then curves away from the axis 925B and the arm axis 928B proximate the second end 936. For the arms 908A, 908B, the transition from the axes 925A, 925B, respectively, to the arm axes 928A, 928B, may occur at any point along their length. In this example, this transition occurs at a point 937 that is approximately ⅓ of the length of each of the arms 908A, 908B. In this example, the angle $\theta_a$ (between the arm axes 928A, 928B and the axes 925A, 925B) is equal to between approximately 10 degrees and approximately 15 degrees, such that the arms 908A, 908B, which extend outward in different directions, are approximately 20 degrees to approximately 30 degrees apart from one another. Further, in this example, the arms 908A, 908B curve away from the axes 928A, 928B, respectively, at an angle of approximately 15 degrees to approximately 20 degrees. In any case, it will be appreciated that the distance between the arms 908A, 908B increases as the arms 908A, 908B extend outward, toward their respective second ends 932, 936.

As best illustrated in FIGS. 9E-9G, the arms 908A, 908B are identical in shape and size. Each of the arms 908A, 908B has a substantially triangular shape defined by a substantially triangular front surface 938, a substantially triangular rear surface 940 opposite the front surface 938, and top and bottom surfaces 942, 944 connecting the front and rear surfaces 938, 940. It will be appreciated that the front surfaces 938 of arms 908A, 908B will face the posterior tooth to be restored, and the rear surfaces 940 of arms 908A, 908B will face the posterior tooth when the first wedge 902 is disposed in the approximal space.

The first wedge 902 also includes first and second fastening elements 948A, 948B arranged on one of the arms 908A, 908B (arm 908A, in this case) to securely retain the matrix band 910 thereon. In this example, the fastening elements 948A, 948B each take the form of a circular projection that extends outward from the front surface 938 of the arm 908A. In other examples, however, the first wedge 902 may only include one fastening element, may include more than two fastening elements, may instead include one or more fastening elements on the arm 908B, or may include none at all (e.g., one of the arms 908A, 908B may instead include one or more apertures sized to receive one or more fasteners to secure the matrix band 910 to one of the arms 908A, 908B).

As best illustrated in FIG. 9F, the arm 908A has a length $L_a$ defined between the first end 930 and the second end 932 and along the axis 925A and the arm axis 928A. In this example, the length $L_a$ is equal to approximately 12.4 mm, such that the total length $L_{w1}$ of the first wedge 902 is equal to approximately 15.9 mm. In other examples, however, the length $L_a$ can be greater than or less than 12.4 mm, with the total length $L_{w1}$ of the wedge 902 being greater than or less than approximately 15.9 mm. In any case, the arm 908A in this example has a thickness, defined herein as the distance between the front and rear surfaces 938, 940, that slightly decreases as the arm 908A extends from the first end 930 to the second end 932, as illustrated in FIG. 9F. In other examples, however, the arm 908A may have a constant thickness or may taper to a greater degree than what is shown in FIG. 9F.

As also best illustrated in FIG. 9F, the arm 908A has a height, defined herein as the distance between the top and bottom surfaces 942, 944, that decreases or tapers as the arm 908A extends from the first end 930 to the second end 932. FIG. 9F also illustrates that the arm 908A curves downward before curving upward again as the arm 908A extends from the first end 930 to the second end 932. In this example, the arm 908A curves upward to a greater degree than it curves downward, such that a central point of the second end 932 is positioned further upward than a central point of the first end 930. Additionally, a cutout 948 is formed in the arm 908A along the top surface 942. In this example, the cutout 648 is a circular cutout. In other examples, however, the cutout can have a different shape and/or size.

In the interest of brevity, the preceding two paragraphs only discuss features of the arm 908A. However, because the arm 908B is identical in shape and size to the arm 908B, it will be appreciated that the arm 908B has the same features. In other words, the arm 908B has a length, height, and curvature that is identical to the length, height, and curvature of the arm 908B.

As illustrated in FIGS. 9E and 9G, the first wedge 902 also includes a wing 950 that is arranged between the handle portion 906 and the arms 908A, 908B to help keep the arms 908A, 908B a desired distance from one another. The wing 950 has a curvature that generally matches the curvature of the arms 908A, 908B. More particularly, the wing 950 extends downward from the handle portion 906 and along a portion of the top surface 944 of each of the arms 908A, 908B, as best illustrated in FIGS. 9E and 9G. Thus, like the arms 908A, 908B, the wing 950 in this example also has a substantially triangular shape. In other examples, however, the wing 950 can have a different shape and/or size.

Additionally, the first wedge 902 includes a gap 952 that is formed or defined between the arms 908A, 908B, and, at least in this example, the wing 950. The gap 952 is generally sized to receive the second wedge 904, particularly the body portion 914 of the second wedge 904, as will be discussed in greater detail below. And because the distance between the arms 908A, 908B increases as the arms 908A, 908B extend from their respective first ends 930, 934 to their respective second ends 932, 936, the size of the gap 952 also increases as the arms 908A, 908B extend from their respective first ends 930, 934 to their respective second ends 932, 936.

As illustrated in FIGS. 9H-9K, the matrix band 910 of the first wedge 902 has a thin profile that is defined by a front surface 954, a rear surface 956 opposite the front surface 954, and a thickness between the front and rear surfaces 954, 956. The front surface 954 is arranged to face (and engage) the posterior tooth to be restored, while the rear surface 956 is arranged to face the tooth adjacent the posterior tooth to be restored, when the first wedge 902 is in use. As also illustrated in FIGS. 9H-9K, the matrix band 910 generally extends from a first end 958 to a second end 960 along a height axis 962 and generally extends from a first side 964 to a second side 966 along a length axis 968.

The matrix band 910 has a base 972, an arm 974 that is coupled to (e.g., integrally formed with) and extends outward (upward, in FIG. 9I) from the base 972, and a tab 976 that is coupled to (e.g., integrally formed with) and extends outward (upward, in FIG. 9I) from the arm 974. The base 972 has a substantially rectangular shape (at least when viewed in FIG. 9I) defined by the first end 958, a shoulder 978 that connects the base 972 to the arm 974, and the first and second sides 964, 966, which connect the first end 958 and the shoulder 978. The arm 974 has a substantially trapezoidal shape (at least when viewed in FIG. 9I) defined by the second end 960, the shoulder 978, and the first and second sides 964, 966.

In this example, the matrix band 910 has the dimensions and curvature indicated in FIGS. 9I, 9J, and 9K. Several things will be appreciated from FIG. 9I. First, the matrix band 910 has a slight, gradual, and smooth concave curvature along and away from the height axis 962. Second, the matrix band 910 has a slight, gradual, and smooth concave curvature along the length axis 968, such that portions of the matrix band 910 between the first and second sides 964, 966 are slightly offset from the length axis 968. In this example, the matrix band 910 has a plurality of different radii of curvature measured at a number of different horizontal and vertical planes extending through or proximate the matrix band 910, with FIGS. 9O-9Q illustrating the different horizontal and vertical planes, and FIG. 9R providing a chart detailing the different radii of curvature (measured in mm) at those different planes. Of course, in other examples, the curvature of the matrix band 910 can vary such that one or more of these different radii of curvature vary from the values listed in the chart of FIG. 9R. Third, like the matrix band 610, the matrix band 910 has a height and a length that is greater than its height. In other words, the matrix band 910 has a incisal-gingival dimension and a buccal-lingual dimension that is larger than the incisal-gingival dimension.

With the arms 908A, 908B and the matrix band 910 so dimensioned, the arm 908A is configured to engage, retain, and support the matrix band 910. More particularly, the curvature of the arm 908A allows the matrix band 910 to maintain a matching curvature. This curvature of both the arm 908A and the matrix band 910 further allows the first wedge 902 to engage with the convex surface of the posterior tooth to be restored when inserted into the approximal space and utilized with the second wedge 904. The matrix band 910 is coupled to the arm 908A so that the rear surface 958 of the matrix band 910 faces, and at least partially contacts, the front surface 938 of the arm 908A. In this example, the matrix band 910 is coupled to the arm 908A via the first and second fastening elements 948A, 948B, which are received in first and second similarly shaped apertures 970, 972, respectively, formed in the base 972 of the matrix band 910. In this example, the distance $D_a$ between the apertures 970, 972 is approximately 7.7 mm, though this distance can vary. The fastening elements 948A, 948B may be secured therein in any known manner. In other examples, the matrix band 910 may be coupled to the arm 908A via one fastening element, more than two fastening elements, or in some other manner. In any case, when the matrix band 910 is coupled to the arm 908A, as shown in FIGS. 9A-9D, the height axis 954 is angled relative to each of the handle axis 922, the axis 925A, and the arm axis 928A.

As illustrated in FIGS. 9L-9N, further details regarding the second wedge 904 will now be described. At the outset, it will be appreciated that the second wedge 904 is substantially similar to the wedge 604, in that the wedge 904 includes a handle portion (the handle portion 912 and a body portion (the body portion 914). The handle portion 912 is identical to the handle portion 612 described above. Thus, in the interest of brevity, the handle portion 912 will not be discussed in further detail. Meanwhile, the body portion 914 is similar to the body portion 614 described above, but for the differences discussed below.

In particular, the dimensions of the body portion 914 vary from the dimensions of the body portion 614. As best illustrated in FIG. 9N, the body portion 914 has a thickness, defined herein as the distance between the front and rear surfaces 1024, 1026, that decreases as the body portion 914 extends from the first end 1020 to the second end 1022. In this example, the thickness $T_{fe2}$ at the first end 1020 is equal to approximately 1.25 mm, the thickness $T_{2p}$ at a point 1032 located between the first and second ends 1020, 1022 is equal to approximately 1.15 mm, the thickness $T_{2p2}$ at another point 1033 located between the first and second ends 1020, 1022 is equal to approximately 0.50 mm, and the thickness $T_{se2}$ at the second end 1020 is equal to approximately 0.10 mm. Thus, the body portion 914 tapers to a point at the second end 1020. It will thus be appreciated that the thickness of the body portion 914 decreases to a greater degree than the thickness of the body portion 614, and the body portion 914 is narrower than the body portion 614.

Thus, like the wedge system 600, the wedge system 900 is specifically designed for use in a dental restoration procedure (e.g., a filling) for a posterior tooth. While not specifically illustrated herein, it will be appreciated that when it is desired to perform such a dental restoration procedure, the first wedge 902 may be disposed within an approximal space between a posterior tooth to be restored (e.g., tooth 782) and an posterior tooth (e.g., tooth 784) adjacent the posterior tooth to be restored, just as illustrated in FIGS. 6R and 6S. The first wedge 902 is disposed within the approximal space so that the front surface 938 of the arm 908A and the front surface 954 of the matrix band 910 are facing the posterior tooth to be restored, which has a cavity (e.g., the cavity 786) that is adapted to receive a filling during the restoration process. On the other hand, the rear surface 940 of the arm 908A and the rear surface 956 of the matrix band 910 face the adjacent posterior tooth.

Before, after, or at the same time as the first wedge 902 is positioned within the approximal space, the second wedge 904 is positioned within the approximal space. The first and second wedges 902, 904 are positioned so that the second wedge 904 is disposed in the gap 952. More particularly, the body portion 914 of the second wedge 904 is disposed in the gap 952, between the arms 908A, 908B, and below the wing 950. When the second wedge 904 is so positioned, the arms 908A, 908B are driven outward, away from one another, by the body portion 914 (particularly the surfaces 1024, 1026). The arm 908A and the matrix band 910 are driven into intimate contact with the posterior tooth to be restored, while the arm 908B is driven into intimate contact with the adjacent tooth. More particularly, the front surface 954 of the matrix band 910 contacts the posterior tooth to be restored, with substantially all of the front surface 954 of the matrix band 910 contacting the posterior tooth adjacent thereto.

Beneficially, because the matrix band 910 has a concave curvature, and the cavity to be filled is convex, it will be appreciated that the front surface 954 of the matrix band 910 flushly and tightly interlocks with the posterior tooth to be restored. The curvature of the matrix band 910 also properly shapes the contour of the restoration by closely matching or approximating the contours to the natural contours of the posterior tooth to be restored. Furthermore, the curvature of the matrix band 910 allows the matrix band 910 to seal the cavity of the posterior tooth, allowing the dentist to fill the cavity while reducing, if not preventing, excess material, but also helps to secure the wedge 902 within the approximal space, thereby preventing the wedge 902 from moving from this position while the posterior tooth is being restored. This is also helped by the fact that the second wedge 904 is disposed in the gap 952 of the first wedge 902.

Moreover, it will also be appreciated that each anterior tooth has a right side and a left side, which requires that the wedge-band relationship also have a right configuration and a left configuration, respectively. The wedge system 900 illustrated in FIGS. 9A-9N is specifically designed as a right-handed wedge for restoring a respective right side of posterior teeth in a human patient's mouth. While not illustrated, it will be appreciated that the wedge system 900 can be inverted so as to be specifically designed for use as a left-handed wedge for restoring a respective left side of posterior teeth in the human patient's mouth.

FIGS. 10A-10D depict another example of a wedge system 1000 specifically designed for use in a dental restoration procedure for a posterior tooth Like the wedge system 600, the wedge system 1000 includes a pair of wedges—a first wedge 1002 and a second wedge 1004 that cooperates with the first wedge 1002. However, it will be appreciated that the wedge system 1000 may, in other examples, only include the first wedge 1002.

Figure 10A:
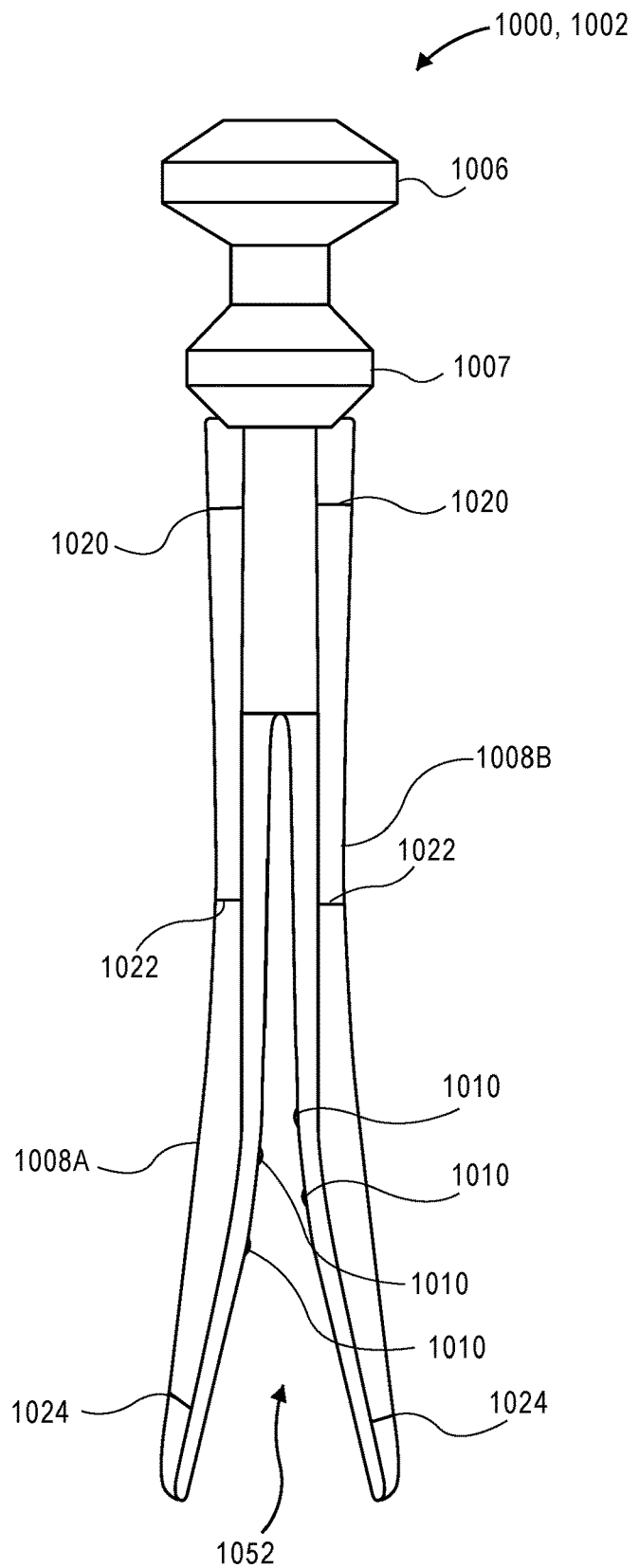
FIG. 10A is a bottom view of another example of a first wedge of a wedge system that can be used in a dental restoration procedure for a posterior tooth.
Figure 10B:
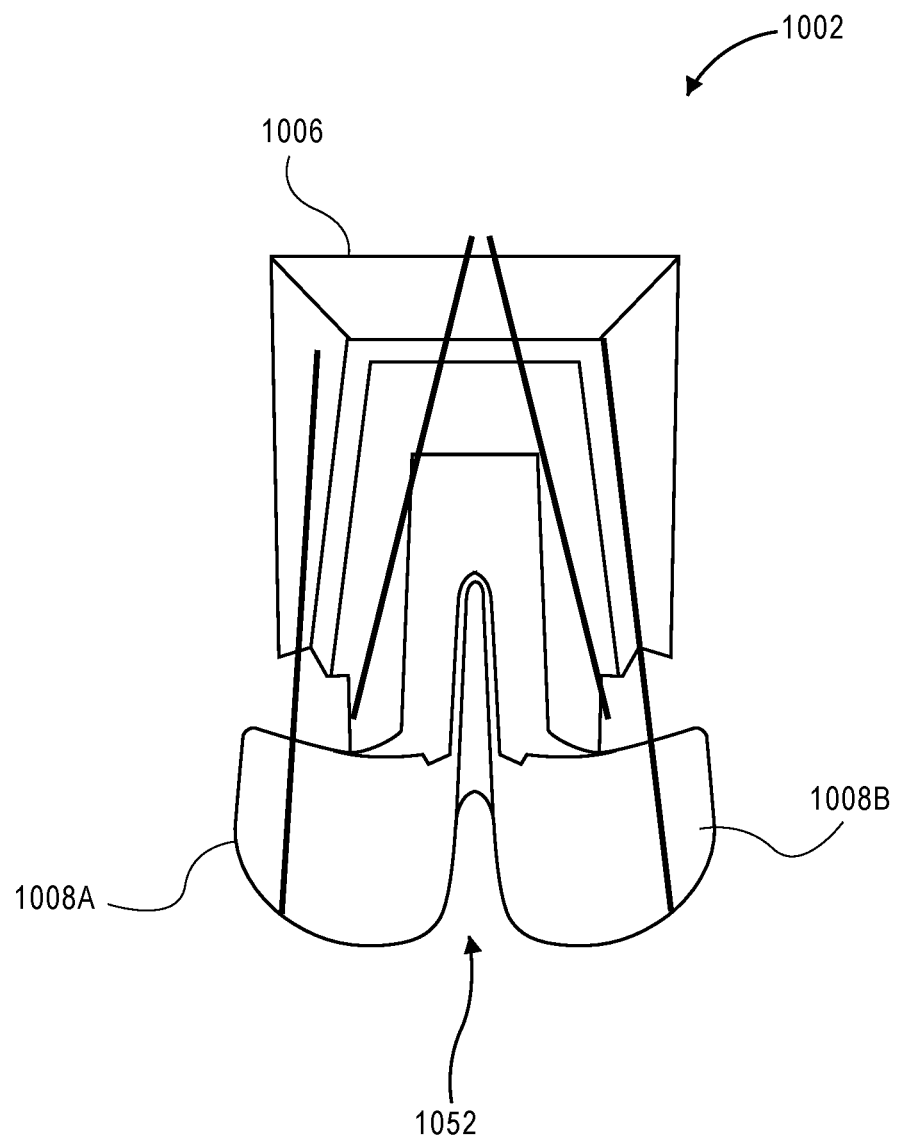
FIG. 10B is an end view of the first wedge of FIG. 10A.

As illustrated in FIGS. 10A and 10B, the first wedge 1002 is similar to the first wedge 602 of the wedge system 600, with two notable exceptions. First, while the first wedge 1002 similarly includes a handle portion 1006, a base element 1007 coupled to the handle portion 1006, and a pair of arms 1008A, 1008B that are coupled to and extend outward from the base element 1007, the first wedge 1002 does not include a matrix band (e.g., the matrix band 610). Second, the first wedge 1002 includes one or more ribs 1010 arranged on each of the arms 1008A, 1008B. In this example, the first wedge 1002 includes two ribs 1010 arranged on each of the arms 1008A, 1008B. As illustrated in FIGS. 10A and 10B, the ribs 1010 are spaced apart and are arranged on an inner surface of each of the arms 1008A, 1008B. In other examples, however, the first wedge 1002 may include more or less ribs (e.g., one rib 1010 on each arm 1008A, 1008B), one or more ribs 1010 on only one of the arms 1008A, 1008B, or the ribs 1010 may be located in a different position. In any case, so arranged, when the first wedge 1002 is disposed in an approximal space between the posterior tooth to be restored and a tooth adjacent the posterior tooth to be restored, the ribs 1010 are configured to engage tissue defining the approximal space in order to help secure the first wedge 1002 therein.

As also illustrated in FIGS. 10A and 10B, different portions of the first wedge 1002 are oriented at different angles relative to the horizontal. For example, at point 1020 along the base element 1007, the first wedge 1002 has a first angle relative to the horizontal, at point 1022 along the arms 1008A, 1008B, the first wedge 1002 has a second angle relative to the horizontal that is greater than the first angle, and at point 1024 along the arms 1008A, 1008B, the first wedge 1002 has a third angle relative to the horizontal that is greater than the first and second angles. As a result, as best illustrated in FIG. 10B, the first wedge 1002 transitions to a greater angle relative to the horizontal as the first wedge 1002 extends from the handle portion 1006 to the end of the arms 1008A, 1008B.

Figure 10C:
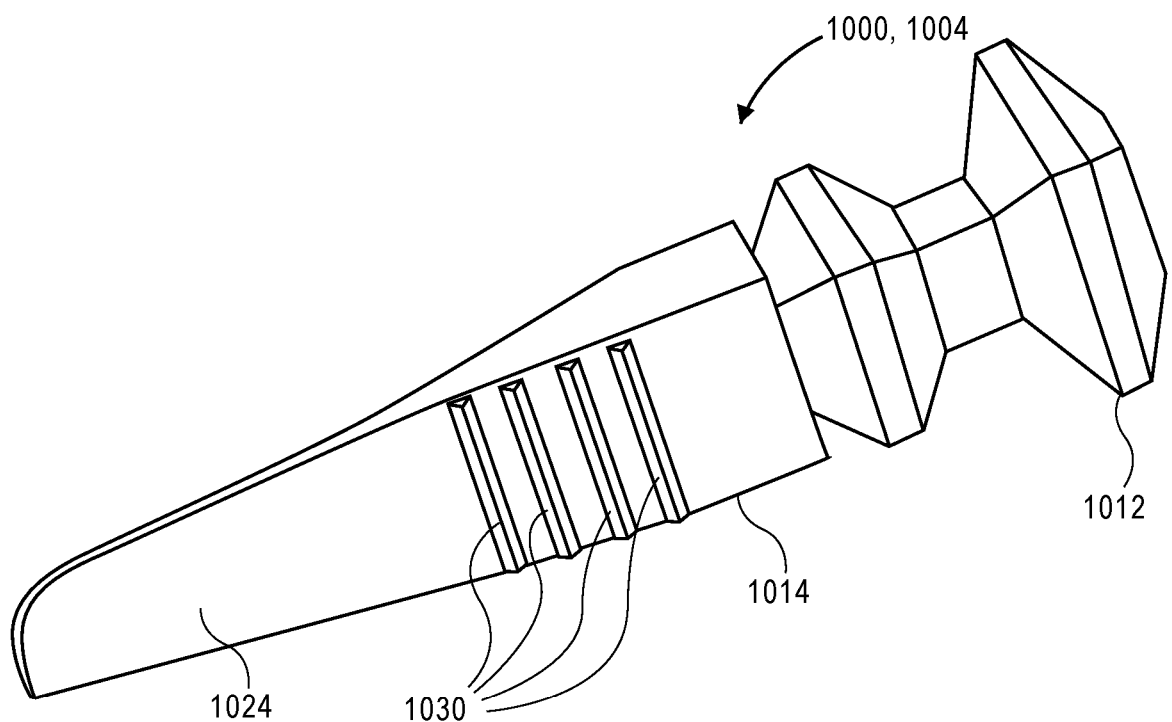
FIG. 10C is a perspective view of one example of a second wedge of the wedge system that can be used in combination with the first wedge of FIG. 10A in a dental restoration procedure for a posterior tooth.
Figure 10D:
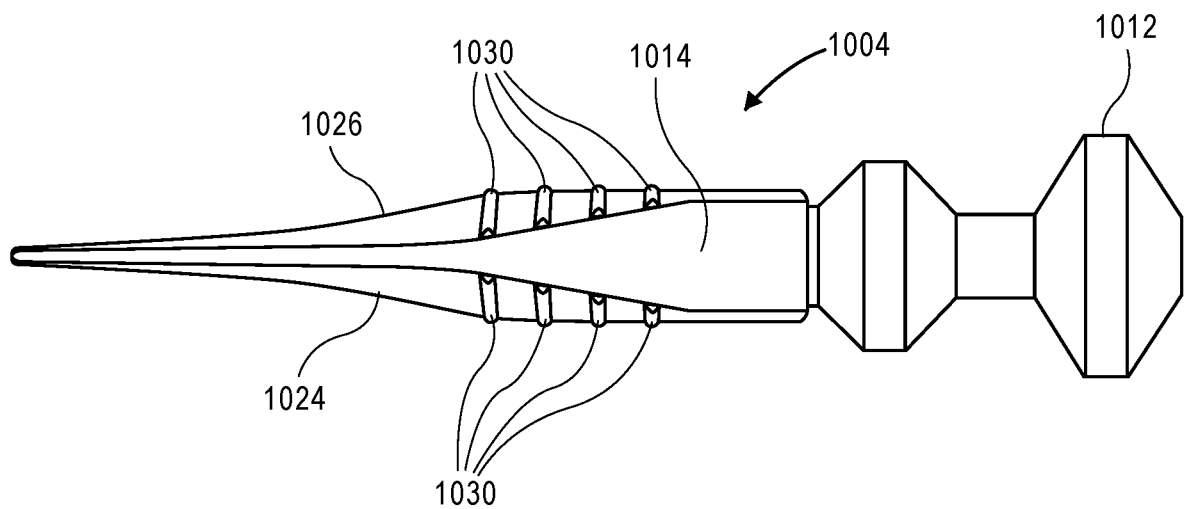
FIG. 10D is a top view of the second wedge of FIG. 10C.

As illustrated in FIGS. 10C and 10D, the second wedge 1004 is similar to the second wedge 604 of the wedge system 600, in that the second wedge 1004 includes a handle portion 1012 and a body portion 1014 that is coupled to and extends outward from the handle portion 1012. However, unlike the second wedge 604, the second wedge 1004 also includes one or more ribs 1030 arranged on the body portion 1014. In this example, the second wedge 1004 includes four ribs 1030 arranged on each of the front and rear surfaces 1024, 1026 of the body portion 1014. In other examples, however, the second wedge 1004 may include more or less ribs (e.g., one rib 1030 on each of the surfaces 1024, 1026), one or more ribs 1030 on only one of the surfaces 1024, 1026, or the ribs 1030 may be located in a different position. In any case, so arranged, when the body portion 1014 of the second wedge 1004 is disposed in the gap 1052 of the first wedge 1002, the ribs 1030 on one of the surfaces 1024, 1026 are configured to engage the ribs 1010 on one of the arms 1008A, 1008B and the ribs 1030 on the other one of the surfaces 1024, 1026 are configured to engage the ribs 1010 on the other one of the arms 1008A, 1008B. The engagement between the ribs 1010, 1030 helps to both couple the first and second wedges 1002, 1004 together and to maintain the first and second wedges 1002, 1004 in the approximal space.

Throughout this specification, structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The invention claimed is:

1. A wedge for use in a dental restoration procedure for a posterior tooth, comprising:
   a handle portion;
   a body portion coupled to and extending outward from the handle portion, the body portion adapted to be disposed in an approximal space between the posterior tooth and a tooth adjacent the posterior tooth;
   a first arm extending from the body portion;
   a second arm extending from the body portion;
   a gap formed between the first arm and the second arm; and
   a wing connecting the first arm and the second arm, wherein the gap is formed below the wing, and wherein the first and second arms extend outward from the wing.

2. The wedge of claim 1, further comprising a first rib arranged on an inner surface of the first arm, and a second rib arranged on an inner surface of the second arm, wherein each of the first and second ribs is adapted to engage tissue defining the approximal space.

3. The wedge of claim 1, wherein the handle portion has a length that extends along a handle axis and the body portion has a length that extends along a body axis, the body axis being parallel to the handle axis.

4. The wedge of claim 1, wherein the handle portion extends along a first longitudinal axis and the body portion extends along a second longitudinal axis that is substantially coaxial with the first longitudinal axis.

5. The wedge of claim 1, wherein the handle portion extends along a handle axis and the body portion extends along a body axis, and wherein the handle axis and the body axis extend in the same direction.

6. The wedge of claim 1, wherein the wedge does not include a matrix band.

7. The wedge of claim 1, wherein the first and second arms diverge from one another as the first and second arms extend outward, away from the wing.

8. The wedge of claim 1, wherein each of the first and second arms has a first end coupled to the body portion and a second end opposite the first end, and wherein the first and second arms are spaced a first distance apart from one another at their first ends and a second distance apart from one another at their second ends, the second distance being greater than the first distance.

9. The wedge of claim 1, further comprising a matrix band coupled to and extending outward from the first arm or the second arm, the matrix band adapted to contact the posterior tooth when the body portion is disposed in the approximal space, the matrix band having a height, a length, and a thickness, the length of the matrix band being oriented along a length of the body portion, and the thickness of the matrix band being smaller than both the height and the length.

10. A wedge system for use in a dental restoration procedure for a posterior tooth, comprising:
    a first wedge adapted to be disposed in an approximal space between the posterior tooth and a tooth adjacent the posterior tooth, the first wedge including a body portion, a first arm extending from the body portion, a second arm extending from the body portion, a gap formed between the first arm and the second arm, a first rib arranged on an inner surface of the first arm adapted to face away from the posterior tooth when the first wedge is disposed in the approximal space, and a second rib arranged on an inner surface of the second arm adapted to face towards the posterior tooth when the first wedge is disposed in the approximal space, wherein each of the first and second ribs is adapted to engage tissue defining the approximal space.

11. The wedge system of claim 10, wherein the first arm extends from the body portion along a first axis and the second arm extends from the body portion along a second axis that is angled relative to the first axis.

12. The wedge system of claim 10, wherein the first wedge further comprises a handle portion extending outward from the body portion, wherein the handle portion has a length that extends along a handle axis and the body portion has a length that extends along a body axis, the body axis being parallel to the handle axis.

13. The wedge system of claim 10, wherein the first wedge does not include a matrix band.

14. The wedge system of claim 10, further comprising a wing connecting the first arm and the second arm, wherein the gap is formed below the wing, and wherein the first and second arms extend outward from the wing.

15. The wedge system of claim 14, wherein the first and second arms diverge from one another as the first and second arms extend outward, away from the wing.

16. The wedge system of claim 10, wherein each of the first and second arms has a first end coupled to the body portion and a second end opposite the first end, and wherein the first and second arms are spaced a first distance apart from one another at their first ends and a second distance apart from one another at their second ends, the second distance being greater than the first distance.

17. The wedge system of claim 10, further comprising a second wedge including a body portion, wherein at least a portion of the body portion of the second wedge is arranged to be disposed in the gap of the first wedge to removably secure the second wedge to the first wedge.

18. A wedge system for use in a dental restoration procedure for a posterior tooth, comprising:
- a first wedge adapted to be disposed in an approximal space between the posterior tooth and a tooth adjacent the posterior tooth, the first wedge including a body portion, a first arm extending from the body portion, a second arm extending from the body portion, a gap formed between the first arm and the second arm, a first rib arranged on an inner surface of the first arm, and a second rib arranged on an inner surface of the second arm, wherein each of the first and second ribs is adapted to engage tissue defining the approximal space;
- a second wedge including a body portion, wherein at least a portion of the body portion of the second wedge is arranged to be disposed in the gap of the first wedge to removably secure the second wedge to the first wedge; and
- third and fourth ribs arranged on the arm of the second wedge to engage the first and second ribs, respectively, to removably secure the second wedge to the first wedge.

19. A method of preparing a posterior tooth for a dental restoration procedure, the method comprising:
- providing a first wedge including a handle portion, a body portion, a first arm extending from the body portion, a second arm extending from the body portion, a gap formed between the first arm and the second arm, a first rib arranged on an inner surface of the first arm, and a second rib arranged on an inner surface of the second arm; and
- inserting the first wedge into an approximal space between the posterior tooth and a tooth adjacent to the posterior tooth, such that each of the first and second ribs engages tissue defining the approximal space.

20. The method of claim 19, further comprising:
providing a second wedge including a body portion; and
- after the first wedge is inserted into the approximal space, inserting the second wedge into the approximal space such that at least a portion of the body portion of the second wedge is disposed in the gap of the first wedge, thereby removably securing the second wedge to the first wedge,
wherein disposing at least the portion of the body portion of the second wedge in the gap of the first wedge comprises driving the first arm of the first wedge toward the posterior tooth and driving the second arm of the first wedge away from the first arm and toward the tooth adjacent the posterior tooth.

* * * * *